(12) United States Patent
Sugioka

(10) Patent No.: US 10,917,265 B2
(45) Date of Patent: Feb. 9, 2021

(54) COMMUNICATION APPARATUS AND COMMUNICATION SYSTEM

(71) Applicant: Sony Semiconductor Solutions Corporation, Kanagawa (JP)

(72) Inventor: Tatsuya Sugioka, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/495,039

(22) PCT Filed: Mar. 12, 2018

(86) PCT No.: PCT/JP2018/009432
§ 371 (c)(1),
(2) Date: Sep. 17, 2019

(87) PCT Pub. No.: WO2018/173824
PCT Pub. Date: Sep. 27, 2018

(65) Prior Publication Data
US 2020/0244488 A1   Jul. 30, 2020

(30) Foreign Application Priority Data

Mar. 24, 2017   (JP) ................. 2017-058575

(51) Int. Cl.
*H04L 25/02* (2006.01)
(52) U.S. Cl.
CPC ......... *H04L 25/026* (2013.01); *H04L 25/029* (2013.01); *H04L 25/0278* (2013.01)

(58) Field of Classification Search
CPC . H04L 27/368; H04L 25/026; H04L 25/0278; H04L 25/029
See application file for complete search history.

(56) References Cited

U.S. PATENT DOCUMENTS

2007/0298752 A1* 12/2007 Nakada ................. H04L 25/026
455/343.1

FOREIGN PATENT DOCUMENTS

WO   2017/026096 A1   2/2017

OTHER PUBLICATIONS

European Patent Office Communication Pursuant to Article 94(3) EPC dated Oct. 5, 2020 for corresponding European Application No. 18716367.0.

* cited by examiner

*Primary Examiner* — Sung S Ahn
(74) *Attorney, Agent, or Firm* — Michael Best & Friedrich LLP

(57) ABSTRACT

To obtain a communication apparatus capable of reducing the consumption of electric power.
A communication system according to the present disclosure includes a transmitter that generates a first signal including communication data and sends the first signal through a communication terminal in a first operation mode, and that generates a second signal including a predetermined first signal pattern and having a transition rate lower than the first signal and sends the second signal through the communication terminal in a second operation mode, and a controller that sets an operation mode for the transmitter to either of a plurality of operation modes including the first operation mode and the second operation mode.

28 Claims, 32 Drawing Sheets

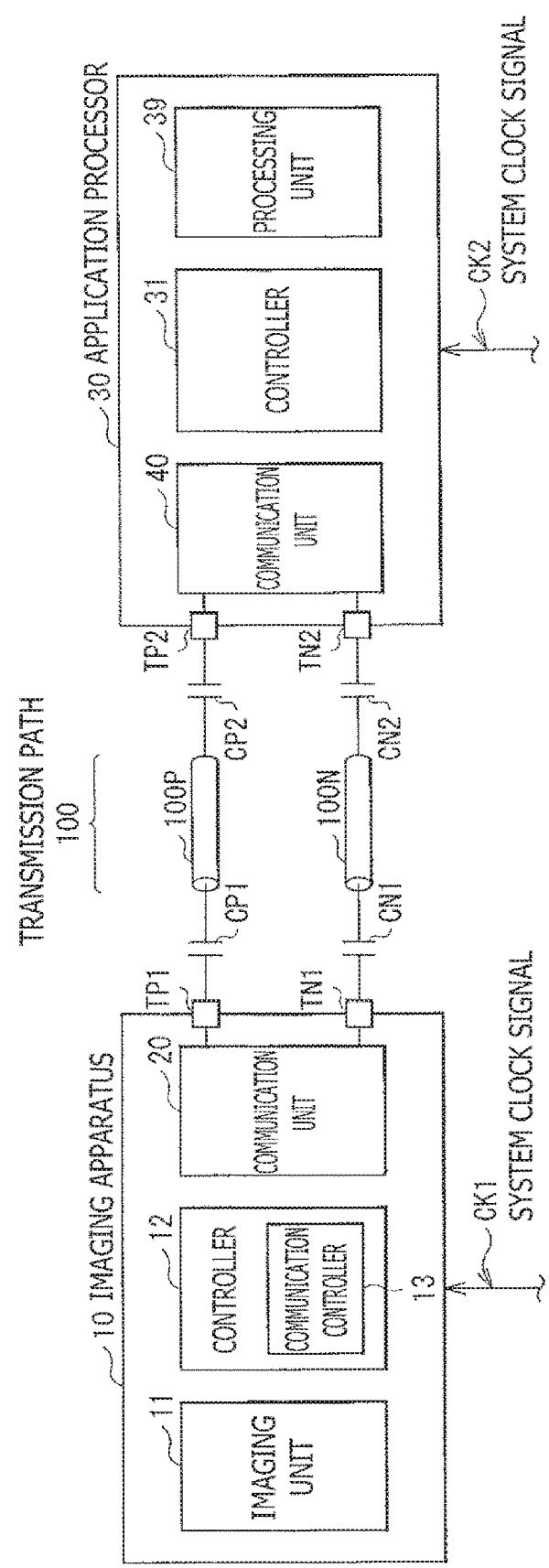
[Fig. 1]

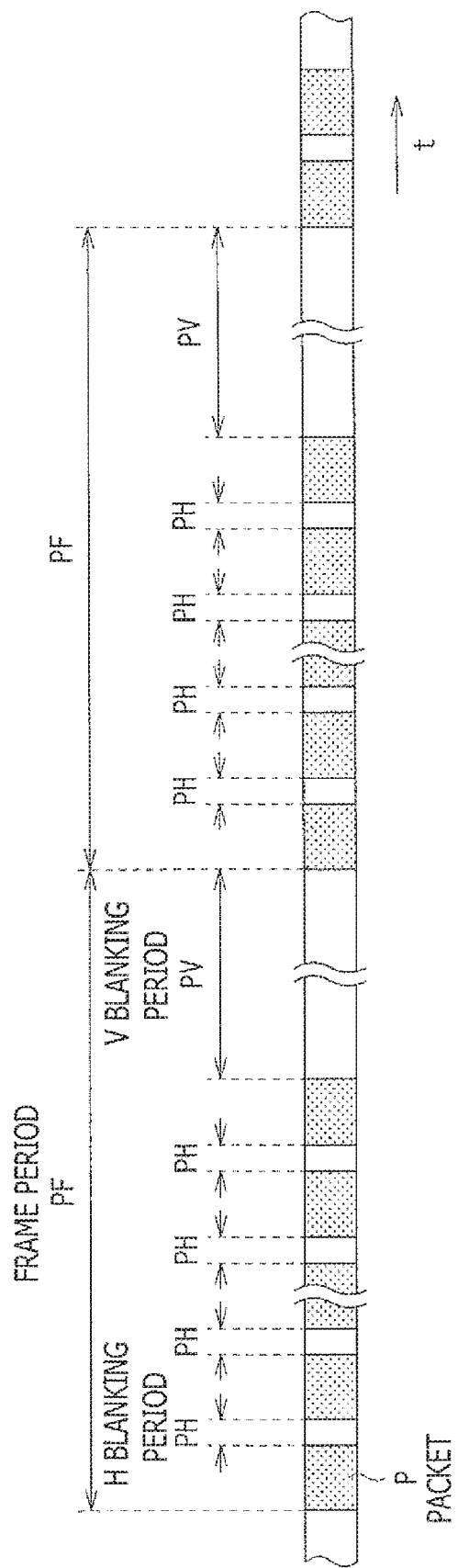
[Fig. 2A]

[Fig. 2B]
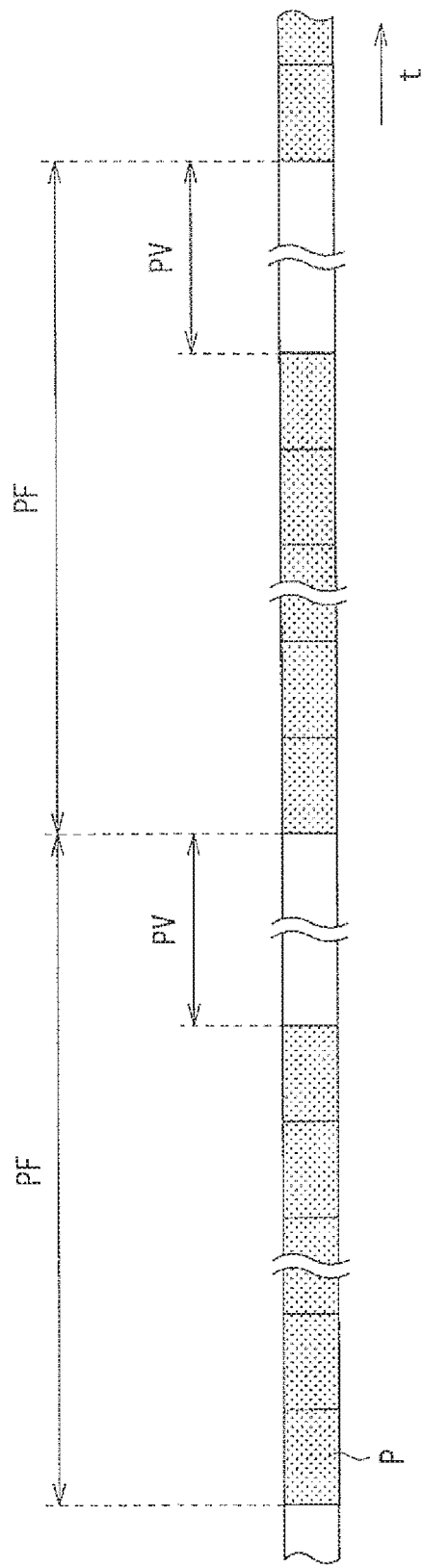

[Fig. 2C]
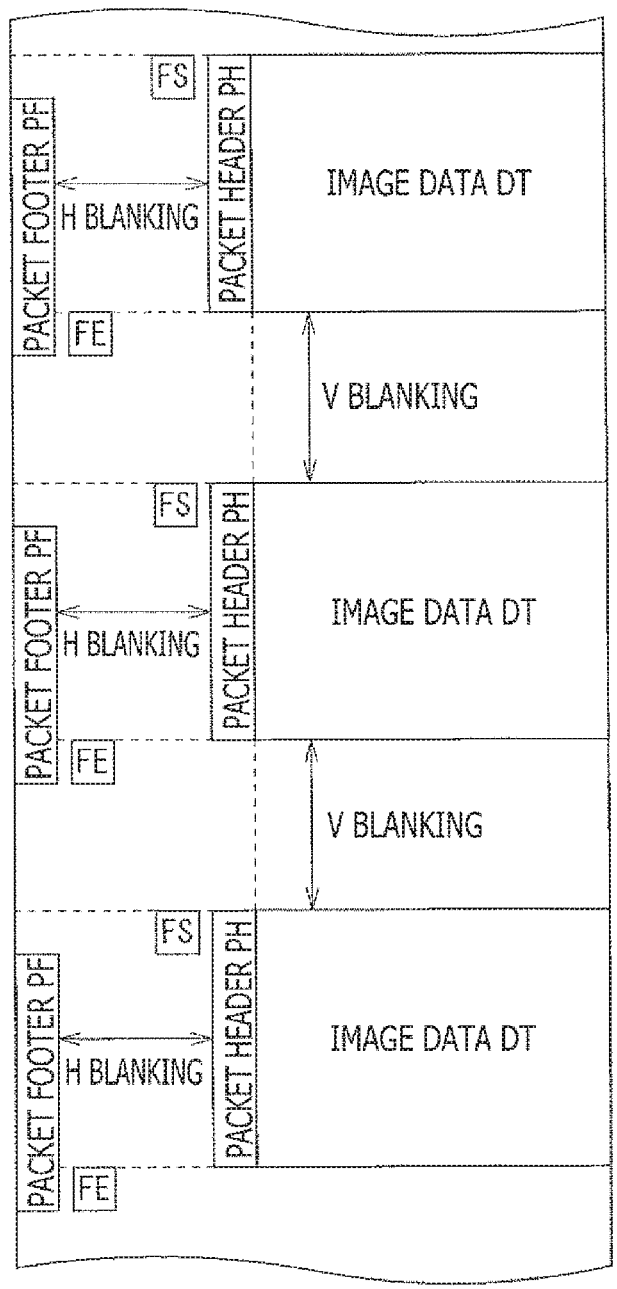

[Fig. 3]
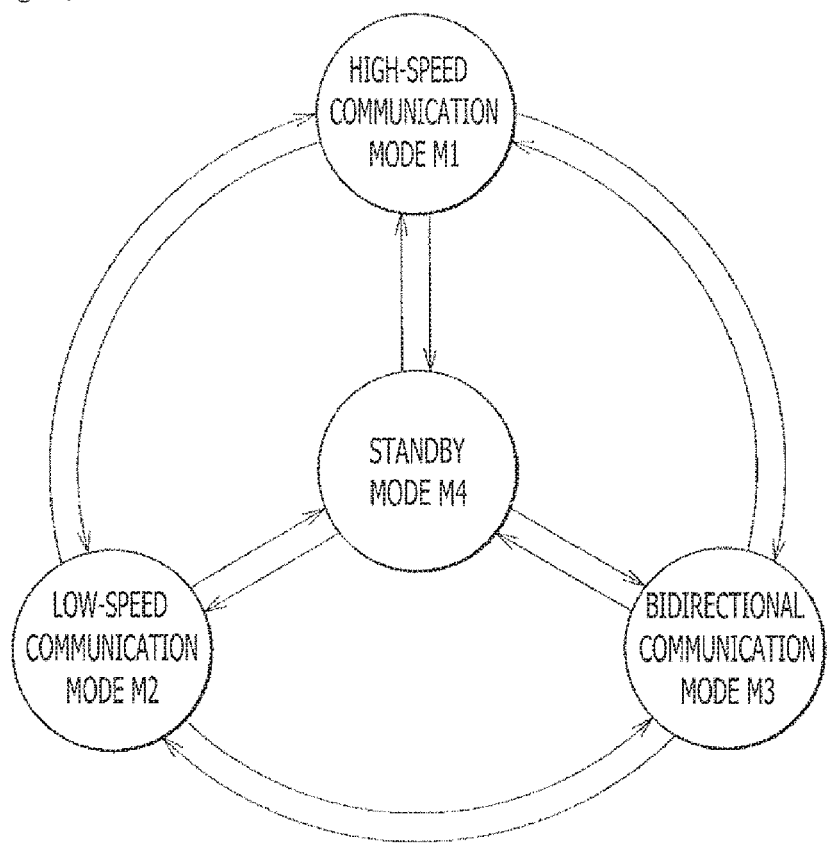

[Fig. 4]
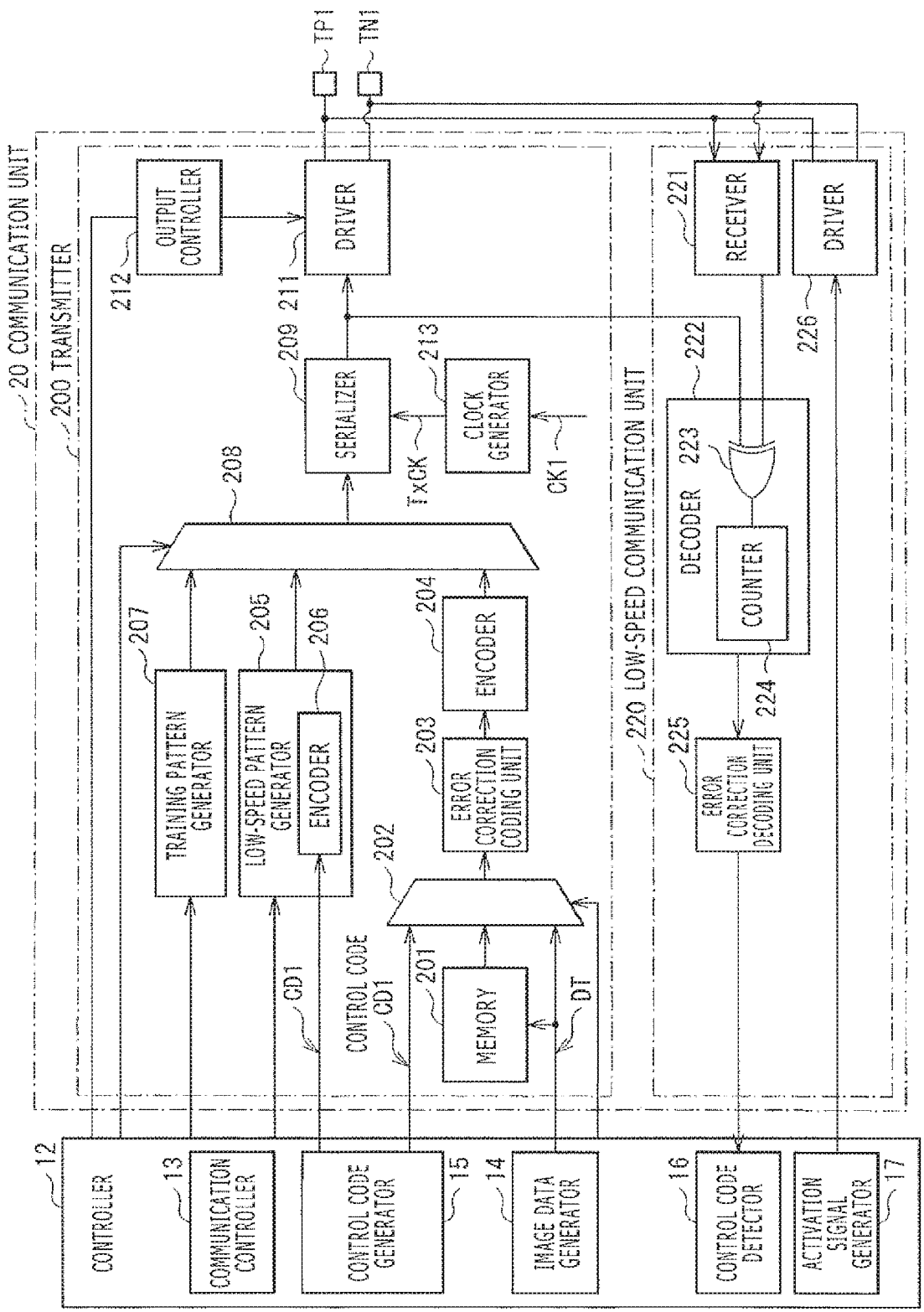

[Fig. 5A]
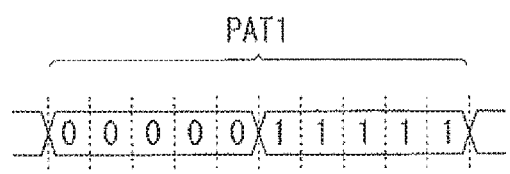

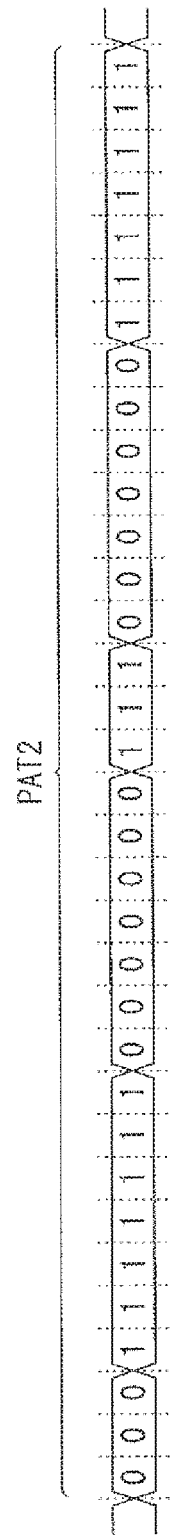
[Fig. 5B]

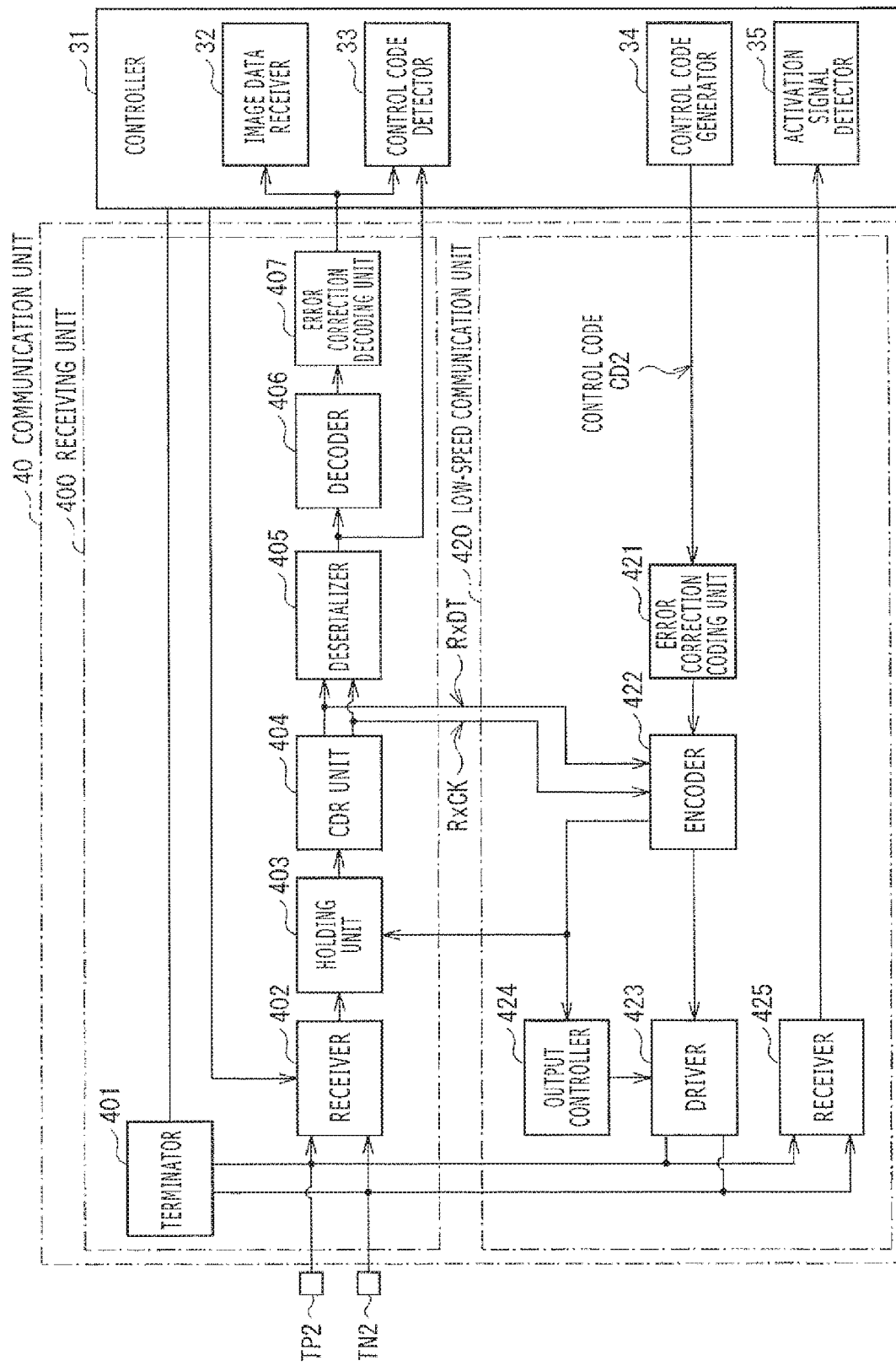
[Fig. 6]

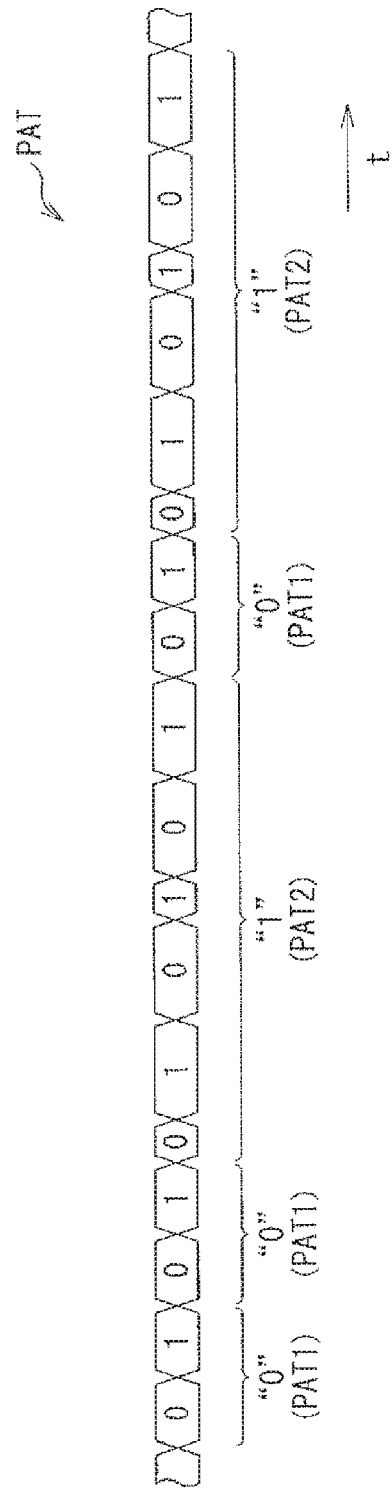
[Fig. 7]

[Fig. 8]
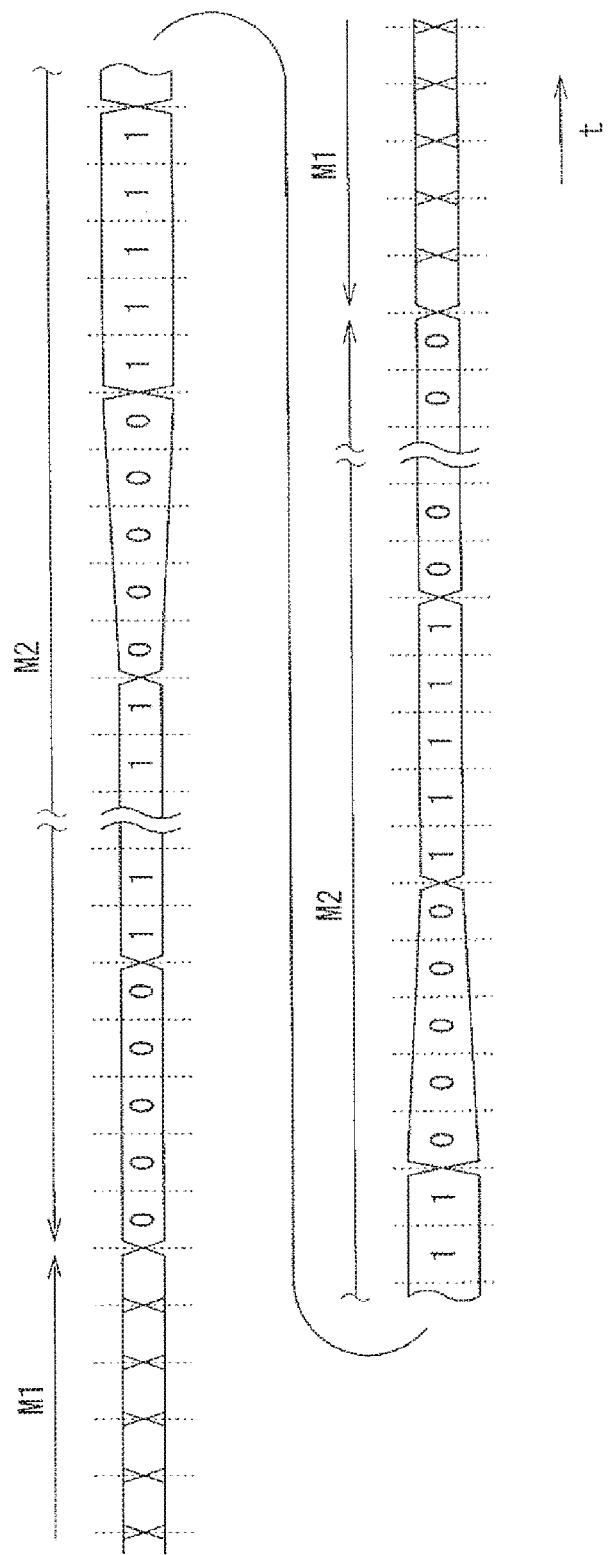

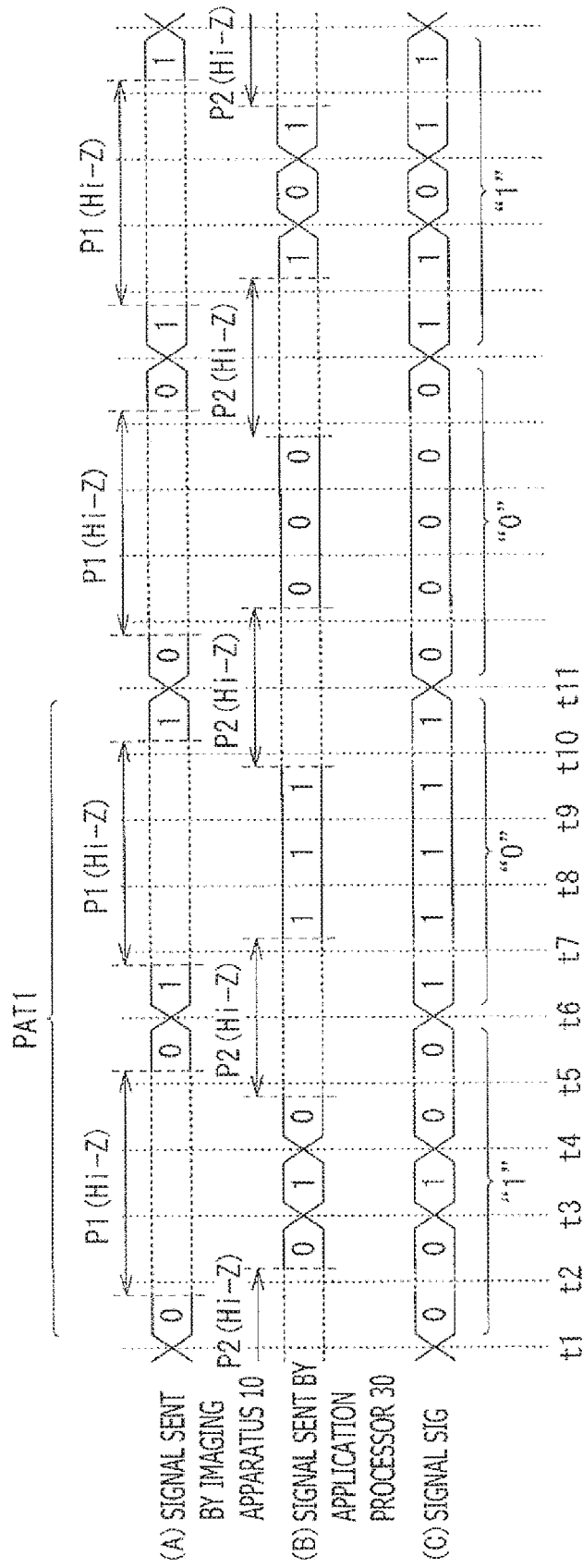
[Fig. 9]

[Fig. 10]
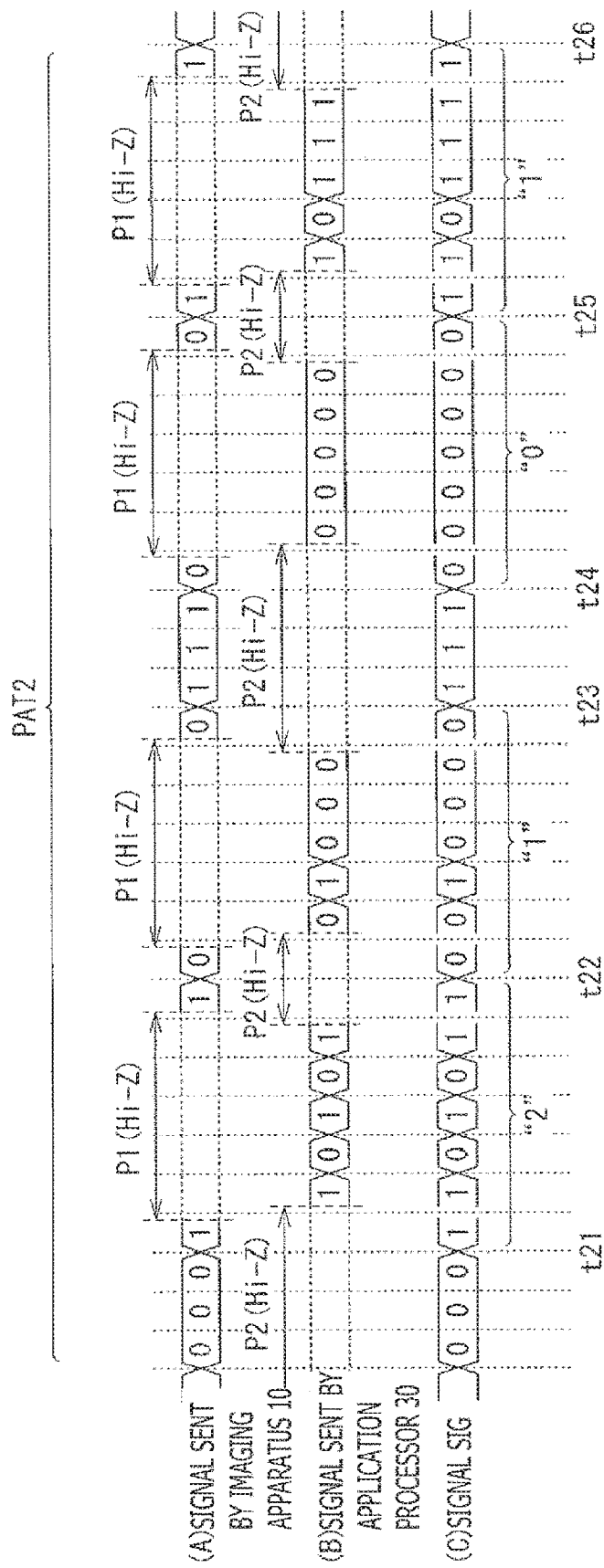

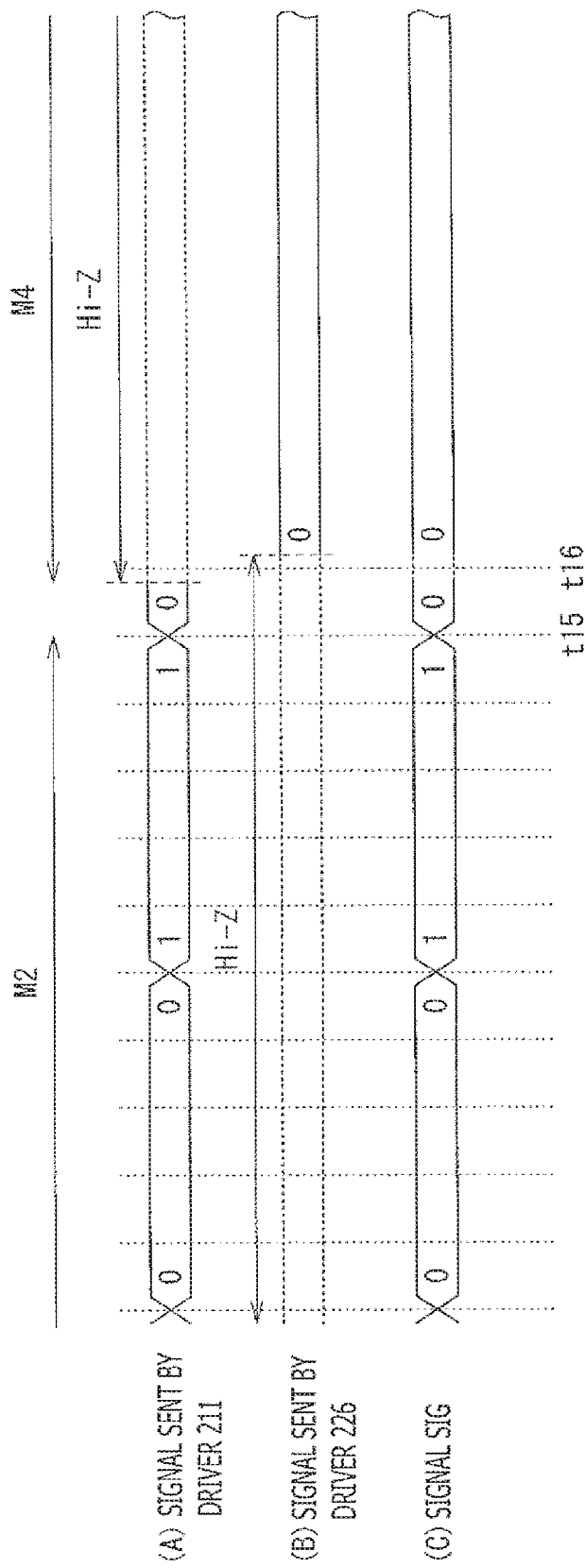

[Fig. 12]
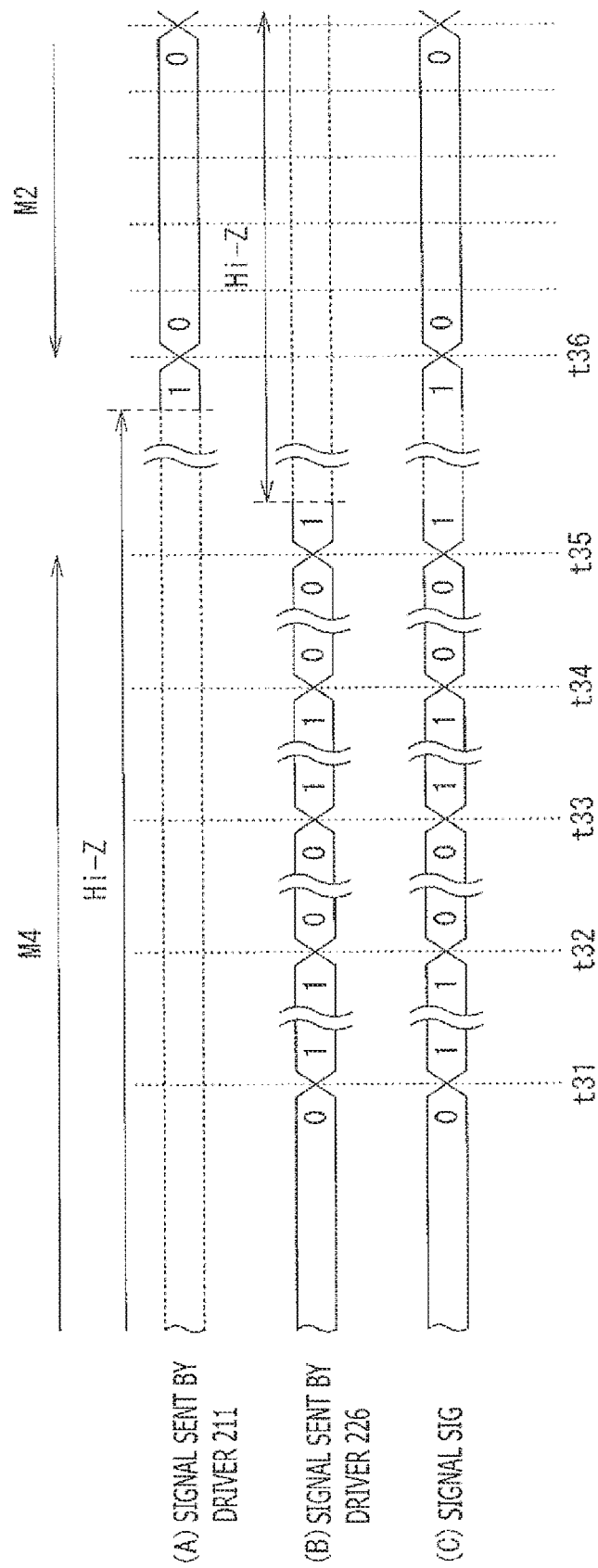

[Fig. 13]
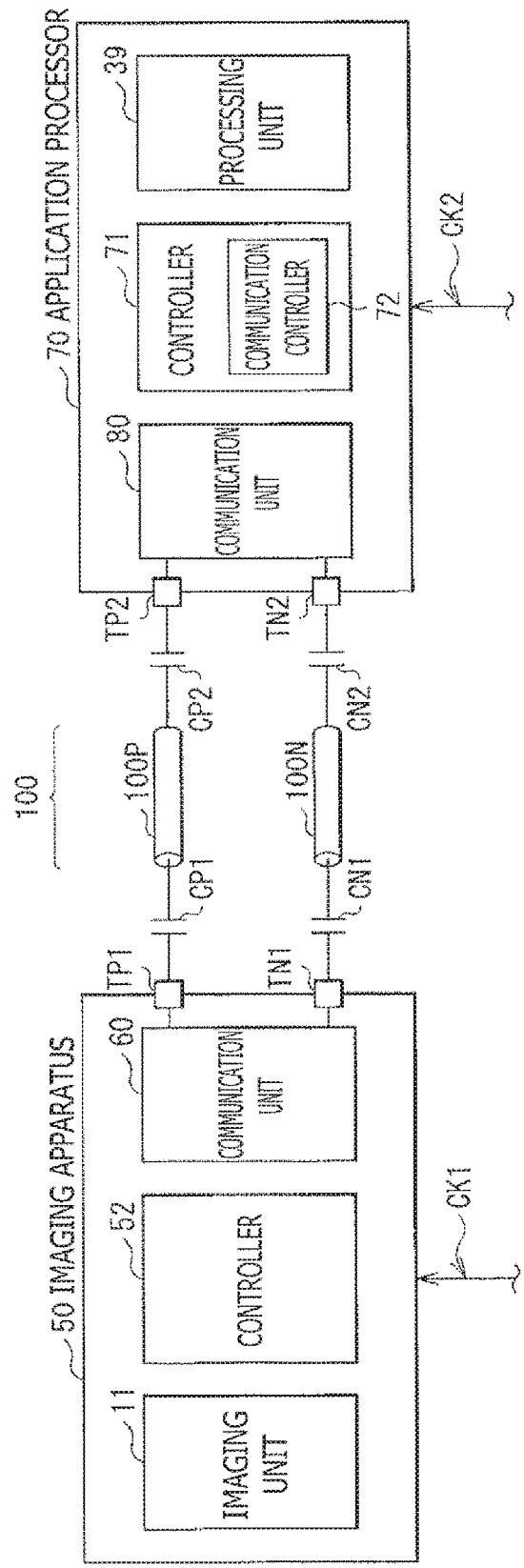

[Fig. 14]
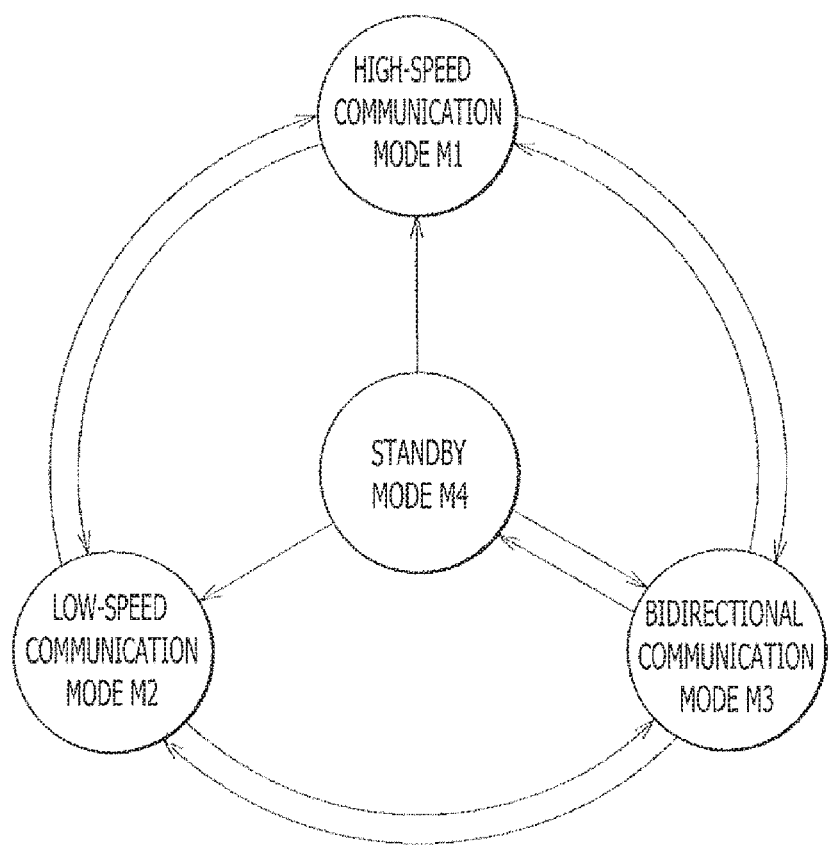

[Fig. 15]
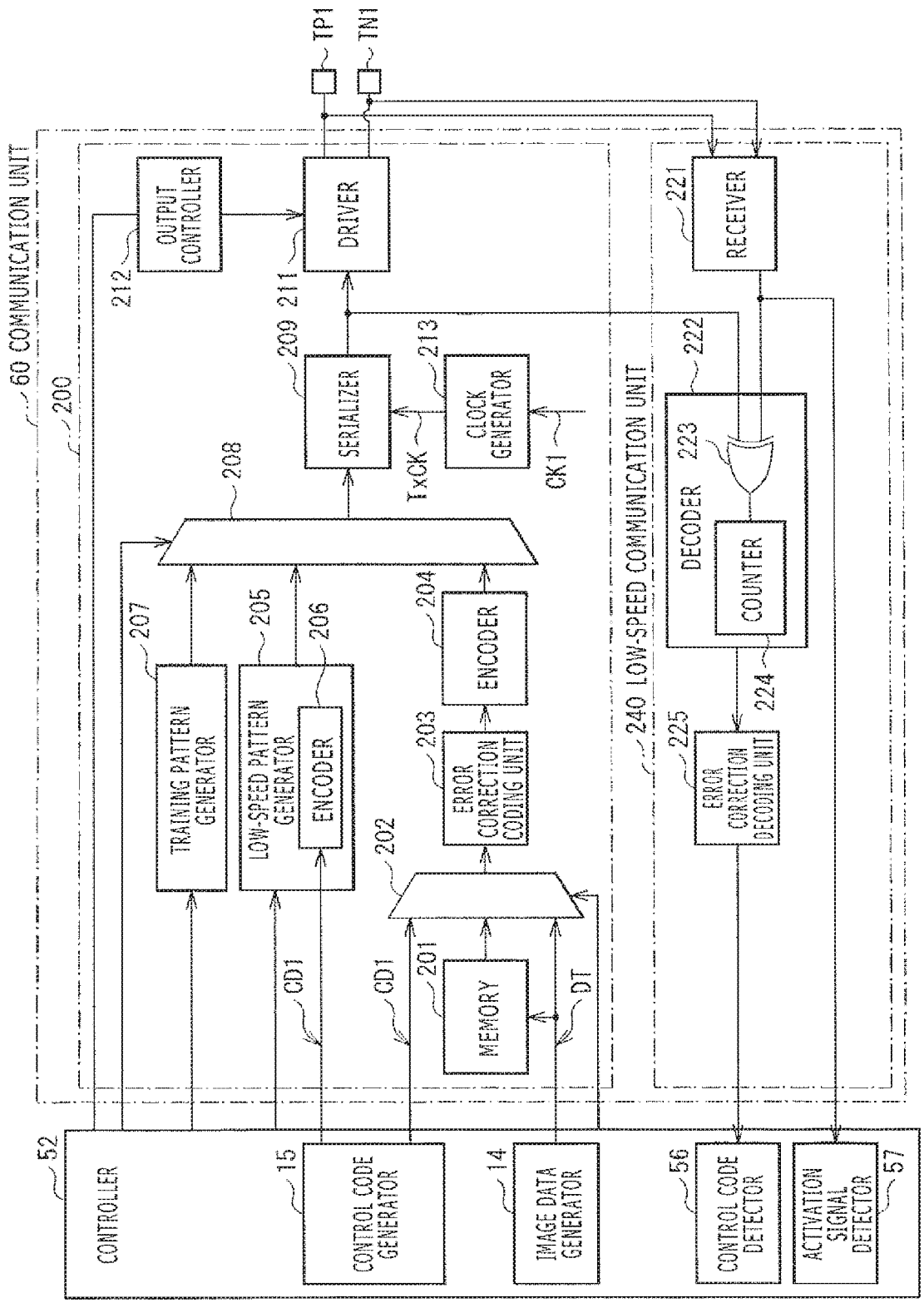

[Fig. 16]
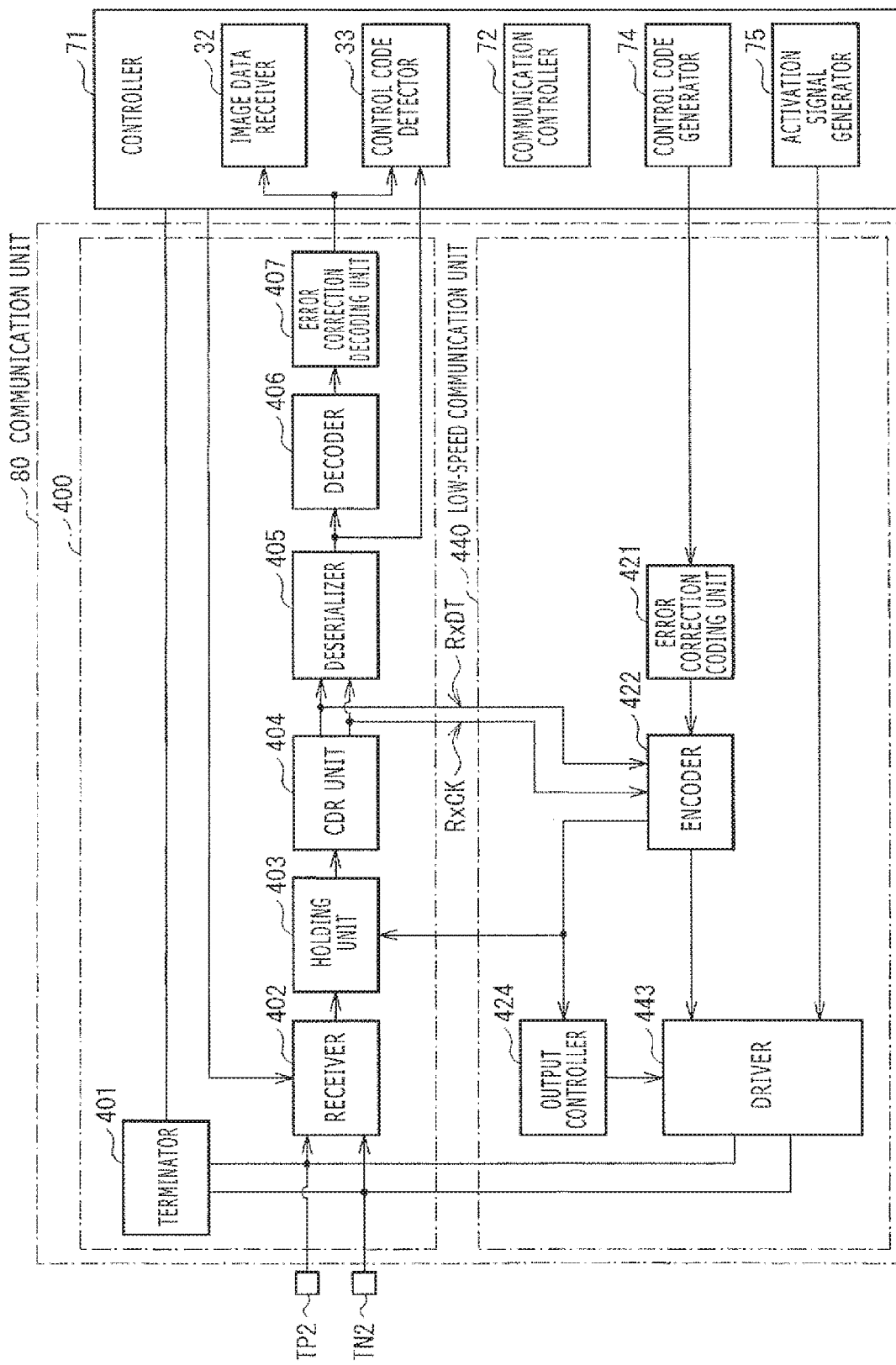

[Fig. 17]
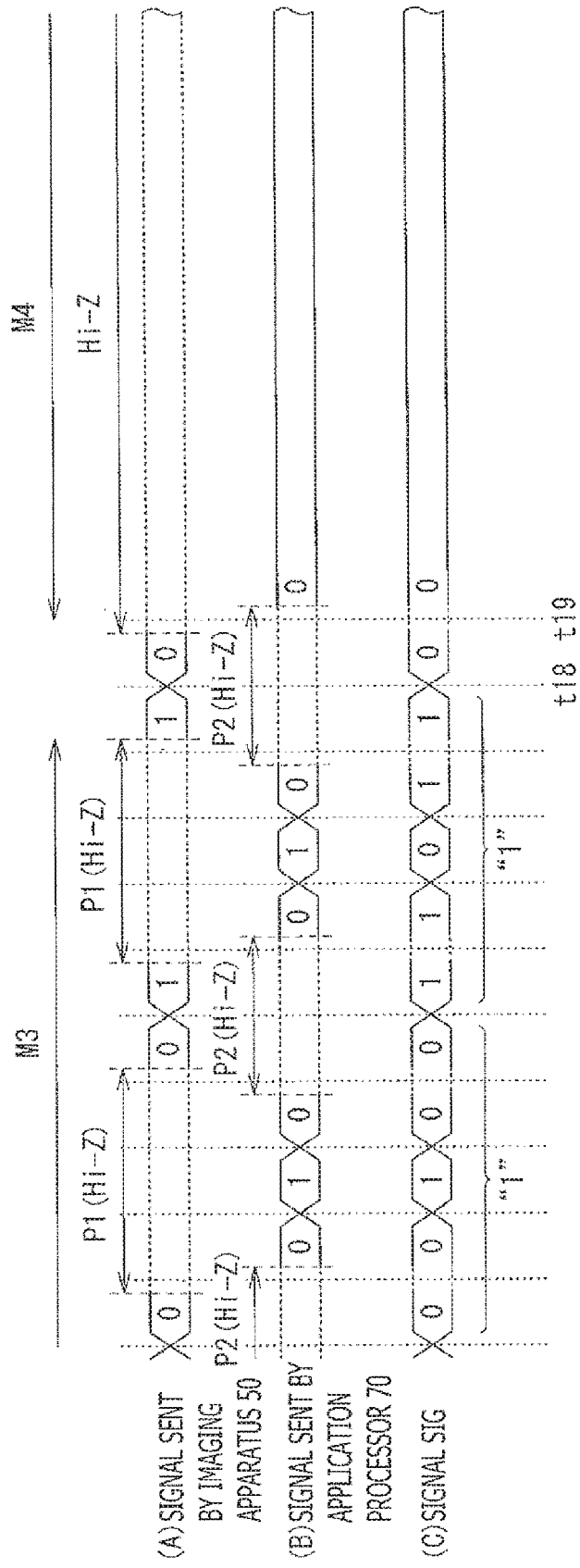

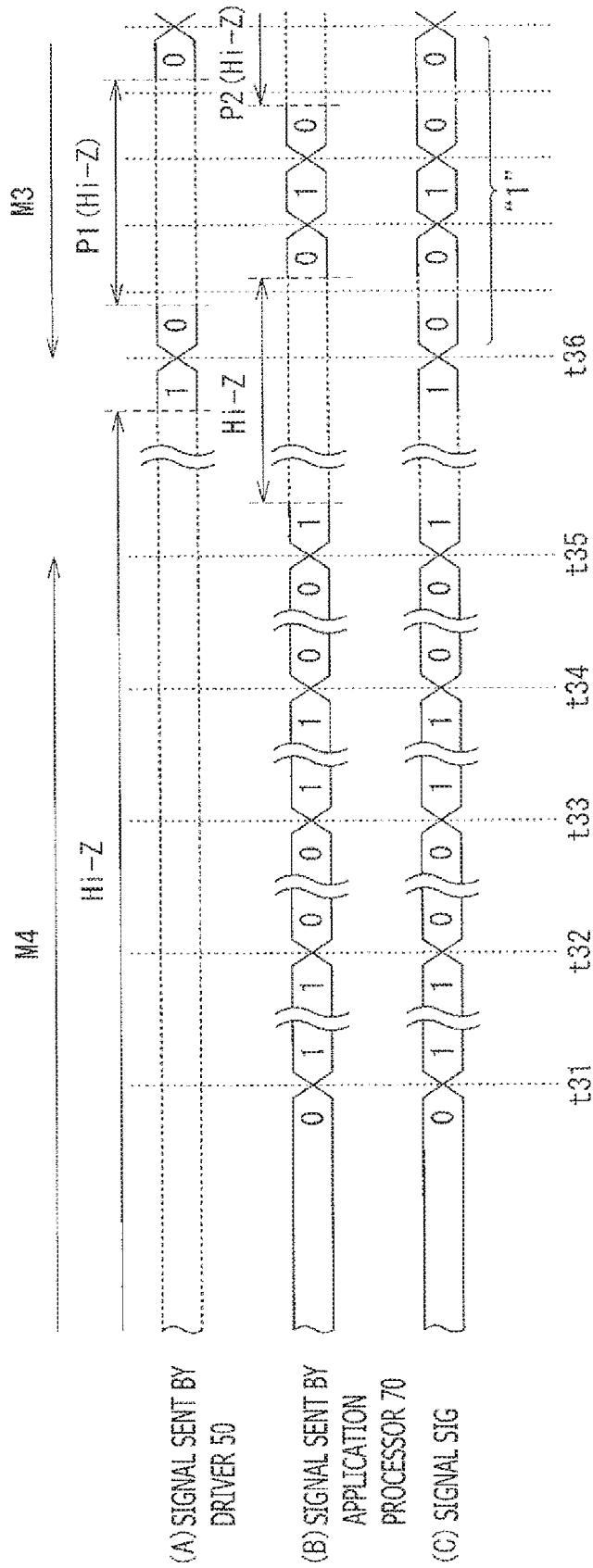
[Fig. 18]

[Fig. 19]
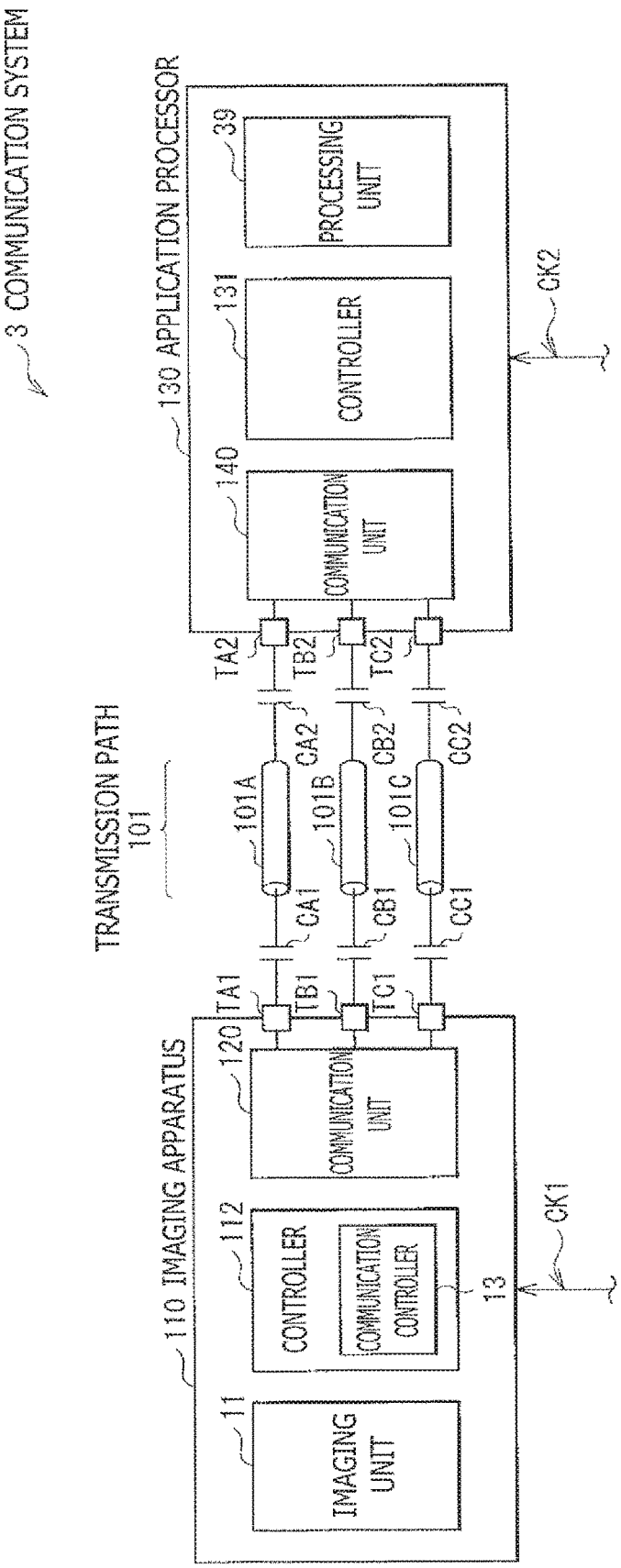

[Fig. 20]
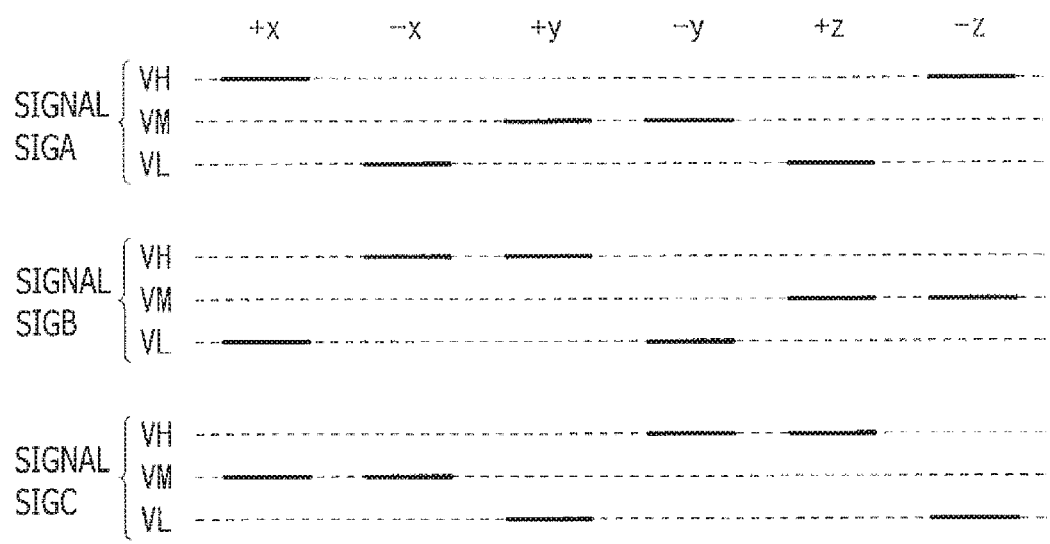

[Fig. 21]
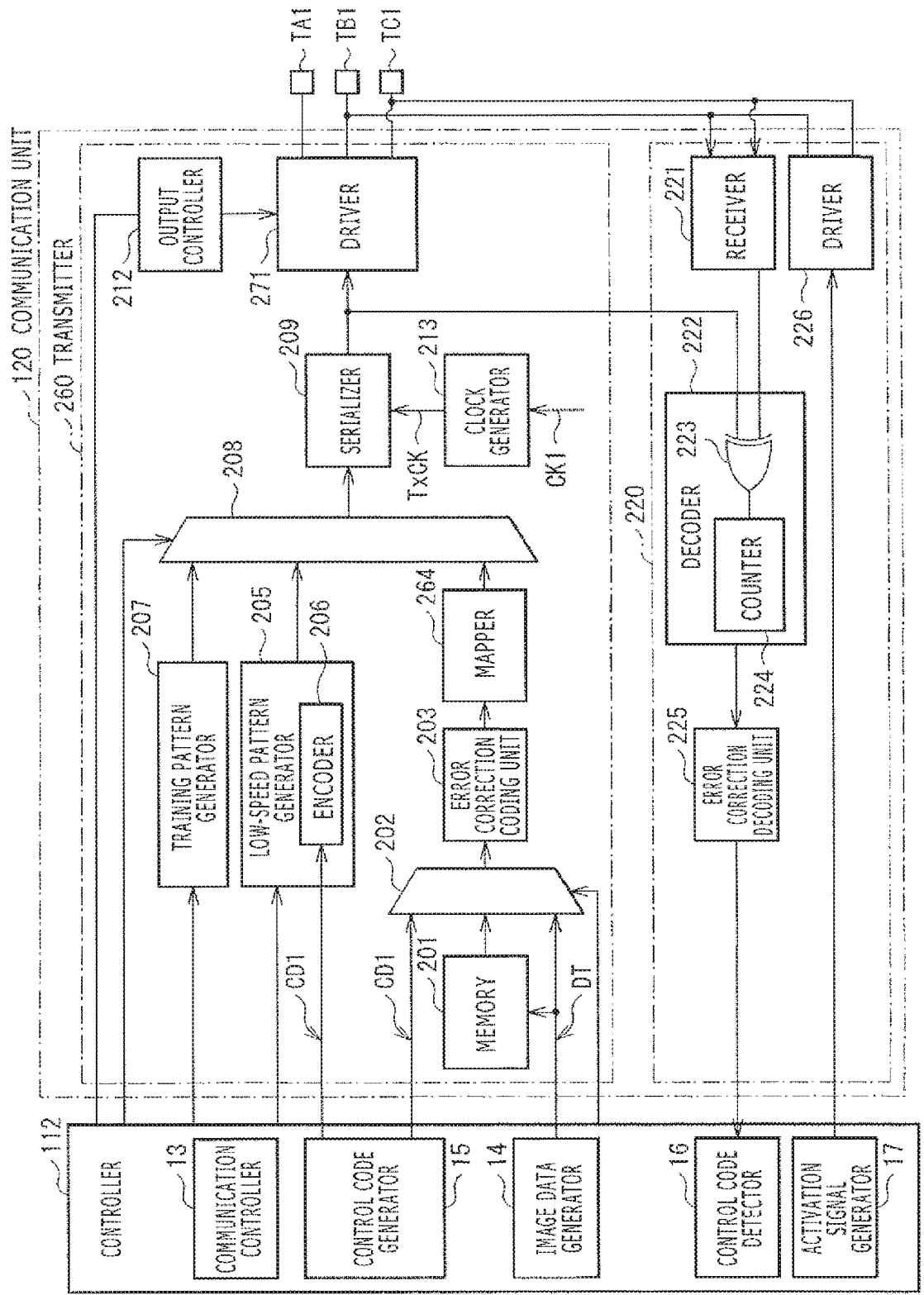

[Fig. 22]
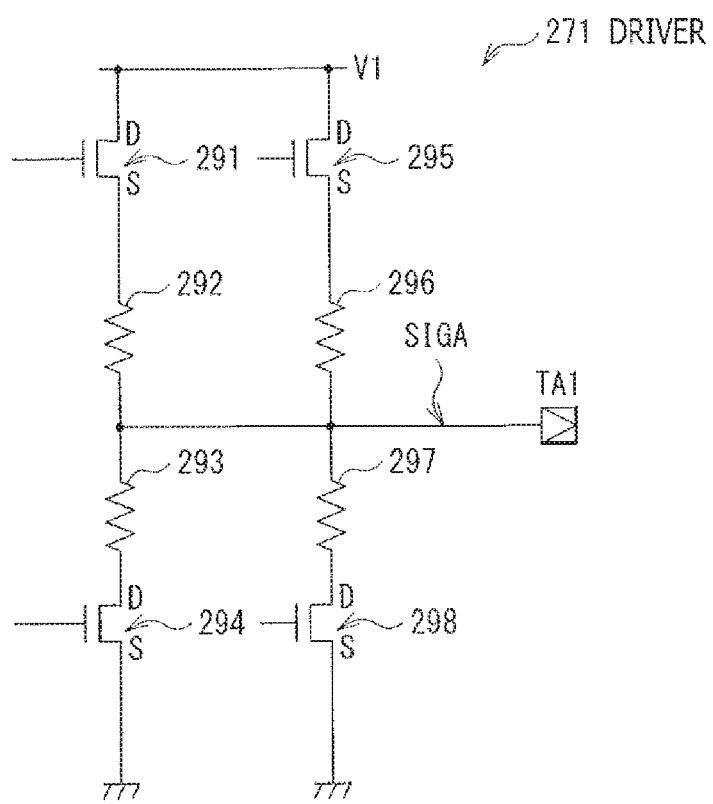

[Fig. 23]
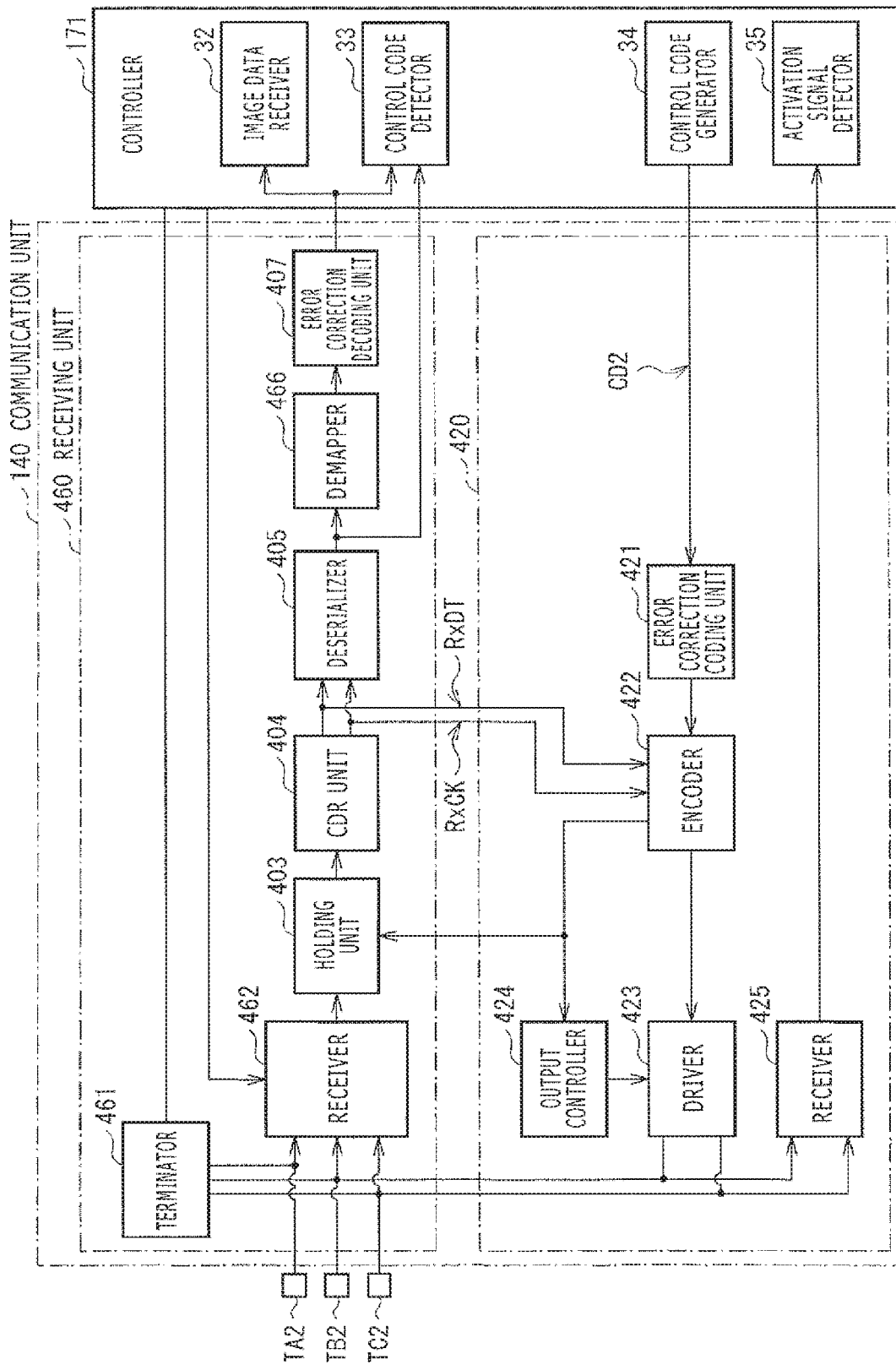

[Fig. 24]
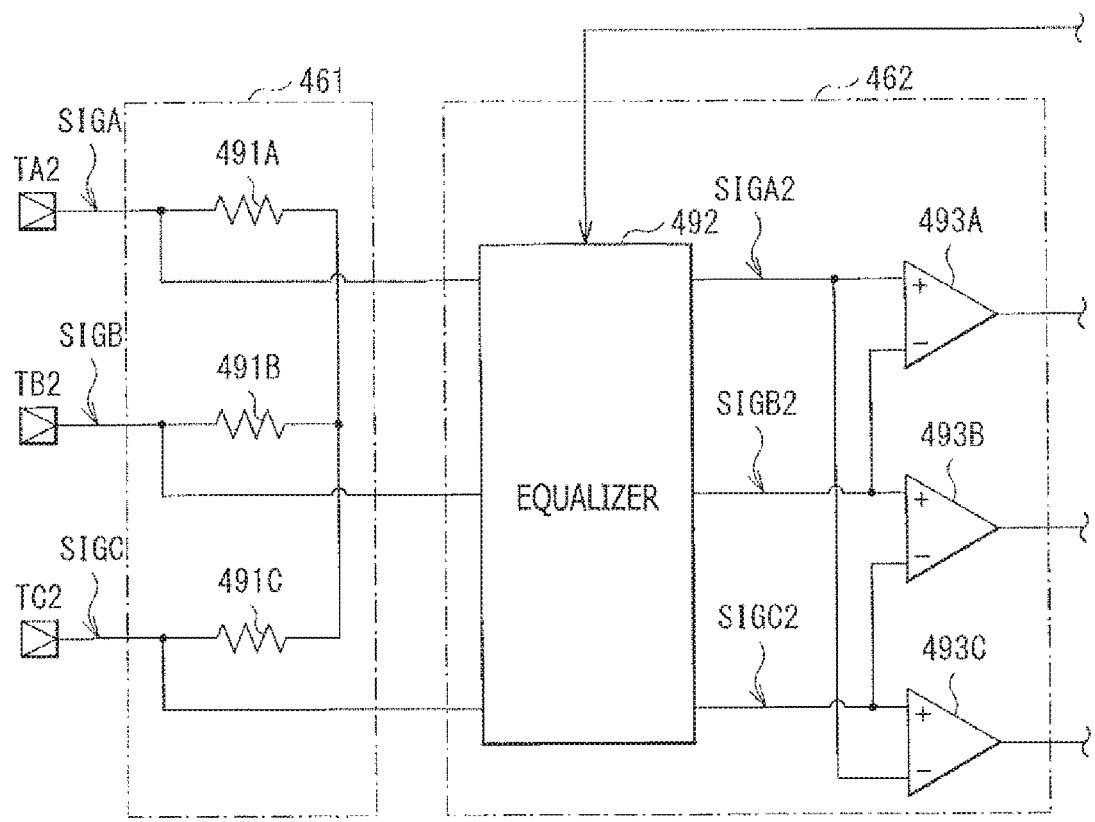

[Fig. 25]
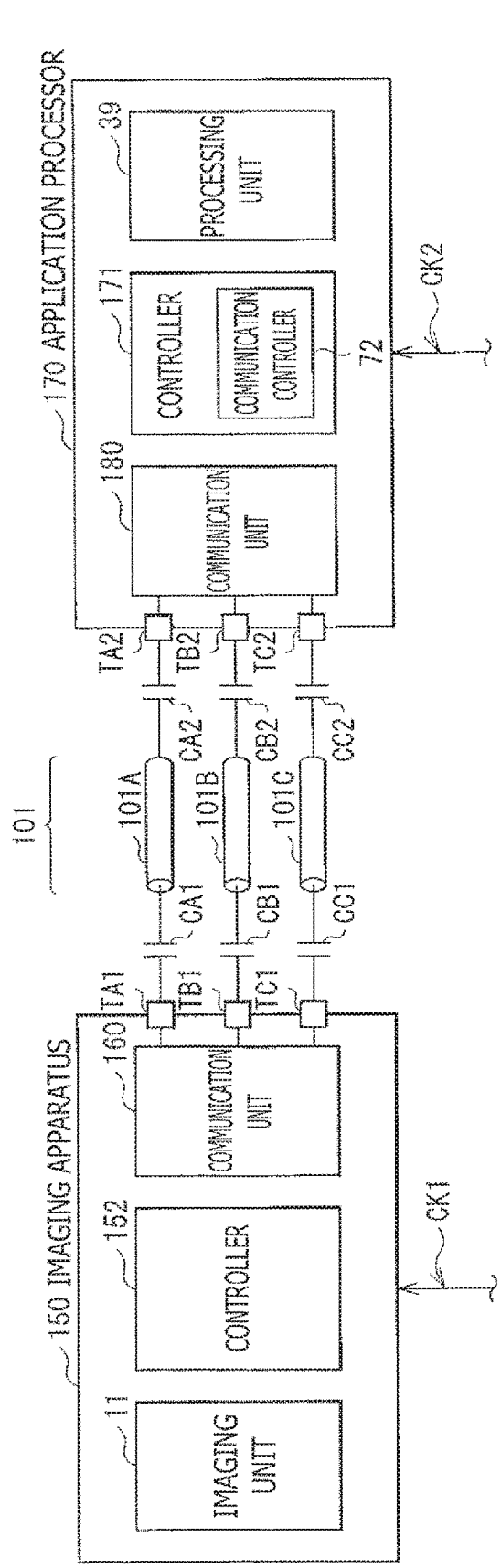

[Fig. 26]
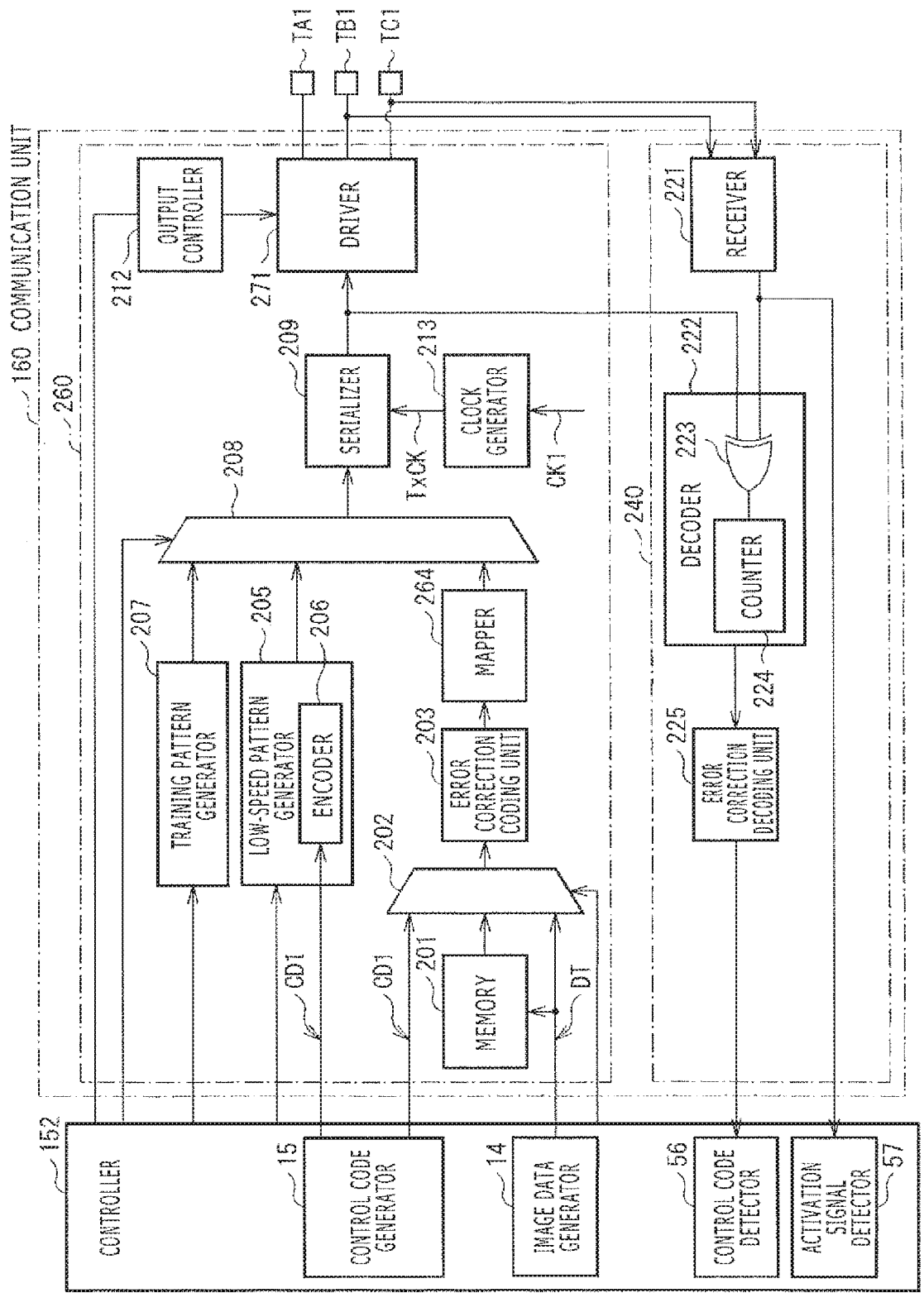

[Fig. 27]
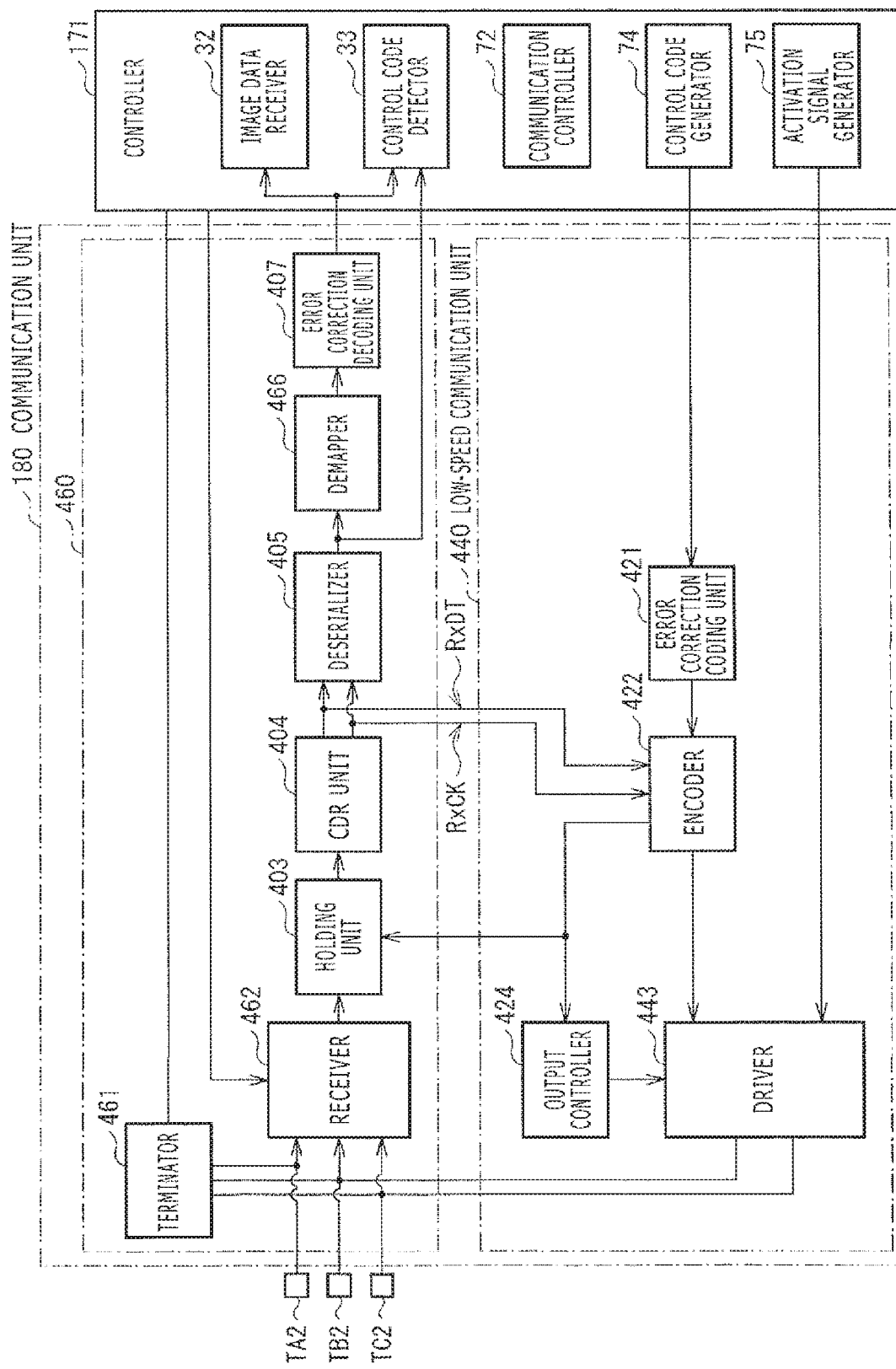

[Fig. 28]
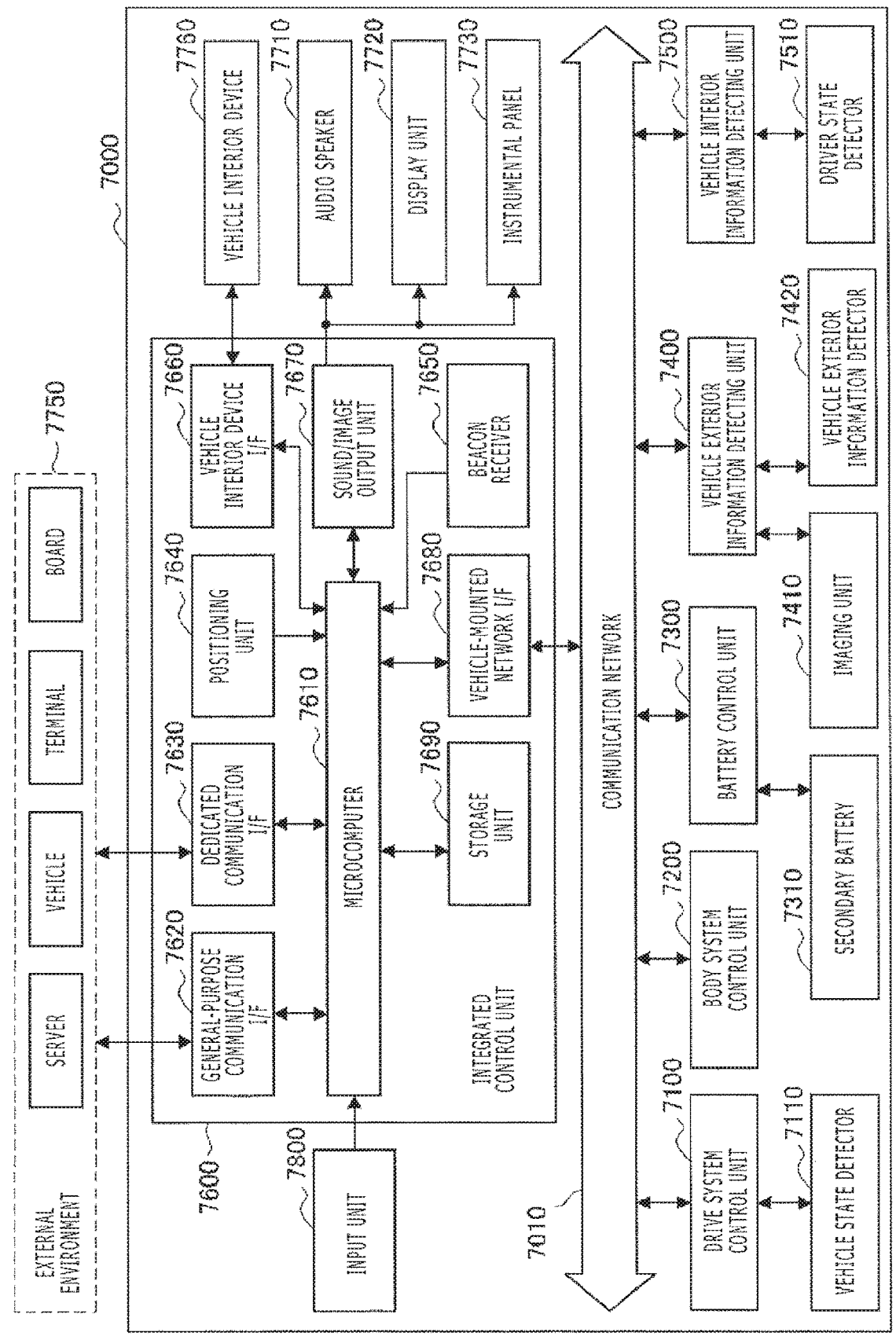

[Fig. 29]
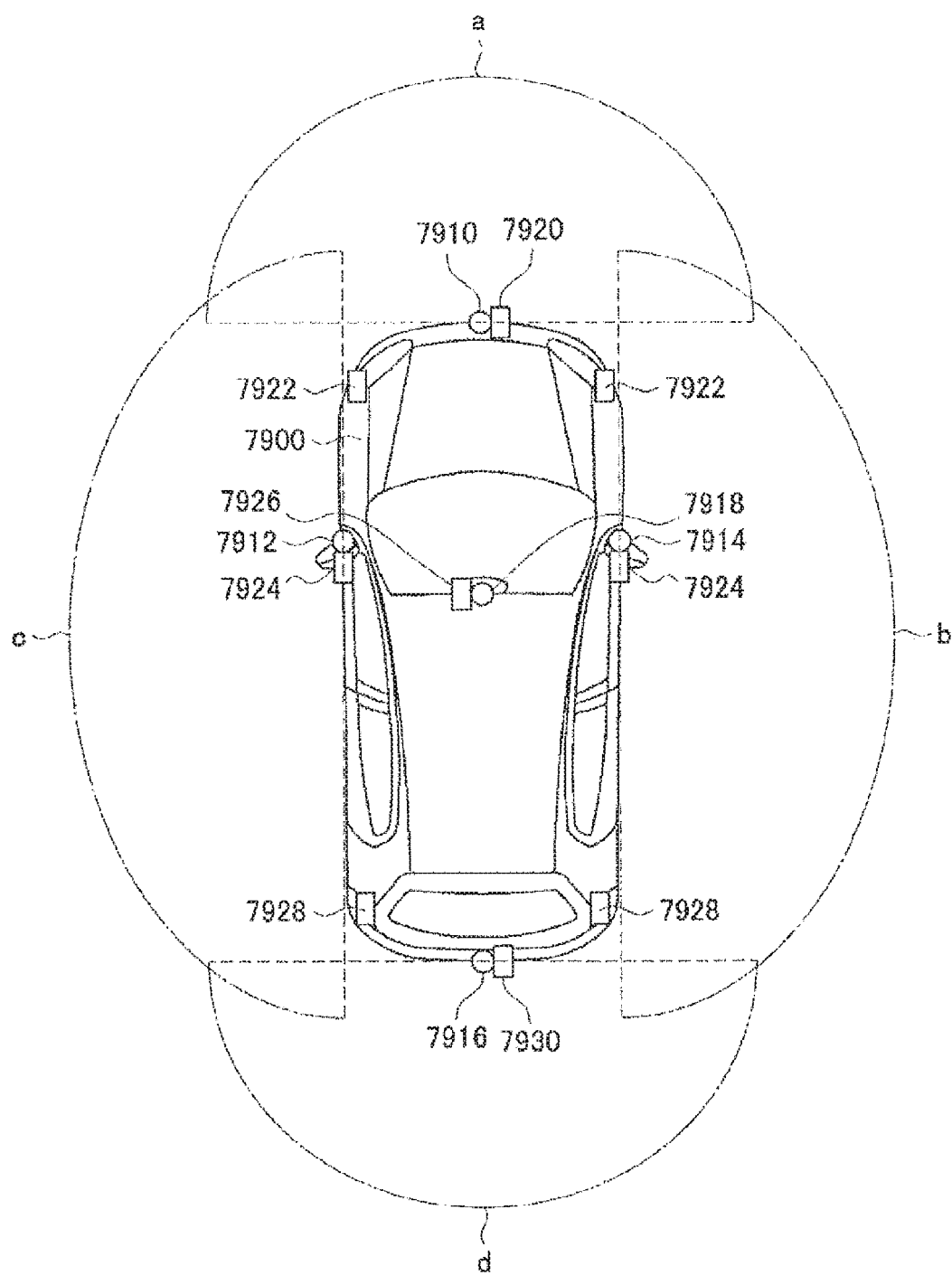

COMMUNICATION APPARATUS AND COMMUNICATION SYSTEM

TECHNICAL FIELD

The present disclosure relates to a communication apparatus and a communication system.

BACKGROUND ART

In recent years, there have been demands for high-speed interfaces capable of sending and receiving signals at several Gbps and of consuming low electric power. To meet such demands, efforts are in progress to establish standards such as C-PHY standards and D-PHY standards formulated by MIPI (Mobile Industry Processor Interface) alliance, for example, (PTL 1).

CITATION LIST

Patent Literature

[PTL 1]
JP-T-2014-522204

SUMMARY

Technical Problem

Incidentally, communication systems for long transmission distances often transmit signals through capacitive elements. In this case, it is also desirable for the communication systems to operate with low electric power consumption.

It is preferable to provide communication apparatus and communication systems that are capable of reducing the consumption of electric power.

Solution to Problem

A first communication apparatus according to an embodiment of the present disclosure includes a transmitter and a controller. The transmitter serves to generate a first signal including communication data and sends the first signal through a communication terminal in a first operation mode, and serves to generate a second signal including a predetermined first signal pattern and having a transition rate lower than the first signal and to send the second signal through the communication terminal in a second operation mode. The controller serves to set an operation mode for the transmitter to either of a plurality of operation modes including the first operation mode and the second operation mode.

A second communication apparatus according to an embodiment of the present disclosure includes a receiving unit and a controller. The receiving unit serves to receive a first signal including communication data through a communication terminal in a first operation mode, and serves to receive a second signal including a predetermined first signal pattern and having a transition rate lower than the first signal through the communication terminal in a second operation mode. The controller serves to set an operation mode for the receiving unit to either of a plurality of operation modes including the first operation mode and the second operation mode.

A communication system according to an embodiment of the present disclosure includes a first communication apparatus and a second communication apparatus. The first communication apparatus includes a transmitter and a first controller. The transmitter serves to generate a first signal including communication data and send the first signal through a first communication terminal in a first operation mode, and serves to generate a second signal including a predetermined first signal pattern and having a transition rate lower than the first signal and to send the second signal through the first communication terminal in a second operation mode. The first controller serves to set an operation mode for the transmitter to either of a plurality of operation modes including the first operation mode and the second operation mode. The second communication apparatus includes a receiving unit and a second controller. The receiving unit serves to receive the first signal through a second communication terminal in the first operation mode, and serves to receive the second signal through the second communication terminal in the second operation mode. The second controller serves to set an operation mode for the receiving unit to either of the plurality of operation modes.

In the first communication apparatus and the communication system according to the embodiment of the present disclosure, an operation mode of the transmitter is set. In the first operation mode, the first signal including the communication data is generated, and the first signal is sent through the communication terminal. In the second operation mode, the second signal including the predetermined first signal pattern and having the transition rate lower than the first signal is generated, and the second signal is sent through the communication terminal.

In the second communication apparatus and the communication system according to the embodiment of the present disclosure, an operation mode of the receiving unit is set. In the first operation mode, the first signal including the communication data is received. In the second operation mode, the second signal including the predetermined first signal pattern and having the transition rate lower than the first signal is received.

Advantageous Effect of Invention

With the first communication apparatus and the communication system according to the embodiment of the present disclosure, the consumption of electric power is reduced because the second signal including the predetermined first signal pattern and having the transition rate lower than the first signal is sent in the second operation mode.

With the second communication apparatus and the communication system according to the embodiment of the present disclosure, the consumption of electric power is reduced because the second signal including the predetermined first signal pattern and having the transition rate lower than the first signal is received in the second operation mode.

Incidentally, the advantages described here are not necessarily restrictive, but any of the advantages described in the present disclosure are applicable.

BRIEF DESCRIPTION OF DRAWINGS

FIG. 1 is a block diagram depicting a configurational example of a communication system according to a first embodiment of the present disclosure.

FIG. 2A is a diagram depicting an example of transmission format in the communication system depicted in FIG. 1.

FIG. 2B is a diagram depicting another example of transmission format in the communication system depicted in FIG. 1.

FIG. 2C is a diagram depicting an example of frame format in the communication system depicted in FIG. 1.

FIG. 3 is a diagram depicting an example of operation modes of the communication system depicted in FIG. 1.

FIG. 4 is a block diagram depicting a configurational example of a communication unit in an imaging apparatus depicted in FIG. 1.

FIG. 5A is a waveform diagram depicting an example of low-speed pattern generated by a low-speed pattern generator depicted in FIG. 4.

FIG. 5B is a waveform diagram depicting another example of low-speed pattern generated by the low-speed pattern generator depicted in FIG. 4.

FIG. 6 is a block diagram depicting a configurational example of a communication unit in an application processor depicted in FIG. 1.

FIG. 7 is a waveform diagram depicting an example of low-speed pattern.

FIG. 8 is a waveform diagram depicting an example of operation of the communication system depicted in FIG. 1.

FIG. 9 is a timing waveform diagram depicting another example of operation of the communication system depicted in FIG. 1.

FIG. 10 is a timing waveform diagram depicting another example of operation of the communication system depicted in FIG. 1.

FIG. 11 is a timing waveform diagram depicting another example of operation of the communication system depicted in FIG. 1.

FIG. 12 is a timing waveform diagram depicting another example of operation of the communication system depicted in FIG. 1.

FIG. 13 is a block diagram depicting a configurational example of a communication system according to a second embodiment.

FIG. 14 is a diagram depicting an example of operation modes of the communication system depicted in FIG. 13.

FIG. 15 is a block diagram depicting a configurational example of a communication unit in an imaging apparatus depicted in FIG. 13.

FIG. 16 is a block diagram depicting a configurational example of a communication unit in an application processor depicted in FIG. 13.

FIG. 17 is a timing waveform diagram depicting an example of operation of the communication system depicted in FIG. 13.

FIG. 18 is a timing waveform diagram depicting another example of operation of the communication system depicted in FIG. 13.

FIG. 19 is a block diagram depicting a configurational example of a communication system according to a third embodiment.

FIG. 20 is a diagram depicting an example of signals in the communication system depicted in FIG. 19.

FIG. 21 is a block diagram depicting a configurational example of a communication unit in an imaging apparatus depicted in FIG. 19.

FIG. 22 is a circuit diagram depicting a configurational example of a driver depicted in FIG. 21.

FIG. 23 is a block diagram depicting a configurational example of a communication unit in an application processor depicted in FIG. 19.

FIG. 24 is a circuit diagram depicting a configurational example of a terminator and a receiver depicted in FIG. 23.

FIG. 25 is a block diagram depicting a configurational example of a communication system according to a fourth embodiment.

FIG. 26 is a block diagram depicting a configurational example of a communication unit in an imaging apparatus depicted in FIG. 25.

FIG. 27 is a block diagram depicting a configurational example of a communication unit in an application processor depicted in FIG. 25.

FIG. 28 is a block diagram of an example of general configuration of a vehicle control system.

FIG. 29 is a view depicting an example of installed positions of a vehicle exterior information detector and an imaging unit.

DESCRIPTION OF EMBODIMENTS

Embodiments of the present disclosure will be described in detail below with reference to the drawings. The description will be given in the following order:
1. First embodiment (an example in which an imaging apparatus controls operation of a communication system)
2. Second embodiment (an example in which an application processor controls operation of a communication system)
3. Third embodiment (another example in which an imaging apparatus controls operation of a communication system)
4. Fourth embodiment (another example in which an application processor controls operation of a communication system)
5. Application 1. First Embodiment

[Configurational Example]

FIG. 1 depicts a configurational example of a communication system (communication system 1) according to a first embodiment. The communication system 1 is a communication system for transmitting image data. The communication system 1 includes an imaging apparatus 10, a transmission path 100, and an application processor 30. The imaging apparatus 10 has two terminals TP1 and TN1, the transmission path 100 has lines 100P and 100N, and the application processor 30 has two terminals TP2 and TN2. The terminal TP1 of the imaging apparatus 10 is connected to an end of the line 100P through a capacitive element CP1, and the terminal TN1 of the imaging apparatus 10 is connected to an end of the line 100N through a capacitive element CN1. The terminal TP2 of the application processor 30 is connected to the other end of the line 100P through a capacitive element CP2, and the terminal TN2 of the application processor 30 is connected to the other end of the line 100N through a capacitive element CN2. The lines 100P and 100N have respective characteristic impedances of approximately 50 [Ω] in this example. The communication system 1 transmits image data DT through the transmission path 100, using differential signals.

The imaging apparatus 10 has an imaging unit 11, a controller 12, and a communication unit 20. The imaging unit 11 includes a CMOS (Complementary Metal Oxide Semiconductor) image sensor, for example, and captures images. The controller 12 serves to control operation of the imaging apparatus 10. The controller 12 also functions as a state machine on a transmission side in communicating operation of the communication system 1. The controller 12 has a communication controller 13. The communication controller 13 controls the communicating operation of the communication system 1. The communication unit 20 serves to communicate with the application processor 30. The imaging apparatus 10 is supplied with a system clock signal CK1, and operates on the basis of the system clock signal CK1.

The application processor 30 has a communication unit 40, a controller 31, and a processing unit 39. The communication unit 40 serves to communicate with the imaging apparatus 10. The controller 31 serves to control operation of the application processor 30. The controller 31 also functions as a state machine on a reception side in communicating operation of the communication system 1. The processor 39 performs various processes based on data received by the communication unit 40. The application processor 30 is supplied with a system clock signal CK2, and operates on the basis of the system clock signal CK2.

FIG. 2A depicts an example of transmission format for transmitting the image data DT, and FIG. 2B depicts another example of transmission format. The imaging apparatus 10 sends the image data DT of frame images captured by the imaging unit 11 to the application processor 30 in respective frame periods PF. At that time, the imaging apparatus 10 sends the image data DT using packets P including one line of image data DT among the image data DT of frame images. According to the example depicted in FIG. 2A, in a frame period PF, after one packet P is sent, an H blanking period PH is established, and then a next packet P is sent. Then, in the frame period PF, after the final packet P is sent, a V blanking period PV is established. According to the example depicted in FIG. 2B, in a frame period PF, after one packet P is sent, a next packet P is sent. Then, in the frame period PF, after the final packet P is sent, a V blanking period PV is established.

FIG. 2C depicts an example of frame format, which corresponds to FIG. 2A. A packet P includes a packet header PH and a packet footer PF in addition to one line of image data DTE. In the communication system 1, after a frame start FS is transmitted, a plurality of packets P related to one frame image, for example, are transmitted, and then a frame end FE is transmitted.

In this example, the imaging apparatus 10 sends the image data DT of frame images to the application processor 30. However, the disclosure is not restrictive. The imaging apparatus 10 may send the image data of an image that is part of a frame image, for example. In such a case, the duration of a certain packet P can be shorter than the duration of another certain packet P. Similarly, the duration of an H blanking period PH can be shorter than the duration of another H blanking period PH, and the duration of a V blanking period PV can be shorter than the duration of another V blanking period PV.

FIG. 3 depicts a plurality of operation modes M of the communication system 1 and transitions between the operation modes M. The communication system 1 has four operation modes M (a high-speed communication mode M1, a low-speed communication mode M2, a bidirectional communication mode M3, and a standby mode M4).

In the high-speed communication mode M1, the imaging apparatus 10 sends signals at a high symbol rate to the application processor 30. In this example, the imaging apparatus 10 sends packets P (image data DT) in the high-communication mode M1.

In the low-speed communication mode M2, the imaging apparatus 10 sends signals at a low symbol rate to the application processor 30. In this example, the communication system 1 operates in the low-speed communication mode M2 during the H blanking periods PH and periods in which the image data DT stop being sent, for example.

Furthermore, if the transmission format depicted in FIG. 2B is used, then the low-speed communication mode M2 may be used as a delimiter for the packets P.

In the bidirectional communication mode M3, the imaging apparatus 10 sends signals at a low symbol rate to the application processor 30, and the application processor 30 sends signals at a low symbol rate to the imaging apparatus 10. In this example, the communication system 1 operates in the bidirectional communication mode M3 during the V blanking periods PV and periods in which the image data DT stop being sent, for example.

In the standby mode M4, the electric power consumption of the communication system 1 is reduced by stopping operation of some circuits of the communication unit 20 and stopping operation of some circuits of the communication unit 40, for example.

In the communication system 1, the communication controller 13 of the imaging apparatus 10 selects either one of the four operation modes M, thereby establishing its operation mode M. The imaging apparatus 10 then informs the application processor 30 of the operation mode M to be established, using a control code CD11 (to be described later). In the communication system 1, the imaging apparatus 10 and the application processor 30 are thus capable of operating in the operation mode M established by the communication controller 13.

In this example, the imaging apparatus 10 and the application processor 30 individually operate according to the transition diagram of the operation modes M depicted in FIG. 3. However, the disclosure is not restrictive. A transition diagram for the operation modes M of the imaging apparatus 10 and a transition diagram for the operation modes M of the application processor 30 may be different from each other, for example.

In this example, the present technology is applied to communication between the imaging apparatus 10 and the application processor 30. However, the disclosure is not restrictive. Instead, the present technology may be applied to communication between an application processor and a display that displays images based on image data supplied from the application processor. In such a case, a transition diagram for the operation modes M of the application processor and a transition diagram for the operation modes M of the display may be the same as or different from each other.

(Imaging Apparatus 10)

FIG. 4 depicts a configurational example of the controller 12 and the communication unit 20 in the imaging apparatus 10. Each of the blocks of the controller 12 and the communication unit 20 is constructed using semiconductor circuits, for example.

The controller 12 has, in addition to the communication controller 13, an image data generator 14, a control code generator 15, a control code detector 16, and an activation signal generator 17.

The image data generator 14 generates image data DT to be sent to the application processor 30 in the high-speed communication mode M1. The image data generator 14 supplies the generated image data DT to the communication unit 20.

The control code generator 15 generates a control code CD1 to be sent to the application processor 30 on the basis of a command from the communication controller 13. Specifically, control codes CD1 include control codes CD11 and CD12, for example. The control code CD11 serves to indicate that operation modes M be changed. The control code CD12 serves to indicate whether a terminating resistor in the communication unit 40 of the application processor 30 is to be valid or invalid. The control code generator 15 then supplies the generated control code CD1 to the communication unit 20.

The control code detector 16 serves to detect a control code CD2 sent from the application processor 30 via the communication unit 20. Specifically, control codes CD2 include control codes CD21 and CD22, for example. The control code CD21 serves to indicate that the image data DT be sent again. The control code CD22 serves to indicate that a training pattern used for a receiver 402 (to be described later) of the application processor 30 to adjust equalizer settings be sent.

The activation signal generator 17 serves to generate an activation signal for activating the application processor 30 on the basis of a command from the communication controller 13 in the standby mode M4. The activation signal generator 17 then supplies the generated activation signal to the communication unit 20.

The communication unit 20 has a transmitter 200 and a low-speed communication unit 220. The transmitter 200 serves to send signals to the application processor 30 in the high-speed communication mode M1, the low-speed communication mode M2, and the bidirectional communication mode M3. The low-speed communication unit 220 serves to receive signals sent from the application processor 30 in the bidirectional communication mode M3. The low-speed communication unit 220 also has a function to send an activation signal to the application processor 30.

The transmitter 200 has a clock generator 213, a memory 201, a selector 202, an error correction coding unit 203, an encoder 204, a low-speed pattern generator 205, a training pattern generator 207, a selector 208, a serializer 209, a driver 211, and an output controller 212. The memory 201, the selector 202, the error correction coding unit 203, the encoder 204, and the training pattern generator 207 operate in the high-speed communication mode M1. The low-speed pattern generator 205 operates in the low-speed communication mode M2 and the bidirectional communication mode M3.

The clock generator 213 is constructed using a PLL (Phase Locked Loop), for example, and serves to generate a clock signal TxCK based on the system clock signal CK1. The clock generator 213 then supplies the clock signal TxCK to the serializer 209. Although the clock generator 213 supplies the clock signal TxCK to the serializer 209 in this example, the disclosure is not restrictive. The clock generator 213 may supply the clock signal TxCK or a frequency-divided clock signal thereof to another circuit.

The memory 201 serves to temporarily store the image data DT supplied from the image data generator 14 of the controller 12. When the imaging apparatus 10 receives the control code CD21 indicating that the image data DT be sent again from the application processor 30, the memory 201 supplies the stored image data DT to the selector 202 on the basis of a command from the controller 12.

The selector 202 selects one of a signal including the image data DT supplied from the image data generator 14 of the controller 12, a signal including the image data DT supplied from the memory 201, and a signal including the control code CD1 supplied from the control code generator 15 of the controller 12, on the basis of a command from the controller 12. The selector 202 then supplies the selected signal to the error correction coding unit 203.

The error correction coding unit 203 serves to perform an error correction coding process on the output signal from the selector 202. The error correction coding unit 203 then supplies a processed signal to the encoder 204. The encoder 204 performs an encoding process such as 8B10B conversion or the like, for example, on the output signal from the error correction coding unit 203. The encoder 204 then supplies a processed signal to the selector 208.

The low-speed pattern generator 205 serves to generate a low-speed pattern PAT having a low transition rate in the low-speed communication mode M2 and the bidirectional communication mode M3.

FIG. 5A depicts the waveform of a low-speed pattern PAT1 which is an example of the low-speed pattern PAT, and FIG. 5B depicts the waveform of a low-speed pattern PAT2 which is another example of the low-speed pattern PAT. In FIGS. 5A and 5B, the waveforms of the low-speed patterns PAT1 and PAT2 after they have been serialized by the serializer 209 (to be described later) are illustrated. The low-speed pattern PAT1 includes five "0"s and five "1"s in the order named. In other words, the low-speed pattern PAT1 makes two transitions per 10 bits. The low-speed pattern PAT2 includes three "0"s, seven "1"s, seven "0"s, three "1"s, seven "0"s, and seven "1"s in the order named. In other words, the low-speed pattern PAT2 makes six transitions per 34 bits. In this way, the low-speed pattern generator 205 is arranged to be able to generate two low-speed patterns PAT1 and PAT2 having low transition rates in this example.

The low-speed pattern generator 205 has an encoder 206. The encoder 206 performs an encoding process based on the control code CD1 supplied from the control code generator 15 of the controller 12. Specifically, for example, the encoder 206 associates the low-speed pattern PAT1 with a value "1," associates the low-speed pattern PAT2 with a value "0," combines the low-speed patterns PAT1 and PAT2 on the basis of the values of the bits of the control code CD1, generating a low-speed pattern PAT.

With this arrangement, if the imaging apparatus 10 does not send a control code CD1, then the low-pattern generator 205 generates a low-speed pattern PAT that includes a repetition of low-speed patterns PAT1, for example, on the basis of a command from the controller 12. If the imaging apparatus 10 sends a control code CD1, then the low-pattern generator 205 generates a low-speed pattern PAT that includes a combination of low-speed patterns PAT1 and PAT2 depending on the control code CD1, on the basis of a command from the controller 12. The low-speed pattern generator 205 then supplies the generated low-speed pattern PAT to the selector 208.

The low-speed patterns PAT that can be generated by the low-speed pattern generator 205 are not limited to the low-speed patterns PAT1 and PAT2 depicted in FIGS. 5A and 5B, but may include various low-speed patterns having low transition rates. The encoding process of the encoder 206 is not limited to the above process, but the encoder 206 may employ various processes. For example, the encoder 206 may perform an encoding process which is a combination of the above process and 8B10B conversion. The low-speed pattern PAT should preferably be a pattern capable of keeping a DC balance.

The training pattern generator 207 serves to generate a training pattern on the basis of a command from the controller 12. Specifically, if the imaging apparatus 10 receives the control code CD22 indicating that a training pattern be sent from the application processor 30, then the training pattern generator 207 generates a training pattern on the basis of a command from the controller 12. The training pattern generator 207 then supplies the generated training pattern to the selector 208.

The selector 208 selects one of a signal supplied from the encoder 204, a signal including the low-speed pattern PAT supplied from the low-speed pattern generator 205, and a signal including the training pattern supplied from the training pattern generator 207, on the basis of a command from the controller 12. The selector 208 supplies the selected signal to the serializer 209.

The serializer 209 serves to serialize the output signal from the selector 208. The serializer 209 then supplies a serialized signal to the driver 211 and the low-speed communication unit 220.

The driver 211 serves to send the signal supplied from the serializer 209 to the application processor 30 through the terminals TP1 and TN1. The output impedances at respective output terminals of the driver 211 are set to approximately 50 [Ω] each. The driver 211 also has a function to set the output impedances to high impedances on the basis of a command from the controller 212.

The output controller 212 serves to control operation of the driver 211 to set the output impedances thereof to high impedances on the basis of a command from the controller 12 in the bidirectional communication mode M3. Specifically, the output controller 212 controls operation of the driver 211 to set the output impedances thereof to high impedances in predetermined periods P1 other than those periods which include timings at which the signal sent by the driver 211 makes a transition, on the basis of a command from the controller 12.

The low-speed communication unit 220 has a receiver 221, a decoder 222, an error correction decoding unit 225, and a driver 226.

The receiver 221 serves to receive signals sent from the application receiver 30 through the terminals TP1 and TN1 in the bidirectional communication mode M3. The receiver 221 has a terminating resistor that can be set to a valid or invalid setting. For example, the terminating resistor is rendered valid only during periods for receiving signals. Specifically, as described later, in the bidirectional communication mode M3, the receiver 221 receives signals sent from the application processor 30 in the predetermined periods P1 in which the output impedances of the driver 211 are set to high impedances. The receiver 221 is arranged to render the terminating resistor valid only during these periods. Furthermore, the receiver 221 is also able to make the terminating resistor invalid at all times on the basis of a command from the controller 12, for example.

The decoder 222 serves to perform a decoding process on the output signal from the serializer 209 and the output signal from the receiver 221. The decoder 222 has an exclusive-OR circuit (EX-OR) 223 and a counter 224. The exclusive-OR circuit 223 exclusive-ORs the output signal from the serializer 209 and the output signal from the receiver 221. The counter 224 performs a counting operation on the output signal from the exclusive-OR circuit 223. The decoder 222 performs a decoding process using the result of the counting operation. The decoder 222 is not limited to the illustrated configuration, but may employ various configurations.

The error correction decoding unit 225 carries out an error correction decoding process on the output signal from the decoder 222. The error correction decoding unit 225 then supplies a processed signal to the control code detector 16 of the controller 12.

The driver 226 outputs a DC signal in the standby mode M4, and sends the activation signal supplied from the activation signal generator 17 of the controller 12 to the application processor 30 through the terminals TP1 and TN1 upon recovery from the standby mode M4. The output impedances at respective output terminals of the driver 226 are set to approximately 50 [Ω] each. The driver 226 is arranged to set the output impedances to high impedances insofar as it does not output signals.

(Application Processor 30)

FIG. 6 depicts a configurational example of the communication unit 40 and the controller 31 in the application processor 30. Each of the blocks of the communication unit 40 and the controller 31 is constructed using semiconductor circuits, for example.

The communication unit 40 has a receiving unit 400 and a low-speed communication unit 420. The receiving unit 400 serves to receive signals sent from the imaging apparatus 10 in the high-speed communication mode M1, the low-speed communication mode M2, and the bidirectional communication mode M3. The low-speed communication unit 420 serves to send signals to the imaging apparatus 10 in the bidirectional communication mode M3. The low-speed communication unit 420 also has a function to receive the activation signal sent from the imaging apparatus 10.

The receiving unit 400 has a terminator 401, a receiver 402, a holding unit 403, a CDR (Clock and Data Recovery) unit 404, a deserializer 405, a decoder 406, and an error correction decoding unit 407.

The terminator 401 includes a terminating resistor connected to the terminal TP2 and a terminating resistor connected to the terminal TN2, and is arranged to be able to set these terminating resistors to a valid or invalid setting on the basis of a command from the controller 31. Specifically, if the application processor 30 receives the control code CD12 indicating that the terminating resistors be rendered valid or invalid from the imaging apparatus 10, then the terminator 401 renders these terminating resistors valid or renders these terminating resistors invalid on the basis of a command from the controller 31.

The receiver 402 serves to receive signals sent from the imaging apparatus 10 through the terminals TP2 and TN2. The receiver 402 is constructed using a so-called decision feedback equalizer (DFE), for example. For adjusting equalizer settings, the application processor 30 sends the control code CD22 indicating that a training pattern is sent to the imaging apparatus 10, and the imaging apparatus 10 sends a training pattern to the application processor 30 on the basis of the control code CD22. Based on a command from the controller 31, the receiver 402 now adjusts equalizer settings so as to be able to receive the training pattern at a low error rate.

The receiver 402 is arranged such that the output signal from the receiver 402 is not inverted when a differential input amplitude becomes equal to or smaller than a predetermined amplitude. Therefore, in case the differential input amplitude is small because the capacitive elements CP1, CP2, CN1, and CN2 have not sufficiently be charged, for example, the output signal of the receiver 402 can be maintained in the receiving unit 40. As a result, the risk of malfunctioning of circuits subsequent to the receiver 402 can be reduced. Comparison characteristics for comparing the differential input amplitude and the predetermined amplitude should preferably with each other should preferably have hysteresis characteristics, for example. This function can be set to a valid or invalid setting on the basis of a command from the controller 31, for example.

The holding unit 403 serves to output the output signal from the receiver 402 as it is or to hold the output signal from the receiver 402 and output the held signal, on the basis of a command from the low-speed communication unit 420.

Specifically, the holding unit 403 outputs the output signal from the receiver 402 as it is in the high-speed communication mode M1 and the low-speed communication mode M2. Furthermore, in the bidirectional communication mode M3, based on a command from the encoder 422, the holding unit 403 outputs the output signal from the receiver 402 as it is in predetermined periods P2 which include timings at which the output signal from the receiver 402 makes a transition, and holds the output signal from the receiver 402 and outputs the held signal in periods other than the predetermined periods P2.

The CDR unit 404 is constructed as including an PLL, for example, and serves to generate a clock signal RxCK and a data signal RxDT on the basis of the output signal from the holding unit 403. In this example, the CDR 404 is arranged to allow successive identical codes of approximately 7 bits. Specifically, even if the CDR unit 404 is supplied with the signals depicted in FIGS. 5A and 5B, the CDR unit 404 is able to stably generate a clock signal RxCK and a data signal RxDT. The CDR unit 404 then supplies the generated clock signal RxCK and data signal RxDT to the deserializer 405 and the low-speed communication unit 420. Although the CDR unit 404 supplies the clock signal RxCK to the deserializer 405 and the low-speed communication unit 420 in this example, the disclosure is not restrictive. The CDR unit 404 may supply the clock signal RxCK and a frequency-divided clock signal thereof to other circuits.

The deserializer 405 serves to deserialize the data signal RxDT. The deserializer 405 then supplies the deserialized signal to the decoder 406 and the controller 31.

The decoder 406 performs a decoding process such as 10B8B conversion or the like, for example, on the output signal from the deserializer 405. The decoder 406 then supplies a processed signal to the error correction decoding unit 407. The error correction decoding unit 407 performs an error correction decoding process on the output signal from the decoder 406. The error correction decoding unit 407 then supplies a processed signal to the controller 31.

The low-speed communication unit 420 has an error correction coding unit 421, an encoder 422, a driver 423, an output controller 424, and a receiver 425.

The error correction coding unit 421 performs an error correction coding process on a signal including the control code CD2 supplied from the controller 31. The error correction coding unit 421 then supplies a processed signal to the encoder 422.

The encoder 422 performs an encoding process on the output signal from the error correction coding unit 421, the data signal RxDT, and the clock signal RxCK. Specifically, if the value of the signal supplied from the error correction coding unit 421 is "1," then the encoder 422 outputs an inverted value of the value of the data signal RxDT in a period corresponding to one cyclic period of the clock signal RxCK, and if the value of the signal supplied from the error correction coding unit 421 is "0," then the encoder 422 outputs a value which is the same as the value of the data signal RxDT in a period corresponding to one cyclic period of the clock signal RxCK. Furthermore, the encoder 422 has a function to supply information about the predetermined periods P2 which include timings at which the output signal from the receiver 402 makes a transition, to the holding unit 403 and the output controller 424 on the basis of the data signal RxDT.

The driver 423 serves to send the output signal from the encoder 422 to the imaging apparatus 10 through the terminals TP2 and TN2. The output impedances at respective output terminals of the driver 423 are set to approximately 50 [Ω] each. The driver 423 also has a function to set the output impedances to high impedances on the basis of a command from the output controller 424.

The output controller 424 controls operation of the driver 423 to set the output impedances thereof to high impedances in the predetermined periods P2 which include timings at which the output signal from the receiver 402 makes a transition, on the basis of a command from the encoder 422 in the bidirectional communication mode M3. The output controller 424 also controls operation of the driver 423 to set the output impedances thereof to high impedances in the high-speed communication mode M1 and the low-speed communication mode M2.

The receiver 425 serves to receive the activation signal sent from the imaging apparatus 10 through the terminals TP2 and TN2. The receiver 425 then supplies the received activation signal to the controller 31.

The controller 31 has an image data receiver 32, a control code detector 33, a control code generator 34, and an activation signal detector 35. The image data receiver 32 serves to receive the image data DT included in the signal supplied from the error correction decoding unit 407. The control code detector 33 serves to detect the control code CD1 (control codes CD11 and CD12) included in the signals supplied from the deserializer 405 and the error correction decoding unit 407. While the encoder 26 of the low-speed pattern generator 205 is performing 8B10B conversion, for example, the control code detector 33 also performs a decoding process. The control code generator 34 generates a control code CD2 (control codes CD21 and CD22) and supplies the generated control code CD2 to the error correction coding unit 421. The activation signal detector 35 serves to detect the activation signal included in the output signal from the receiver 425. Specifically, the activation signal detector 35 detects the activation signal included in the output signal from the receiver 425 by oversampling the output signal from the receiver 425 using the system clock signal CK2, for example.

The imaging apparatus 10 corresponds to a specific example of "first communication apparatus" in the present disclosure. The application processor 30 corresponds to a specific example of "second communication apparatus" in the present disclosure. The high-speed communication mode M1 corresponds to a specific example of "first operation mode" in the present disclosure. The low-speed communication mode M2 corresponds to a specific example of "second operation mode" in the present disclosure. The bidirectional communication mode M3 corresponds to a specific example of "third operation mode" in the present disclosure. The standby mode M4 corresponds to a specific example of "fourth operation mode" in the present disclosure. The low-speed pattern PAT1 corresponds to a specific example of "first signal pattern" in the present disclosure. The low-speed pattern PAT2 corresponds to a specific example of "second signal pattern" in the present disclosure.

[Operation and Effects]

Operation and effects of the communication system 1 according to the present embodiment will now be described below.

(Outline of Overall Operation)

First, an outline of overall operation of the communication system 1 will be described below with reference to FIGS. 4 and 6.

In the high-speed communication mode M1, the imaging apparatus 10 sends image data DT and a control code CD1 (control codes CD11 and CD12) to the application processor 30. Specifically, in the imaging apparatus 10 (FIG. 4), the image data generator 14 generates image data DT, and the control code generator 15 generates a control code CD1 (control codes CD11 and CD12) based on a command from the communication controller 13. The transmitter 200 then sends a signal including the image data DT and the control code CD1 to the application processor 30. In the application processor 30 (FIG. 6), the receiving unit 400 receives the signal including the image data DT and the control code CD1 sent from the imaging apparatus 10. The image data receiver 32 receives the image data DT included in the signal supplied from the receiving unit 400, and the control code detector 33 detects the control code CD1 included in the signal supplied from the receiving unit 400.

In the low-speed communication mode M2, the imaging apparatus 10 sends a signal including a low-speed pattern PAT to the application processor 30. Specifically, if the imaging apparatus 10 is not to send a control code CD1 (control codes CD11 and CD12) to the application processor 30, then the transmitter 200 (FIG. 4) generates a low-speed pattern PAT that includes a repetition of low-speed patterns PAT1, and sends a signal including the low-speed pattern PAT to the application processor 30. The receiving unit 400 (FIG. 6) of the application processor 30 receives the signal including the low-speed pattern PAT sent from the imaging apparatus 10. If the imaging apparatus 10 is to send a control code CD1 to the application processor 30, then the control code generator 15 of the imaging apparatus 10 (FIG. 4) generates a control code CD1 on the basis of a command from the communication controller 13. The transmitter 200 then generates a low-speed pattern PAT that includes a combination of low-speed patterns PAT1 and PAT2 depending on the control code CD1, and sends a signal including the low-speed pattern PAT to the application processor 30. In the application processor 30 (FIG. 6), the receiving unit 400 receives the signal including the low-speed pattern PAT supplied from the imaging apparatus 10. The control code detector 33 detects the low-speed pattern PAT included in the signal supplied from the receiving unit 400, and detects the control code CD1 based on the low-speed pattern PAT.

In the bidirectional communication mode M3, the imaging apparatus 10 sends a signal including a low-speed pattern PAT to the application processor 30, and the application processor 30 sends a signal to the imaging apparatus 10. When the application processor 30 is to send a signal to the imaging apparatus 10, the control code generator 34 of the application processor 30 (FIG. 6) generates a control code CD2 (control codes CD21 and CD21), and the low-speed communication unit 420 sends a signal including the control code CD2 to the imaging apparatus 10. In the imaging apparatus 10 (FIG. 4), the low-speed communication unit 220 receives the signal including the control code CD2 sent from the application processor 30. The control code detector 16 then detects the control code CD2 included in the signal supplied from the low-speed communication unit 220.

In the standby mode M4, the circuits other than the driver 226 in the communication unit 20 (FIG. 4) of the imaging apparatus 10 stop operating, the circuits other than the receiver 425 in the communication unit 40 (FIG. 6) of the application processor 30 stop operating. For recovery from the standby mode M4, in the imaging apparatus 10 (FIG. 4), the activation signal generator 17 generates an activation signal based on a command from the communication controller 13, and the driver 226 of the low-speed communication unit 220 sends the activation signal to the application processor 30. In the application processor 30 (FIG. 6), the receiver 425 of the low-speed communication unit 420 receives the activation signal sent from the imaging apparatus 10, and the activation signal detector 35 detects the activation signal based on the signal supplied from the low-speed communication unit 420. The imaging apparatus 10 and the application processor 30 now recover from the standby mode M4.

Operation of the communication system 1 will now be described in detail below.

(Power-Up Operation)

When the communication system 1 is powered up, the communication system 1 has its operation mode M set to the standby mode M4. At this time, in the communication unit 20 of the imaging apparatus 10, the operation state of the circuits other than the driver 226 becomes a standby state, and in the communication unit 40 of the application processor 30, the operation state of the circuits other than the receiver 425 becomes a standby state.

Then, the communication controller 13 of the imaging apparatus 10 generates a setting selection signal SEL for selecting a setting information set INF to be used from a plurality of setting information sets INF. Specifically, the controller 12 of the imaging apparatus 10 has stored a plurality of setting information sets INF beforehand in a ROM (Read Only Memory) or the like, and the controller 31 of the application processor 30 likewise stores has stored a plurality of setting information sets INF beforehand in a ROM or the like. Each of the setting information sets INF includes information about various setting items. The setting items include, for example, transmission formats (e.g., FIGS. 2A and 2B) for transmitting image data DT, operation modes M in the H blanking periods PH, operation modes M in the V blanking periods PV, operation modes M immediately after recovery from the standby mode M4, valid or invalid settings for the terminating resistor in the terminator 401, etc. The controller 12 of the imaging apparatus 10 selects a setting information set INF depending on the setting selection signal SEL from the stored setting information sets INF, and sets the selected setting information set INF in a register.

The activation signal generator 17 of the imaging apparatus 10 generates an activation signal based on a command from the communication controller 13. At this time, the activation signal generator 17 includes the setting selection signal SEL in the activation signal. The driver 226 of the imaging apparatus 10 then sends the activation signal to the application processor 30.

In the application processor 30, the receiver 425 receives the activation signal. The activation signal detector 35 then detects the activation signal. At this time, the activation signal detector 35 detects the setting selection signal SEL included in the activation signal. Then, the controller 31 selects a setting information set INF depending on the setting selection signal SEL from the stored setting information sets INF, and sets the selected setting information set INF in a register.

Then, the controller 12 of the imaging apparatus 10 sets an operation mode M for the imaging apparatus 10 on the basis of the setting information set INF set in the register, and the communication unit 20 of the imaging apparatus 10 starts operating based on a command from the controller 12. Similarly, the controller 31 of the application processor 30 sets an operation mode M for the application processor 30 on the basis of the setting information set INF set in the register, and the communication unit 40 of the application processor 30 starts operating based on a command from the controller 31.

The communication system 1 is activated and starts to operate in this manner. In the communication system 1, after a predetermined time has elapsed, the clock generator 213 (FIG. 4) of the imaging apparatus 10 establishes phase synchronism, the capacitive elements CP1, CN1, CP2, and CN2 (FIG. 1) are charged, the equalizer settings of the receiver 402 are adjusted, and the CDR unit 404 (FIG. 6) of the application processor 30 establishes phase synchronism. As a result, the communication system 1 becomes able to communicate.

(High-Speed Communication Mode M1)

By operating in the high-speed communication mode M1, the imaging apparatus 10 sends image data DT to the application processor 30 using packets including one line of image data DT among the image data DT of frame images.

Specifically, initially in the imaging apparatus 10 (FIG. 4), the image data generator 14 of the controller 12 generates image data DT. The memory 201 of the transmitter 200 temporarily stores the image data DT supplied from the image data generator 14. The selector 202 selects and outputs a signal including the image data DT supplied from the image data generator 14 on the basis of a command from the controller 12. The error correction coding unit 203 performs an error correction coding process on the output signal from the selector 202. The encoder 204 performs an encoding process on the output signal from the error correction coding unit 203. The selector 208 selects and outputs the output signal from the encoder 204 on the basis of a command from the controller 12. The serializer 209 serializes the output signal from the selector 208. The driver 211 sends the output signal from the serializer 209 to the application processor 30 through the terminals TP1 and TN1.

In the application processor 30 (FIG. 6), the receiver 402 of the receiving unit 400 receives the signal sent from the imaging apparatus 10 through the terminals TP2 and TN2. The holding unit 403 supplies the output signal from the receiver 402 as it is to the CDR unit 404. The CDR unit 404 generates a clock signal RxCK and a data signal RxDT on the basis of the output signal from the holding unit 403. The deserializer 405 deserializes the data signal RxDT. The decoder 406 performs a decoding process on the output signal from the deserializer 405. The error correction decoding unit 407 performs an error correction decoding process on the output signal from the decoder 406. The image data receiver 32 of the controller 31 receives the image data DT included in the output signal from the error correction decoding unit 407.

The imaging apparatus 10 is also able to send a control code CD1 (control codes CD11 and CD12) to the application processor 30 in the high-speed communication mode M1. Specifically, initially in the imaging apparatus 10, the control code generator 15 of the controller 12 generates a control code CD1. The selector 202 selects and outputs a signal including the control code CD1 supplied from the control code generator 15 on the basis of a command from the controller 12. The error correction coding unit 203, the encoder 204, the selector 208, the serializer 209, and the driver 211 in the imaging apparatus 10, and the receiver 402, the holding unit 403, the CDR unit 404, the deserializer 405, the decoder 406, and the error correction decoding unit 407 in the application processor 30 operate in the same manner as when the image data DT are sent. The control code detector 33 of the controller 31 detects the control code CD1 included in the output signal from the error correction decoding unit 407.

If the control code CD1 is the control code CD11 indicating that operation modes M be changed, for example, then the controller 12 sets an operation mode M for the imaging apparatus 10 on the basis of the control code CD11. The controller 31 of the application processor 30 sets an operation mode M of the application processor 30 on the basis of the control code CD11 received from the imaging apparatus 10. Using the control code CD11, the communication system 1 can change its operation mode M from the high-speed communication mode M1 to either one of the low-speed communication mode M2, the bidirectional communication mode M3, and the standby mode M4, as depicted in FIG. 3.

On the other hand, if the control code CD1 is the control code CD12 indicating that the terminating resistors be rendered valid or invalid in the communication unit 40 of the application processor 30, for example, then the controller 31 of the application processor 30 controls the terminator 401 to set the terminating resistors to a valid or invalid setting on the basis of the control code CD12 received from the imaging apparatus 10.

(Low-Speed Communication Mode M2)

By operating in the low-speed communication mode M2, the imaging apparatus 10 sends a signal including a low-speed pattern PAT to the application processor 30 in H blanking periods PH, for example.

Specifically, initially in the imaging apparatus 10 (FIG. 4), the low-speed pattern generator 205 of the transmitter 200 generates a low-speed pattern PAT that includes a repetition of low-speed patterns PAT1 on the basis of a command from the controller 12. The selector 208 selects and outputs the output signal from the low-speed pattern generator 205 on the basis of a command from the controller 12. The serializer 209 serializes the output signal from the selector 208. The driver 211 sends the output signal from the serializer 209 to the application processor 30 through the terminals TP1 and TN1.

In the application processor 30 (FIG. 6), the receiver 402 of the receiving unit 400 receives the signal sent from the imaging apparatus 10 through the terminals TP2 and TN2. The holding unit 403 supplies the output signal from the receiver 402 as it is to the CDR unit 404. The CDR unit 404 generates a clock signal RxCK and a data signal RxDT on the basis of the output signal from the holding unit 403. The deserializer 405 deserializes the data signal RxDT. The image data receiver 32 of the controller 31 receives the output signal from the deserializer 405.

As described above, the communication system 1 operates in the low-speed communication mode M2 in periods such as H blanking periods PH or the like in which image data DT are not transmitted. Since the communication system 1 transmits a low-speed pattern PAT having a low transition rate, it can reduce electric power consumption compared with cases where the communication system 1 continues to operate in the high-speed communication mode M1.

Since the communication system 1 transmits a low-speed pattern PAT having a low transition rate in periods in which image data DT are not transmitted, the communication system 1 can immediately start transmitting image data DT when it resumes the transmission of image data DT after having stopped transmitting image data DT. Specifically, when the communication system 1 stops transmitting image data DT, for example, if it stops sending signals themselves, then the capacitive elements CP1, CN1, CP2, and CN2 (FIG. 1) are discharged, tending to shift the CDR 404 (FIG. 6) out of phase synchronism. In such a case, the communication system 1 may not be able to resume transmitting image data DT immediately. However, inasmuch as the communication system 1 sends a low-speed pattern PAT having a low transition rate after having stopped transmitting image data DT, the capacitive elements CP1, CN1, CP2, and CN2 (FIG. 1) remain charged, and the CDR 404 (FIG. 6) is maintained in phase synchronism. As a consequence, the communication system 1 is able to resume transmitting image data DT immediately.

Moreover, in the low-speed communication mode M2, the imaging apparatus 10 can send a control code CD1 (control codes CD11 and CD12) to the application processor 30. Specifically, initially in the imaging apparatus 10, the control code generator 15 of the controller 12 generates a control code CD1. The low-pattern generator 205 generates a low-speed pattern PAT that includes a combination of low-speed patterns PAT1 and PAT2 depending on the control code CD1.

FIG. 7 depicts an example of low-speed pattern PAT. In this example, the low-speed pattern PAT includes a low-speed pattern PAT1, a low-speed pattern PAT1, a low-speed pattern PAT2, a low-speed pattern PAT1, and a low-speed pattern PAT2 in the order named. In this example, as the low-speed pattern PAT1 is associated with a value "0" and the low-speed pattern PAT2 is associated with a value "1," the low-speed pattern PAT represents " . . . 00101 . . . ."

The selector 208, the serializer 209, and the driver 211 in the imaging apparatus 10, and the receiver 402, the holding unit 403, the CDR unit 404, and the deserializer 405 in the application processor 30 operate in the same manner as when the low-speed pattern PAT including a repetition of low-speed patterns PAT1 is sent. The control code detector 33 of the controller 31 detects the low-speed pattern PAT included in the output signal from the deserializer 405, and detects the control code CD1 based on the low-speed pattern PAT.

If the control code CD1 is the control code CD11 indicating that operation modes M be changed, for example, then the controller 12 sets an operation mode M for the imaging apparatus 10 on the basis of the control code CD11. The controller 31 of the application processor 30 sets an operation mode M for the application processor 30 on the basis of the control code CD11 received from the imaging apparatus 10. Using the control code CD11, the communication system 1 can change its operation mode M from the low-speed communication mode M2 to either one of the high-speed communication mode M1, the bidirectional communication mode M3, and the standby mode M4, as depicted in FIG. 3.

On the other hand, if the control code CD1 is the control code CD12 indicating that the terminating resistors be rendered valid or invalid in the communication unit 40 of the application processor 30, for example, then the controller 31 of the application processor 30 controls the terminator 401 to set the terminating resistors to a valid or invalid setting on the basis of the control code CD12 received from the imaging apparatus 10.

FIG. 8 depicts an example of signal SIG in the transmission path 100. In this example, operation modes M change in the order of the high-speed communication mode M1, the low-speed communication mode M2, and the high-speed communication mode M1. In this example, in periods in which the communication system 1 operates in the low-speed communication mode M2, the imaging apparatus 10 sends a control code CD12 indicating that the terminating resistors be invalid to the application processor 30. Based on the control code CD12, the application processor 30 renders the terminating resistors invalid. In FIG. 8, the amplitude of the signal SIG increases by making the terminating resistors invalid. The communication system 1 can thus reduce electric power consumption by making the terminating resistors invalid. Thereafter, in this example, the imaging apparatus 10 sends a control code CD12 indicating that the terminating resistors be valid to the application processor 30. Based on the control code CD12, the application processor 30 renders the terminating resistors valid. In FIG. 8, the amplitude of the signal SIG decreases by making the terminating resistors valid.

(Bidirectional Communication Mode M3)

By operating in the bidirectional communication mode M3, the imaging apparatus 10 sends a signal including a low-speed pattern PAT to the application processor 30 in V blanking periods PV, for example. The application processor 30 then sends a signal to the imaging apparatus 10.

FIG. 9 depicts an example of operation of the communication system 1 in the bidirectional communication mode M3. FIG. 9 illustrates at (A) the waveform of a signal sent by the communication unit 20 of the imaging apparatus 10, at (B) the waveform of a signal sent by the low-speed communication unit 420 of the application processor 30, and at (C) the waveform of the signal SIG in the transmission path 100.

Initially in the imaging apparatus 10 (FIG. 4), the low-speed pattern generator 205 of the transmitter 200 generates a low-speed pattern PAT that includes a repetition of low-speed patterns PAT1, in this example, on the basis of a command from the controller 12. The selector 208 selects and outputs the output signal from the low-speed pattern generator 205 on the basis of a command from the controller 12. The serializer 209 serializes the output signal from the selector 208. The driver 211 sends the output signal from the serializer 209 to the application processor 30 through the terminals TP1 and TN1. In addition, as depicted in FIG. 9 at (A), the output controller 212 controls operation of the driver 211 to set the output impedances thereof to high impedances (Hi-Z) in predetermined periods P1 other than those periods which include timings at which signals sent by the driver 211 make a transition, on the basis of a command from the controller 12.

In the application processor 30 (FIG. 6), the receiver 402 of the receiving unit 400 receives the signal sent from the imaging apparatus 10 through the terminals TP2 and TN2. On the basis of a command from the encoder 422, the holding unit 403 outputs the output signal from the receiver 402 as it is in predetermined periods P2 which include timings at which the output signal from the receiver 402 makes a transition, and holds the output signal from the receiver 402 and outputs the held signal in periods other than the predetermined periods P2. The CDR 404 generates a clock signal RxCK and a data signal RxDT on the basis of the output signal from the holding unit 403. The deserializer 405 deserializes the data signal RxDT. The image data receiver 32 of the controller 31 receives the output signal from the deserializer 405.

In the application processor 30, the control code generator 34 generates a control code CD2 (control codes CD21 and CD22). The error correction coding unit 421 performs an error correction coding process on a signal including the control code CD2 supplied from the controller 31. The encoder 422 performs an encoding process on the output signal from the error correction coding unit 421, the data signal RxDT, and the clock signal RxCK. Specifically, if the value of the signal supplied from the error correction coding unit 421 is "1," then the encoder 422 outputs an inverted value of the value of the data signal RxDT in a period corresponding to one cyclic period of the clock signal RxCK, and if the value of the signal supplied from the error correction coding unit 421 is "0," then the encoder 422 outputs a value which is the same as the value of the data signal RxDT in a period corresponding to one cyclic period of the clock signal RxCK. The driver 423 sends the output signal from the encoder 422 to the imaging apparatus 10 through the terminals TP2 and TN2. The output controller 424 controls operation of the driver 423 to set the output impedances thereof to high impedances in the predetermined periods P2 which include timings at which the output signal from the receiver 402 makes a transition, on the basis of a command from the encoder 422, as depicted in FIG. 9 at (B).

In this example, as depicted in FIG. 9 at (B), during a period between timings t3 and t4, the encoder 422 outputs a value "1" that is an inverted value of the value of the data signal RxDT, and the driver 423 sends a value "1" based on the output signal from the encoder 422. Similarly, during a period between timings t8 and t9, the encoder 422 outputs a value "1" of the data signal RxDT, and the driver 423 sends a value "1" based on the output signal from the encoder 422.

As a result, the signal SIG in the transmission path 100 is as depicted in FIG. 9 at (C). Specifically, at timing t1, the value of the signal SIG changes from "1" to "0" depending on the signal sent by the imaging apparatus 10 (FIG. 9 at (A)). Immediately before timing t2, the output impedances of the driver 211 of the imaging apparatus 10 become high impedances (FIG. 9 at (A)), keeping the value of the signal SIG at "0." Immediately after timing t2, the application processor 30 starts to send a value "0" (FIG. 9 at (B)). Therefore, the value of the signal SIG is kept at "0." Thereafter, the value of the signal SIG changes from "0" to "1" at timing t3 and changes from "1" to "0" at timing t4 depending on the signal sent by the application processor 30 (FIG. 9 at (A)). Then, immediately before timing t5, the output impedances of the driver 423 of the application processor 30 become high impedances (FIG. 9 at (B)), keeping the value of the signal SIG at "0." Then, immediately after timing t5, the imaging apparatus 10 starts sending a value "0" (FIG. 9 at (A)). Therefore, the value of the signal SIG is kept at "0."

Then, at timing t6, the value of the signal SIG changes from "0" to "1" depending on the signal sent by the imaging apparatus 10 (FIG. 9 at (A)). Immediately before timing t7, the output impedances of the driver 211 of the imaging apparatus 10 become high impedances (FIG. 9 at (A)), keeping the value of the signal SIG at "1." Immediately after timing t7, the application processor 30 starts to send a value "1" (FIG. 9 at (B)). Therefore, the value of the signal SIG is kept at "1." Then, immediately before timing t10, the output impedances of the driver 423 of the application processor 30 become high impedances (FIG. 9 at (B)), keeping the value of the signal SIG at "1." Then, immediately after timing t10, the imaging apparatus 10 starts sending a value "1" (FIG. 9 at (A)). Therefore, the value of the signal SIG is kept at "1."

In the imaging apparatus 10, the receiver 221 of the low-speed communication unit 220 receives the signal sent from the application processor 30 through the terminals TP1 and TN1 in the predetermined periods P1. The exclusive-OR circuit 223 of the decoder 222 exclusive-ORs the output signal from the serializer 209 and the output signal from the receiver 221. The counter 224 performs a counting operation on the output signal from the exclusive-OR circuit 223. The decoder 222 performs a decoding process using the result of the counting operation.

In the example depicted in FIG. 9, during a period between timings t1 to t6, the serializer 209 of the imaging apparatus 10 outputs a value "00000" and the receiver 221 receives "00100." The output signal of the exclusive-OR circuit 223 thus has one pulse produced therein. The counter 224 counts this one pulse. As a result, the decoder 222 obtains a value "1." On the other hand, during a period between timings t6 to t11, the serializer 209 of the imaging apparatus 10 outputs a value "11111" and the receiver 221 receives "11111." The output signal of the exclusive-OR circuit 223 thus has no pulse produced therein. As a result, the decoder 222 obtains a value "0."

Then, the error correction decoding unit 225 performs an error correction decoding process on the output signal from the decoder 222. The control code detector 16 detects the control code CD2 included in the signal supplied from the low-speed communication unit 220.

Moreover, the imaging apparatus 10 can send a control code CD1 (control codes CD11 and CD12) to the application processor 30 also in the bidirectional communication mode M3, in the same manner as with the low-speed communication mode M2.

In the control code CD1 is the control code CD11 indicating that operation modes M be changed, for example, then the controller 12 sets an operation mode M for the imaging apparatus 10 on the basis of the control code CD11. The controller 31 of the application processor 30 sets an operation mode M for the application processor 30 on the basis of the control code CD11 received from the imaging apparatus 10. Using the control code CD11, the communication system 1 can change its operation mode M from the bidirectional communication mode M3 to either one of the high-speed communication mode M1, the low-speed communication mode M2, and the standby mode M4, as depicted in FIG. 3.

On the other hand, if the control code CD1 is the control code CD12 indicating that the terminating resistors be rendered valid or invalid in the communication unit 40 of the application processor 30, for example, then the controller 31 of the application processor 30 controls the terminator 401 to set the terminating resistors to a valid or invalid setting on the basis of the control code CD12 received from the imaging apparatus 10.

In this manner, even in the case where the imaging apparatus 10 sends a low-speed pattern PAT that includes a combination of low-speed patterns PAT1 and PAT2 depending on the control code CD1 to the application processor 30, the application processor 30 can send signals to the imaging apparatus 10.

FIG. 10 depicts an example of operation of the communication system 1 in the bidirectional communication mode M3. In this example, the imaging apparatus 10 sends a low-speed pattern PAT2 to the application processor 30. As depicted in FIG. 10 at (B), the encoder 422 outputs a value "0" that is an inverted value of the value of the data signal RxDT twice during a period between timings t21 and t22. Similarly, the encoder 422 outputs a value "1" that is an inverted value of the value of the data signal RxDT once during a period between timings t22 and t23, and outputs a value "0" that is an inverted value of the value of the data signal RxDT once during a period between timings t25 and t26.

In this example, during a period between timings t21 and t22, the serializer 209 of the imaging apparatus 10 outputs a value "1111111" and the receiver 221 receives "1101011." The output signal of the exclusive-OR circuit 223 thus has two pulses produced therein. The counter 224 counts these two pulses. As a result, the decoder 222 obtains a value "2." In addition, during a period between timings t22 and t23, the serializer 209 of the imaging apparatus 10 outputs a value "0000000" and the receiver 221 receives "0010000." The output signal of the exclusive-OR circuit 223 thus has one pulse produced therein. As a result, the decoder 222 obtains a value "1." Furthermore, during a period between timings t24 and t25, the serializer 209 of the imaging apparatus 10 outputs a value "0000000" and the receiver 221 receives "0000000." The output signal of the exclusive-OR circuit 223 thus has no pulse produced therein. As a result, the decoder 222 obtains a value "0." Moreover, during a period between timings t25 and t26, the serializer 209 of the imaging apparatus 10 outputs a value "1111111" and the receiver 221 receives "1101111." The output signal of the exclusive-OR circuit 223 thus has one pulse produced therein. As a result, the decoder 222 obtains a value "1."

In the communication system 1, in this manner, since the application processor 30 sends signals to the imaging apparatus 10 in periods where signals are kept in a low-speed pattern PAT, the consumption of electric power is reduced. Specifically, if the imaging apparatus and the application processor are arranged to be able to send signals simultaneously, then since the signals interfere with each other, it is necessary to process the received signals for canceling signal interferences, and circuits are required to perform such signal processing. Particularly, such signal processing needs to be performed in both the imaging apparatus and the application processor. As a result, their circuit arrangements are made complex, and their electric power consumption tends to increase. On the other hand, in the communication system 1, the application processor 30 can send signals to the imaging apparatus 10 in periods where signals are kept in a low-speed pattern PAT. Inasmuch as the communication system 1 is thus able to reduce the possibility of signal interferences, the circuit arrangements are made simple, resulting in a reduction in the consumption of electric power.

Moreover, in the communication system 1, the low-speed communication unit 420 of the application processor 30 sends a signal based on the clock signal RxCK and the data signal RxDT generated by the CDR unit 404 of the receiving unit 400. Therefore, the consumption of electric power is reduced. Specifically, in the communication system 1, since the imaging apparatus 10 sends a signal including a low-speed pattern PAT to the application processor 30, the CDR unit 404 is kept in phase synchronism. Since the low-speed communication unit 420 of the application processor 30 sends a signal based on the clock signal RxCK and the data signal RxDT generated by the CDR unit 404, the low-speed communication unit 220 of the imaging apparatus 10 may be devoid of a CDR circuit. Especially, a CDR circuit generally has a large circuit sale and consumes a large amount of electric power. Because the communication system 1 allows such a CDR circuit to be dispensed with in the low-speed communication unit 220, the circuit arrangements are made simple and the consumption of electric power is reduced.

(Standby Mode M4)

The imaging apparatus 10 sends a control code CD11 indicating a change to the standby mode M4 to the application processor 30 in the high-speed communication mode M1, the low-speed communication mode M2, and the bidirectional communication mode M3.

FIG. 11 depicts an example of operation of the communication system 1 where its operation mode M changes from the low-speed communication mode M2 to the standby mode M4. FIG. 11 illustrates at (A) the waveform of a signal sent by the driver 211 of the imaging apparatus 10, at (B) the waveform of a signal sent by the driver 226 of the imaging apparatus 10, and at (C) the waveform of the signal SIG. During a period prior to timing t15, the communication system 1 operates in the low-speed communication mode M2, and the imaging apparatus 10 sends a control code CD11 indicating a change to the standby mode M4 to the application processor 30. Immediately before timing t16, the imaging apparatus 10 sets the output impedances of the driver 211 to high impedances (FIG. 11 at (A)), and the driver 226 starts sending a value "0" immediately after timing t16. In the standby mode M1, the value of the signal SIG is thus kept at "0."

In the imaging apparatus 10, the circuits other than the driver 226 in the communication unit 20 (FIG. 4) stop operating in the standby mode M4. Similarly, in the application processor 30, the circuits other than the receiver 425 in the communication unit 40 (FIG. 6) stop operating in the standby mode M4. The communication system 1 thus has its consumed electric power reduced.

In this example, the driver 226 of the imaging apparatus 10 outputs signals in the standby mode M4. If the imaging apparatus 10 is arranged such that the output impedances of the driver 226 can be changed, for example, then the output impedances thereof may be increased. The consumption of electric power by the communication system 1 is thus further reduced.

For recovery from the standby mode M4, in the imaging apparatus 10 (FIG. 4), the activation signal generator 17 generates an activation signal including a setting selection signal SEL based on a command from the communication controller 13, and the driver 226 of the low-speed communication unit 220 sends the activation signal to the application processor 30. In the application processor 30 (FIG. 6), the receiver 425 of the low-speed communication unit 420 receives the activation signal sent from the imaging apparatus 10, and the activation signal detector 35 detects the activation signal including the setting selection signal SEL based on the signal supplied from the low-speed communication unit 420.

FIG. 12 depicts an example of operation of the communication system 1 where its operation mode M changes from the standby mode M4 to the low-speed communication mode M2. During a period prior to timing t31, the communication system 1 has its operation mode M set to the standby mode M4. Between timings t31 to t35, the imaging apparatus 10 sends an activation signal to the application processor 30. The driver 226 of the imaging apparatus 10 goes into a high-impedance state after having finished sending the activation signal.

Then, the controller 12 of the imaging apparatus 10 selects a setting information set INF depending on the setting selection signal SEL from the stored setting information sets INF, sets the selected setting information set INF in the register, and sets an operation mode M for the imaging apparatus 10 based on the setting information set INF. Then, the communication unit 20 of the imaging apparatus 10 starts operating on the basis of a command from the controller 12. Similarly, the controller 31 of the application processor 30 selects a setting information set INF depending on the setting selection signal SEL from the stored setting information sets INF, sets the selected setting information set INF in the register, and sets an operation mode M for the application processor 30 based on the setting information set INF. Then, the communication unit 40 of the application processor 30 starts operating on the basis of a command from the controller 31. As a result, in this example, the communication system 1 starts operating in the low-speed communication mode M2.

[Advantages]

According to the present embodiment, as described above, since a low-speed pattern having a low transition rate is sent in periods in which no image data are transmitted, the consumption of electric power is reduced and the transmission of image data can be resumed immediately.

According to the present embodiment, as the application processor sends signals to the imaging apparatus during periods in which signals are kept in a low-speed pattern, the consumption of electric power is reduced.

According to the present embodiment, as the low-speed communication unit of the application processor sends signals using a clock signal and a data signal generated by the CDR unit, the consumption of electric power is reduced.

2. Second Embodiment

A communication system 2 according to a second embodiment will next be described below. According to the present embodiment, an application processor controls communicating operation of a communication system. Specifically, although the communication controller 13 of the imaging apparatus 10 controls communicating operation of the communication system 1 according to the above first embodiment (FIG. 1), a controller of an application processor controls communicating operation of a communication system 2 according to the present embodiment. Those components which are essentially identical to those of the communication system 1 according to the first embodiment are denoted by identical reference characters, and their description will be omitted accordingly.

FIG. 13 depicts a configurational example of a communication system 2. The communication system 2 includes an imaging apparatus 50, a transmission path 100, and an application processor 70.

The imaging apparatus 50 has a controller 52 and a communication unit 60. The controller 52 serves to control operation of the imaging apparatus 50. The controller 52 also functions as a state machine on a transmission side in communicating operation of the communication system 2. The communication unit 60 serves to communicate with the application processor 70.

The application processor 70 has a communication unit 80 and a controller 71. The communication unit 80 serves to communicate with the imaging apparatus 50. The controller 71 serves to control operation of the application processor 70. The controller 71 also functions as a state machine on a reception side in communicating operation of the communication system 2. The controller 71 has a communication controller 72. The communication controller 72 serves to control communicating operation of the communication system 2.

FIG. 14 depicts a plurality of operation modes M of the communication system 2 and transitions between the operation modes M. The communication system 2 has four operation modes M (a high-speed communication mode M1, a low-speed communication mode M2, a bidirectional communication mode M3, and a standby mode M4).

In the communication system 2, since the application processor 70 controls communicating operation of the communication system 2, a transition can be made to the standby mode M4 only from the bidirectional communication mode M3.

FIG. 15 depicts a configurational example of the communication unit 60 and the controller 52 in the imaging apparatus 50.

The communication unit 60 has a low-speed communication unit 240. The low-speed communication unit 240 serves to receive signals sent from the application processor 70 in the bidirectional communication mode M3. The low-speed communication unit 240 also has a function to receive an activation signal sent from the application processor 70. The receiver 221 of the low-speed communication unit 240 supplies received signals to the decoder 222 and the controller 52.

The controller 52 has a control code detector 56 and an activation signal detector 57. The control code detector 56 serves to detect a control code CD1 (control codes CD11 and CD12) and a control code CD2 (control codes CD21 and CD22) sent from the application processor 70 through the communication unit 60. Specifically, in the communication system 2, since the application processor 70 can send a control code CD1 in addition to a control code CD2, as described later, the control code detector 56 can detect control codes CD1 and CD2. The activation signal detector 57 serves to detect an activation signal included in the output signal from the receiver 221. Specifically, the activation signal detector 57 detects the activation signal included in the output signal from the receiver 221 by oversampling the output signal from the receiver 221 using the system clock signal CK1, for example.

FIG. 16 depicts a configurational example of the controller 71 and the communication unit 80 in the application processor 70.

The controller 71 has a control code generator 74 and an activation signal generator 75 in addition to the communication controller 72. The control code generator 74 generates a control code CD1 (control codes CD11 and CD12) and a control code CD2 (control codes CD21 and CD22) to be sent to the imaging apparatus 50 on the basis of a command from the communication controller 72. Specifically, in the communication system 2, since the application processor 70 controls communicating operation of the communication system 2, the control code generator 74 generates a control code CD1 in addition to a control code CD2. The activation signal generator 75 serves to generate an activation signal for activating the imaging apparatus 50 on the basis of a command from the communication controller 72 in the standby mode M4. The activation signal generator 75 then supplies the generated activation signal to the communication unit 80.

The communication unit 80 has a low-speed communication unit 440. The low-speed communication unit 440 serves to send signals to the imaging apparatus 50 in the bidirectional communication mode M3. The low-speed communication unit 440 also has a function to send the activation signal to the imaging apparatus 50. The low-speed communication unit 440 has a driver 443. The driver 443 serves to send the output signal from the encoder 422 to the imaging apparatus 50 through the terminals TP2 and TN2. The driver 443 also has a function to send the activation signal supplied from the activation signal generator 75 of the controller 71 to the imaging apparatus 50 through the terminals TP2 and TN2 in the standby mode M4.

The imaging apparatus 50 corresponds to a specific example of "first communication apparatus" in the present disclosure. The application processor 70 corresponds to a specific example of "second communication apparatus" in the present disclosure.

The communication system 2 operates in the bidirectional communication mode M3 during the V blanking periods PV, for example. Therefore, the application processor 70 can send a control code CD1 (control codes CD11 and CD12) and a control code CD2 (control codes CD21 and CD22) to the imaging apparatus 50 during the V blanking periods PV.

Specifically, in the application processor 70, the control code generator 74 generates a control code CD1 (control codes CD11 and CD12) and a control code CD2 (control codes CD21 and CD22). The error correction decoding unit 421 performs an error correction decoding process on a signal including the control codes CD1 and CD2 supplied from the controller 71. The encoder 422 performs an encoding process on the output signal from the error correction coding unit 421, the data signal RxDT, and the clock signal RxCK. The driver 443 sends the output signal from the encoder 422 to the imaging apparatus 50 through the terminals TP2 and TN2. The output controller 424 controls operation of the driver 443 to set the output impedances thereof to high impedances in predetermined periods P2 which include timings at which the output signal from the receiver 402 makes a transition, on the basis of a command from the encoder 422.

In the imaging apparatus 50, the receiver 221 of the low-speed communication unit 240 receives signals sent from the application processor 70 through the terminals TP1 and TN1. The exclusive-OR circuit 223 of the decoder 222 exclusive-ORs the output signal from the serializer 209 and the output signal from the receiver 221. The counter 224 performs a counting operation on the output signal from the exclusive-OR circuit 223. The decoder 222 performs a decoding process using the result of the counting operation. The error correction decoding unit 225 performs an error correction decoding process on the output signal from the decoder 222. The control code detector 56 detects the control codes CD1 and CD2 included in the signal supplied from the low-speed communication unit 240.

If the imaging apparatus 50 receives the control code CD11 indicating that operation modes M be changed, for example, then the controller 52 sets an operation mode M for the imaging apparatus 50 on the basis of the control code CD11. The control code generator 15 of the controller 52 generates a control code CD11, and the transmitter 200 sends the control code CD11 to the application processor 70 in the same manner as with the first embodiment. The application processor 70 receives the control code CD11, and the controller 71 sets an operation mode M for the application processor 70 on the basis of the received control code CD11.

Furthermore, if the imaging apparatus 50 receives the control code CD12 indicating that the terminating resistors be rendered valid or invalid in the communication unit 40 of the application processor 70, for example, then the control code generator 15 generates a control code CD12, and the transmitter 200 sends the control code CD12 to the application processor 70 in the same manner as with the first embodiment. The application processor 70 receives the control code CD12, and the terminator 401 renders these terminating resistors valid or renders these terminating resistors invalid on the basis of a command from the controller 71.

Furthermore, if the imaging apparatus 50 receives the control code CD21 indicating that the image data DT be sent again, for example, then the transmitter 200 sends a signal including the image data DT stored in the memory 201 in the same manner as with the first embodiment. Moreover, if the imaging apparatus 50 receives the control code CD22 indicating that a training pattern be sent, for example, then the transmitter 200 generates a training pattern and sends a signal including the training pattern to the application processor 70 in the same manner as with the first embodiment.

(Power-Up Operation)

When the communication system 2 is powered up, the communication system 2 has its operation mode M set to the standby mode M4. At this time, in the communication unit 60 of the imaging apparatus 50, the operation state of the circuits other than the receiver 221 becomes a standby state, and in the communication unit 80 of the application processor 70, the operation state of the circuits other than the driver 443 becomes a standby state.

Next, the communication controller 72 of the application processor 70 generates a setting selection signal SEL for selecting a setting information set INF to be used from a plurality of setting information sets INF. The controller 71 of the application processor 70 selects a setting information set INF depending on the setting selection signal SEL from the stored setting information sets INF, and sets the selected setting information set INF in a register. The setting information set INF is set such that the communication system 2 operates in the bidirectional communication mode M3 in the V blanking periods PV.

Then, the activation signal generator 75 of the application processor 70 generates an activation signal based on a command from the communication controller 72. At this time, the activation signal generator 75 includes the setting selection signal SEL in the activation signal. The driver 443 of the application processor 70 then sends the activation signal to the imaging apparatus 50.

In the imaging apparatus 50, the receiver 221 receives the activation signal. The activation signal detector 57 detects the activation signal. At this time, the activation signal detector 57 detects the setting selection signal SEL included in the activation signal. Then, the controller 52 selects a setting information set INF depending on the setting selection signal SEL from the stored setting information sets INF, and sets the selected setting information set INF in a register.

Then, the controller 52 of the imaging apparatus 50 sets an operation mode M for the imaging apparatus 50 on the basis of the setting information set INF set in the register, and the communication unit 60 of the imaging apparatus 50 starts operating based on a command from the controller 52. Similarly, the controller 71 of the application processor 70 sets an operation mode M for the application processor 70 on the basis of the setting information set INF set in the register, and the communication unit 80 of the application processor 70 starts operating based on a command from the controller 71.

The communication system 2 is activated and starts to operate in this manner. In the communication system 2, after a predetermined time has elapsed, the clock generator 213 (FIG. 15) of the imaging apparatus 50 establishes phase synchronism, the capacitive elements CP1, CN1, CP2, and CN2 (FIG. 13) are charged, the equalizer settings of the receiver 402 are adjusted, and the CDR unit 404 (FIG. 16) of the application processor 70 establishes phase synchronism. As a result, the communication system 2 becomes able to communicate.

(Standby Mode M4)

The communication system 2 operates in the bidirectional communication mode M3 in the V blanking periods PV, for example. Therefore, the application processor 70 sends a control code CD11 indicating a change to the standby mode M4 to the imaging apparatus 50 in the V blanking periods PV.

FIG. 17 depicts an example of operation of the communication system 2 where its operation mode M changes from the bidirectional communication mode M3 to the standby mode M4. During a period prior to timing t18, the communication system 2 operates in the bidirectional communication mode M3, and the application processor 70 sends a control code CD11 indicating a change to the standby mode M4 to the imaging apparatus 50. Immediately before timing t19, the imaging apparatus 50 sets the output impedances of the driver 211 to high impedances (FIG. 17 at (A)), and immediately after timing T19, the application processor 70 starts sending a value "0." Therefore, the value of the signal SIG is kept at "0" in the standby mode M4.

In the imaging apparatus 50, the circuits other than the driver 221 in the communication unit 60 (FIG. 15) stop operating in the standby mode M4. Similarly, in the application processor 70, the circuits other than the driver 443 in the communication unit 80 (FIG. 16) stop operating in the standby mode M4. The communication system 2 thus has its electric power consumption reduced.

For recovery from the standby mode M4, in the application processor 70 (FIG. 16), the activation signal generator 75 generates an activation signal including a setting selection signal SEL based on a command from the communication controller 72, and the driver 443 of the low-speed communication unit 440 sends the activation signal to the imaging apparatus 50. In the imaging apparatus 50 (FIG. 15), the receiver 221 of the low-speed communication unit 240 receives the activation signal sent from the application processor 70, and the activation signal detector 57 detects the activation signal including the setting selection signal SEL based on the signal supplied from the low-speed communication unit 240.

FIG. 18 depicts an example of operation of the communication system 2 where its operation mode M changes from the standby mode M4 to the bidirectional communication mode M3. During a period prior to timing t31, the communication system 2 has its operation mode M set to the standby mode M4. Between timings t31 to t35, the application processor 70 sends an activation signal to the imaging apparatus 50. The driver 443 of the application processor 70 goes into a high-impedance state after having finished sending the activation signal.

Then, the controller 52 of the imaging apparatus 50 selects a setting information set INF depending on the setting selection signal SEL from the stored setting information sets INF, sets the selected setting information set INF in the register, and sets an operation mode M for the imaging apparatus 50 based on the setting information set INF. Then, the communication unit 60 of the imaging apparatus 50 starts operating on the basis of a command from the controller 52. Similarly, the controller 71 of the application processor 70 selects a setting information set INF depending on the setting selection signal SEL from the stored setting information sets INF, sets the selected setting information set INF in the register, and sets an operation mode M for the application processor 70 based on the setting information set INF. Then, the communication unit 80 of the application processor 70 starts operating on the basis of a command from the controller 71. As a result, in this example, the communication system 2 starts operating in the bidirectional communication mode M3.

The example in which the operation mode M changes from the standby mode M4 to the bidirectional communication mode M3 has been described. However, the disclosure is not restrictive. As depicted in FIG. 14, the operation mode may change from the standby mode M4 to the low-speed communication mode M2 or from the standby mode M4 to the high-speed communication mode M1.

According to the present embodiment, as described above, since a low-speed pattern having a low transition rate is sent in periods in which no image data are transmitted, the consumption of electric power is reduced and the transmission of image data can be resumed immediately even when the controller of the application processor controls communicating operation of the communication system.

According to the present embodiment, since the application processor sends signals to the imaging apparatus in periods where signals are kept in a low-speed pattern, the consumption of electric power is reduced even when the controller of the application processor controls communicating operation of the communication system.

According to the present embodiment, as the low-speed communication unit of the application processor sends signals using a clock signal and a data signal generated by the CDR unit, the consumption of electric power is reduced even when the controller of the application processor controls communicating operation of the communication system.

3. Third Embodiment

Next, a communication system 3 according to a third embodiment will be described below. According to the present embodiment, image data DT are transmitted using three signals having voltages that are different from each other. Those components which are essentially identical to those of the communication system 1 according to the first embodiment are denoted by identical reference characters, and their description will be omitted accordingly.

FIG. 19 depicts a configurational example of the communication system 3. The communication system 3 includes an imaging apparatus 110, a transmission path 101, and an application processor 130. The imaging apparatus 110 has three terminals TA1, TB1, and TC1, the transmission path 101 has lines 101A, 101B, and 101C, and the application processor 130 has three terminals TA2, TB2 and TC2. The terminal TA1 of the imaging apparatus 110 is connected to an end of the line 101A through a capacitive element CA1, the terminal TB1 of the imaging apparatus 110 is connected to an end of the line 101B through a capacitive element CB1, and the terminal TC1 of the imaging apparatus 110 is connected to an end of the line 101C through a capacitive element CC1. The terminal TA2 of the application processor 130 is connected to the other end of the line 101A through a capacitive element CA2, the terminal TB2 of the application processor 130 is connected to the other end of the line 101B through a capacitive element CB2, and the terminal TC2 of the application processor 130 is connected to the other end of the line 101C through a capacitive element CC2. The lines 101A, 101B, and 101C have respective characteristic impedances of approximately 50 [Ω] in this example. The communication system 3 transmits image data DT through the transmission path 101, using three signals having voltages that are different from each other.

FIG. 20 depict voltage states of signals SIGA, SIGB, and SIGC that are sent from the terminals TA1, TB1, and TC1 at the time the imaging apparatus 110 transmits image data DT. The imaging apparatus 110 sends six symbols "+x," "−x," "+y," "−y," "+z," "−z" using the three signals SIGA, SIGB, and SIGC. For example, for sending the symbol "+x," the imaging apparatus 110 sets the signal SIGA to a high-level voltage VH, the signal SIGB to a low-level voltage VL, and the signal SIGC to a mid-level voltage VM. For sending the symbol "−x," the imaging apparatus 110 sets the signal SIGA to the low-level voltage VL, the signal SIGB to the high-level voltage VH, and the signal SIGC to the mid-level voltage VM. For sending the symbol "+y," the imaging apparatus 110 sets the signal SIGA to the mid-level voltage VM, the signal SIGB to the high-level voltage VH, and the signal SIGC to the low-level voltage VL. For sending the symbol "−y," the imaging apparatus 110 sets the signal SIGA to the mid-level voltage VM, the signal SIGB to the low-level voltage VL, and the signal SIGC to the high-level voltage VH. For sending the symbol "+z," the imaging apparatus 110 sets the signal SIGA to the low-level voltage VL, the signal SIGB to the mid-level voltage VM, and the signal SIGC to the high-level voltage VH. For sending the symbol "−z," the imaging apparatus 110 sets the signal SIGA to the high-level voltage VH, the signal SIGB to the mid-level voltage VM, and the signal SIGC to the low-level voltage VL.

The imaging apparatus 110 has a controller 112 and a communication unit 120. The controller 112 serves to control operation of the imaging apparatus 110. The controller 112 has a communication controller 13. The communication controller 13 serves to control communicating operation of the communication system 3 in the same manner as with the first embodiment. The communication unit 120 serves to communicate with the application processor 130.

The application processor 130 has a communication unit 140 and a controller 131. The communication unit 140 serves to communicate with the imaging apparatus 110. The controller 131 serves to control operation of the application processor 130.

As with the communication system 1 according to the first embodiment (FIG. 3), the communication system 3 has four operation modes M (a high-speed communication mode M1, a low-speed communication mode M2, a bidirectional communication mode M3, and a standby mode M4).

In the high-speed communication mode M1, the imaging apparatus 110 sends packets P (image data DT) to the application processor 130 using three signals (FIG. 20) having voltages that are different from each other.

In the low-speed communication mode M2 and the bidirectional communication mode M3, the imaging apparatus 110 sends a signal including a low-speed pattern PAT to the application processor 130 through two (here the lines 101B and 101C) of the three lines (the lines 101A, 101B, and 101C) of the transmission path 101, in the same manner as with the first embodiment. At this time, the imaging apparatus 110 outputs a DC signal to the remaining one (here the line 101A) of the three lines of the transmission path 101. For example, the imaging apparatus 110 sends a signal that makes a transition between the low-level voltage VL and the high-level voltage VH to the application processor 130 through the lines 101B and 101C, and outputs the mid-level voltage VM to the line 101A.

In the bidirectional communication mode M3, the application processor 130 sends a signal to the imaging apparatus 110 through the lines 101B and 101C in this example, in the same manner as with the first embodiment.

FIG. 21 depicts a configurational example of the communication unit 120 and the controller 112 of the imaging apparatus 110. The communication unit 120 has a transmitter 260. The transmitter 260 serves to send signals to the application processor 130 in the high-speed communication mode M1, the low-speed communication mode M2, and the bidirectional communication mode M3. The transmitter 260 has a mapper 264 and a driver 271.

The mapper 264 serves to perform a predetermined mapping process on the output signal from the error correction coding unit 203. The mapper 264 supplies a signal generated by the mapping process to the selector 208.

The driver 271 serves to send the signal supplied from the serializer 209 to the application processor 130 through the terminals TA1, TB1, and TC1. The output impedances at respective output terminals of the driver 271 are set to approximately 50 [Ω] each. The driver 271 also has a function to set the output impedances to high impedances on the basis of a command from the controller 212.

In the low-speed communication mode M2 and the bidirectional communication mode M3, the driver 271 sends a signal including a low-speed pattern PAT to the application processor 130 through the terminals TB1 and TC1.

FIG. 22 depicts a configurational example of a portion of the driver 271 which is associated with the terminal TA1. The driver 271 has transistors 291, 294, 295, and 298 and resistive elements 292, 293, 296, and 297. The transistors 291, 294, 295, and 298 include an N-channel MOS (Metal Oxide Semiconductor)-type FET (Field Effect Transistor) each. The transistor 291 has a gate supplied with a control signal, a drain supplied with a voltage V1, and a source connected to an end of the resistive element 292. The transistor 294 has a gate supplied with a control signal, a drain connected to an end of the resistive element 293, and a source connected to ground. The transistor 295 has a gate supplied with a control signal, a drain supplied with the voltage V1, and a source connected to an end of the resistive element 296. The transistor 298 has a gate supplied with a control signal, a drain connected to an end of the resistive element 297, and a source connected to ground. The end of the resistive element 292 is connected to the source of the transistor 291, whereas the other end of the resistive element 292 is connected to the other ends of the resistive elements 293, 296, and 297 and the terminal TA1. The end of the resistive element 293 is connected to the drain of the transistor 294, whereas the other end of the resistive element 293 is connected to the other ends of the resistive elements 292, 296, and 297 and the terminal TA1. The end of the resistive element 296 is connected to the source of the transistor 295, whereas the other end of the resistive element 296 is connected to the other ends of the resistive elements 292, 293, and 297 and the terminal TA1. The end of the resistive element 297 is connected to the drain of the transistor 298, whereas the other end of the resistive element 297 is connected to the other ends of the resistive elements 292, 293, and 296 and the terminal TA1. In this example, the sum of the on-resistance of the transistor 291 and the resistance value of the resistive element 292 is approximately 100 [Ω], and, similarly, the sum of the on-resistance of the transistor 294 and the resistance value of the resistive element 293 is approximately 100 [Ω]. Furthermore, the sum of the on-resistance of the transistor 295 and the resistance value of the resistive element 296 is approximately 100 [Ω], and, similarly, the sum of the on-resistance of the transistor 298 and the resistance value of the resistive element 297 is approximately 100 [Ω].

With this arrangement, the driver 271 can set the voltage at the terminal TA1 to the high-level voltage VH and can set the output impedance to approximately 50 [Ω] by turning on the transistors 291 and 295 and turning off the transistors 294 and 298, for example. Similarly, the driver 271 can set the voltage at the terminal TA1 to the low-level voltage VL and can set the output impedance to approximately 50 [Ω] by turning on the transistors 294 and 298 and turning off the transistors 291 and 295, for example. Moreover, the driver 271 can set the voltage at the terminal TA1 to the mid-level voltage VM and can set the output impedance to approximately 50 [Ω] by turning on the transistors 291 and 294 and turning off the transistors 295 and 298, for example. Furthermore, the driver 271 can set the output impedance to a high impedance by turning off the transistors 291, 294, 295, and 298, for example.

In the communication unit 120, the receiver 221 of the low-communication unit 220 receives signals sent from the application processor 130 through the terminals TB1 and TC1 in the bidirectional communication mode M3. The driver 226 sends an activation signal to the application processor 130 through the terminals TB1 and TC1.

In this example, the terminals TB1 and TC1 are connected to the receiver 221 and the driver 226, but the terminal TA1 is not connected to the receiver 221 and the driver 226. Therefore, in order to maintain a balance of the electric characteristics at the terminals TA1, TB1 and TC1, a load should preferably be connected to the terminal TA1.

FIG. 23 depicts a configurational example of the controller 131 and the communication unit 140 of the application processor 130. The communication unit 140 has a receiving unit 460. The receiving unit 460 serves to receive signals sent from the imaging apparatus 110 in the high-speed communication mode M1, the low-speed communication mode M2, and the bidirectional communication mode M3. The receiving unit 460 has a terminator 461, a receiver 462, and a demapper 466.

As with the terminator 401 according to the first embodiment described above, the terminator 461 is arranged to set the terminating resistors to a valid or invalid setting on the basis of a command from the controller 131.

The receiver 462 serves to receive signals sent from the imaging apparatus 110 through the terminals TA2, TB2 and TC2. The receiver 462 is constructed using a so-called decision feedback equalizer (DFE), for example, as with the receiver 402 according to the first embodiment.

The receiver 462 receives a signal including a low-speed pattern PAT sent from the imaging apparatus 110 through the terminals TB2 and TC2 in the low-speed communication mode M2 and the bidirectional communication mode M3.

FIG. 24 depicts a configurational example of the terminator 461 and the receiver 462.

The terminator 461 has resistive elements 491A, 491B, and 491C. The resistive elements 491A, 491B, and 491C function as terminating resistors in the communication system 3. The resistive element 491A has an end connected to the terminal TA2, the resistive element 491B has an end connected to the terminal TB2, and the resistive element 491C has an end connected to the terminal TC2. The other end of the resistive element 491A is connected to the other ends of the resistive elements 491B and 491C, the other end of the resistive element 491B is connected to the other ends of the resistive elements 491A and 491C, and the other end of the resistive element 491C is connected to the other ends of the resistive elements 491A and 491B.

The receiver 462 has an equalizer 492 and amplifiers 493A, 493B, and 493C. The equalizer 492 equalizes the signal SIGA supplied to the terminal TA2, thereby generating a signal SIGA2, equalizes the signal SIGB supplied to the terminal TB2, thereby generating a signal SIGB2, and equalizes the signal SIGC supplied to the terminal TC2, thereby generating a signal SIBC2. The amplifier 493A has a positive input terminal supplied with the signal SIGA2 and a negative input terminal supplied with the signal SIGB2. The amplifier 493B has a positive input terminal supplied with the signal SIGB2 and a negative input terminal supplied with the signal SIGC2. The amplifier 493C has a positive input terminal supplied with the signal SIGC2 and a negative input terminal supplied with the signal SIGA2.

The demapper 466 performs a predetermined demapping process on the output signal from the deserializer 405. The demapper 466 supplies a signal generated by the demapping process to the error correction decoding unit 407.

In the communication unit 120, the driver 423 of the low-speed communication unit 420 sends the output signal from the encoder 422 to the imaging apparatus 110 through the terminals TB2 and TC2 in the bidirectional communication mode M3. The receiver 425 receives the activation signal sent from the imaging apparatus 110 through the terminals TB1 and TC1.

The imaging apparatus 110 corresponds to a specific example of "first communication apparatus" in the present disclosure. The application processor 130 corresponds to a specific example of "second communication apparatus" in the present disclosure.

In the communication system 3, the application processor 130 sends signals to the imaging apparatus 110 using two (the lines 101B and 101C in this example) of the three lines 101A, 101B, and 101C in the bidirectional communication mode M3. In the imaging apparatus 110, the circuit arrangement of the receiver 221, for example, can thus be simplified. Specifically, if an application processor sends signals to an imaging apparatus using the three lines 101A, 101B, and 101C, for example, then since the imaging apparatus requires a circuit like the receiver 462 of the application processor 130, the circuit arrangement thereof tends to be complex. In the communication system 3, on the other hand, as two (the lines 101B and 101C in this example) of the three lines 101A, 101B, and 101C are used, the circuit arrangement of the receiver 221 is simplified. As a result, the communication system 3 can reduce the consumption of electric energy.

According to the present embodiment, as described above, even if the communication system is arranged to transmit image data using three signals having voltages that are different from each other, a low-speed pattern having a low transition rate can be sent using two of the three lines, for example, in periods in which no image data are transmitted. As a consequence, in the same manner as with the first embodiment, the consumption of electric power is reduced and the transmission of image data can be resumed immediately.

According to the present embodiment, in the bidirectional communication mode, the application processor sends signals to the imaging apparatus using two of the three lines. Therefore, the circuit arrangement is simplified and the consumption of electric power is reduced.

The other advantages are the same as those of the first embodiment.

4. Fourth Embodiment

Next, a communication system 4 according to a fourth embodiment will be described below. According to the present embodiment, an application processor controls communicating operation of a communication system, and an imaging apparatus sends image data DT using three signals having voltages that are different from each other. Those components which are essentially identical to those of the communication system 2 according to the second embodiment and those of the communication system 3 according to the third embodiment are denoted by identical reference characters, and their description will be omitted accordingly.

FIG. 25 depicts a configurational example of the communication system 4. The communication system 4 includes an imaging apparatus 150, a transmission path 101, and an application processor 170. The communication system 4 transmits image data DT through the transmission path 101, using three signals having voltages that are different from each other.

The imaging apparatus 150 has a controller 152 and a communication unit 160. The controller 152 serves to control operation of the imaging apparatus 150. The communication unit 160 serves to communicate with the application processor 170.

The application processor 170 has a communication unit 180 and a controller 171. The communication unit 180 serves to communicate with the imaging apparatus 150. The controller 171 serves to control operation of the application processor 170. The controller 171 has a communication controller 72. As is the case with the second embodiment, the communication controller 72 serves to control communicating operation of the communication system 4.

As with the communication system 2 (FIG. 4) according to the second embodiment, the communication system 4 has four operation modes M (a high-speed communication mode M1, a low-speed communication mode M2, a bidirectional communication mode M3, and a standby mode M4).

In the high-speed communication mode M1, the imaging apparatus 150 sends packets P (image data DT) to the application processor 170 using three signals (FIG. 20) having voltages that are different from each other.

In the low-speed communication mode M2 and the bidirectional communication mode M3, the imaging apparatus 150 sends a signal including a low-speed pattern PAT to the application processor 170 through two (the lines 101B and 101C in this example) of the three lines (the lines 101A, 101B, and 101C) of the transmission path 101, in the same manner as with the second embodiment. At this time, the imaging apparatus 150 outputs a DC signal to the remaining one (the line 101A in this example) of the three lines of the transmission path 101.

In the bidirectional communication mode M3, the application processor 170 sends signals to the imaging apparatus 150 through the lines 101B and 101C in this example, in the same manner as with the second embodiment.

FIG. 26 depicts a configurational example of the communication unit 160 and the controller 152 of the imaging apparatus 150. The communication unit 160 has a transmitter 260 and a low-speed communication unit 240. The transmitter 260 serves to send signals to the application processor 170 in the high-speed communication mode M1, the low-speed communication mode M2, and the bidirectional communication mode M3. The low-speed communication unit 240 serves to receive signals sent from the application processor 170 in the bidirectional communication mode M3. The low-speed communication unit 240 also has a function to receive an activation signal sent from the application processor 170.

FIG. 27 depicts a configurational example of the controller 171 and the communication unit 180 of the application processor 170. The communication unit 180 has a receiving unit 460 and a low-speed communication unit 440. The receiving unit 460 serves to receive signals sent from the imaging apparatus 110 in the high-speed communication mode M1, the low-speed communication mode M2, and the bidirectional communication mode M3. The low-speed communication unit 440 serves to send signals to the imaging apparatus 150 in the bidirectional communication mode M3. The low-speed communication unit 440 also has a function to send the activation signal to the imaging apparatus 150.

The imaging apparatus 150 corresponds to a specific example of "first communication apparatus" in the present disclosure. The application processor 170 corresponds to a specific example of "second communication apparatus" in the present disclosure.

According to the present embodiment, as described above, even if the communication system is arranged to transmit image data using three signals having voltages that are different from each other, a low-speed pattern having a low transition rate can be sent using two of the three lines, for example, in periods in which no image data are transmitted. As a consequence, in the same manner as with the second embodiment, the consumption of electric power is reduced and the transmission of image data can be resumed immediately.

According to the present embodiment, in the bidirectional communication mode, the application processor sends signals to the imaging apparatus using two of the three lines. Therefore, the circuit arrangement is simplified and the consumption of electric power is reduced.

The other advantages are the same as those of the second embodiment.

5. Applications

Next, an application of the communication systems described in the above embodiments and modifications will be described below.

The technology according to the present disclosure can be applied to various products. For example, the technology according to the present disclosure may be realized as apparatus for use on mobile bodies of either of the kinds including automobiles, electric automobiles, hybrid electric automobiles, motorcycles, bicycles, personal mobility, airplanes, drones, ships, robots, construction machines, and agricultural machines (tractors), etc.

FIG. 28 is a block diagram depicting a general configurational example of a vehicle control system 7000 as an example of a mobile body control system to which the technology according to the present disclosure is applicable. The vehicle control system 7000 includes a drive system control unit 7100, a body system control unit 7200, a battery control unit 7300, a vehicle exterior information detecting unit 7400, a vehicle interior information detecting unit 7500, and an integrated control unit 7600. These control units are connected by a communication network 7010 which may include, for example, a vehicle-mounted communication network that conform to desired standards including CAN (Controller Area Network), LIN (Local Interconnect Network), LAN (Local Area Network), FlexRay (registered trademark), or the like.

Each control unit includes a microcomputer for performing arithmetic processing operations according to various programs, a storage unit for storing the programs run by the microcomputer and parameters, etc. used in various arithmetic processing operations, and drive circuits for driving various devices to be controlled thereby. Each control unit includes a network I/F for communicating with the other control units through the communication network 7010 and a communication I/F for communicating with devices or sensors inside and outside the vehicle via wired or wireless communication links. FIG. 28 illustrates, as functional blocks of the integrated control unit 7600, a microcomputer 7610, a general-purpose communication I/F 7620, a dedicated communication I/F 7630, a positioning unit 7640, a beacon receiver 7650, a vehicle interior device I/F 7660, a sound/image output unit 7670, a vehicle-mounted network I/F 7680, and a storage unit 7690. Similarly, the other control units also have a microcomputer, a communication I/F, and a storage unit, etc.

The drive system control unit 7100 controls operation of devices related to the drive system of the vehicle according to various programs. For example, the drive system control unit 7100 functions as a controller for a drive power generating device for generating vehicle drive power such as an internal combustion engine or a drive motor, a drive power transmitting mechanism or transmitting drive power to wheels, a steering mechanism for adjusting the steering angle of the vehicle, a braking device for generating braking forces for the vehicle, and the like. The drive system control unit 7100 may have a function as a controller such as an ABS (Antilock Brake System), an ESC (Electronic Stability Control) unit, or the like.

To the drive system control unit 7100, there is connected a vehicle state detector 7110. The vehicle state detector 7110 includes at least one of a gyro sensor for detecting the angular velocity of a rotary motion of the vehicle body about an axis, an acceleration sensor for detecting an acceleration of the vehicle, a sensor for detecting a manipulated quantity of an accelerator pedal, a manipulated quantity of a brake pedal, a steering angle of a steering wheel, an engine rotational speed, a wheel rotational speed, or the like. The drive system control unit 7100 performs arithmetic processing operations on signals input from the vehicle state detector 7110 to control the internal combustion engine, the drive motor, an electric power steering system, the braking device, or the like.

The body system control unit 7200 controls operation of various devices mounted on the vehicle body according to various programs. For example, the body system control unit 7200 functions as a controller for a keyless entry system, a smart key system, a power window device, or various lamps including head lamps, reverse lamps, brake lamps, winkers, fog lamps, or the like. In this case, a radio wave emitted from a portable unit as an alternative to a key or signals from various switches can be input to the body system control unit 7200. In response to the radio wave or signals, the body system control unit 7200 controls a door lock device of the vehicle, the power window device, or the lamps.

The battery control unit 7300 controls a secondary battery 7310 as a power supply source for the drive motor according to various programs. For example, a battery device that includes the secondary battery 7310 inputs information representing a battery temperature, a battery output voltage, a remaining battery capacity, or the like to the battery control unit 7300. The battery control unit 7300 performs arithmetic processing operations on the information input thereto to perform a temperature adjustment control process on the secondary battery 7310 or a control process on a cooling device incorporated in the battery device.

The vehicle exterior information detecting unit 7400 detects information outside of the vehicle that incorporates the vehicle control system 7000. For example, at least one of an imaging unit 7410 and a vehicle exterior information detector 7420 is connected to the vehicle exterior information detecting unit 7400. The imaging unit 7410 includes at least one of a ToF (Time Of Flight) camera, a stereo camera, a single-lens camera, an infrared camera, and other cameras. The vehicle exterior information detector 7420 includes, for example, at least one of an environmental sensor for detecting a present weather or climate or a peripheral information detecting sensor for detecting another vehicle, an obstacle, a pedestrian, or the like in the periphery of the vehicle incorporating the vehicle control system 7000.

The environmental sensor may be at least one of a raindrop sensor for detecting a rainy weather, a fog sensor for detecting a fog, a sunshine sensor for detecting a solar radiation level, and a snow sensor for detecting a snowfall. The peripheral information detecting sensor may be at least one of an ultrasonic sensor, a radar device, and a LIDAR (Light Detection and Ranging, Laser Imaging Detection and Ranging) device. The imaging unit 7410 and the vehicle exterior information detector 7420 may be provided as independent sensors or devices, or may be provided as a device where a plurality of sensors or devices are integrated.

FIG. 29 depicts an example of installed positions of the imaging unit 7410 and the vehicle exterior information detector 7420. Imaging units 7910, 7912, 7914, 7916, and 7918 are installed in positions on a front nose, side mirrors, a rear bumper, a back door, and an upper portion of a front windshield within a cabin of a vehicle 7900. The imaging unit 7910 installed on the front nose and the imaging unit 7918 installed on the upper portion of the front windshield within the cabin mainly acquire an image in front of the vehicle 7900. The imaging units 7912 and 7914 installed on the side mirrors mainly acquire images on the sides of the vehicle 7900. The imaging unit 2916 installed on the rear bumper or back door mainly acquire an image behind the vehicle 7900. The imaging unit 7918 installed on the upper portion of the front windshield within the cabin is mainly used to detect preceding vehicles, pedestrians, obstacles, traffic signals, traffic signs, lanes, or the like.

FIG. 29 illustrates an example of imaging ranges of the respective imaging units 7910, 7912, 7914, and 7916. An imaging range a represents the imaging range of the imaging unit 7910 installed on the front nose. Imaging ranges b and c represent the imaging ranges of the imaging units 7912 and 7914 installed on the side mirrors. An imaging range d represents the imaging range of the imaging unit 7916 installed on the rear bumper or back door. Image data captured by the imaging units 7910, 7912, 7914, and 7916 are combined to obtain a bird's-eye image of the vehicle 7900 as viewed from above.

Vehicle exterior information detectors 7920, 7922, 7924, 7926, 7928, and 7930 that are installed on front, rear, side, corner portions and an upper portion of the windshield within the cabin of the vehicle 7900 may include ultrasonic sensors or radar devices, for example. The vehicle exterior information detectors 7920, 7926, and 7930 installed on the front nose, the rear bumper or back door, and the upper portion of the windshield within the cabin of the vehicle 7900 may include LIDAR devices, for example. These vehicle exterior information detectors 7920 to 7930 are mainly used to detect preceding vehicles, pedestrians, obstacles, or the like.

Referring back to FIG. 28, the vehicle exterior information detecting unit 7400 controls the imaging unit 7410 to capture an image outside of the vehicle and receives captured image data. The vehicle exterior information detecting unit 7400 also receives detected information from the vehicle exterior information detector 7420 connected thereto. If the vehicle exterior information detector 7420 includes a radar device or a LIDAR device, then the vehicle exterior information detecting unit 7400 emits an ultrasonic wave or an electromagnetic wave and receives information of a reflected wave that is received. The vehicle exterior information detecting unit 7400 may perform an object detecting process for detecting a human being, a vehicle, an obstacle, a sign, letters on the road, or the like or a distance detecting process based on the received information. Based on the received information, the vehicle exterior information detecting unit 7400 may perform an environmental recognition process for recognizing a rainfall, a fog, a road condition, or the like. Based on the received information, the vehicle exterior information detecting unit 7400 may calculate a distance up to an object outside of the vehicle.

Furthermore, based on the received image data, the vehicle exterior information detecting unit 7400 may perform an image recognition process for recognizing a human being, a vehicle, an obstacle, a sign, letters on the road, or the like or a distance detecting process. The vehicle exterior information detecting unit 7400 may perform a distortion correcting process or a positioning process on the received image data, and may combine image data captured by different imaging units 7410 to generate a bird's-eye image or a panorama image. The vehicle exterior information detecting unit 7400 may perform a viewpoint conversion process using image data captured by different imaging units 7410.

The vehicle interior information detecting unit 7500 detects information in the vehicle. To the vehicle interior information detecting unit 7500, there is connected a driver state detector 7510 for detecting the state of the driver, for example. The driver state detector 7510 may include a camera for imaging the driver, a biological sensor for detecting biological information of the driver, a microphone for collecting sound in the cabin, or the like. The biological sensor is incorporated in a driver's seat or a steering wheel and detects biological information of the driver who is seated on the driver's seat or gripping the steering wheel. The vehicle interior information detecting unit 7500 may calculate the level of fatigue of the driver or the level of concentration of the driver on the basis of detected information input from the driver state detector 7510, or may determine whether the driver is dozing off or not. The vehicle interior information detecting unit 7500 may perform a process such as a noise canceling process on a collected sound signal.

The integrated control unit 7600 controls overall operation of the vehicle control system 7000 according to various programs. An input unit 7800 is connected to the integrated control unit 7600. The input unit 7800 is realized by a device that can be operated by a vehicle occupant for entering inputs, such as a touch panel, buttons, a microphone, a switch, a lever, or the like. Data obtained from speech sound input through the microphone by speech recognition may be input to the integrated control unit 7600. The input unit 7800 may be a remote control device that uses an infrared radiation or a radio wave, or may be an external connection device such as a mobile phone or a PDA (Personal Digital Assistant) compatible in operation with the vehicle control system 7000. The input unit 7800 may be a camera, in which case the vehicle occupant may input information through gestures. Alternatively, data obtained by detecting movement of a wearable device mounted on the vehicle occupant may be input to the input unit 7800. Furthermore, the input unit 7800 may include an input control circuit that generates an input signal based on information input by the vehicle occupant or the like using the above input unit 7800, and outputs the input signal to the integrated control unit 7600. The vehicle occupant or the like operates the input unit 7800 to input various data to the vehicle control system 7000 or indicate a processing operation thereto.

The storage unit 7690 may include a ROM (Read Only Memory) for storing various programs to be run by the microcomputer and a RAM (Random Access Memory) for storing various parameters, results of arithmetic operations, sensor values, or the like. The storage unit 7690 may be realized by a magnetic storage device such as an HDD (Hard Disc Drive), a semiconductor storage device, an optical storage device, a magnetooptical storage device, or the like.

The general-purpose communication I/F 7620 is a general-purpose communication I/F for mediating communication with various devices that are present in an external environment 7750. The general-purpose communication I/F 7620 may implement a cellular communication protocol such as GSM (registered trademark) (Global System of Mobile communications), WiMAX, LTE (Long Term Evolution), or LTE-A (LTE-Advanced), or another wireless communication protocol such as wireless LAN (also referred to as Wi-Fi (registered trademark)), Bluetooth (registered trademark), or the like. The general-purpose communication I/F 7620 may be connected to a device (e.g., an application server or a control server) present on an external network (e.g., the Internet, a cloud network, or an operator-specific network) through a base station or an access point. Alternatively, the general-purpose communication I/F 7620 may be connected to a terminal present in the vicinity of the vehicle (e.g. a terminal of the driver, a pedestrian, or a shop) or an MTC (Machine Type Communication) terminal using the P2P (Peer To Peer) technology.

The dedicated communication I/F 7630 is a communication I/F that supports a communication protocol formulated for use on vehicles. The dedicated communication I/F 7630 may implement a standard protocol such as WAVE (Wireless Access in Vehicle Environment) that is a combination of IEEE802.11p for a lower layer and IEEE1609 for an upper layer, DSRC (Dedicated Short Range Communications), or a cellular communication protocol. Typically, the dedicated communication I/F 7630 performs V2X communication that is a concept including one or more of vehicle-to-vehicle communication, vehicle-to-infrastructure communication, vehicle-to-home communication, and vehicle-to-pedestrian communication.

The positioning unit 7640 receives a GNSS signal from a GNSS (Global Navigation Satellite System) satellite (e.g., a GPS signal from a GPS (Global Positioning System) satellite) and performs a positioning process to generate positional information including the latitude, longitude, and height of the vehicle. The positioning unit 7640 may identify a present position by exchanging signals with a wireless access point, or may acquire positional information from a terminal such as a mobile phone, a PHS, or a smart phone that has a positioning function.

The beacon receiver 7650 receives a radio wave or an electromagnetic wave emitted from wireless stations or the like installed on the road, and acquires information such as a present position, a traffic jam, no thoroughfare, a time required, or the like. The function of the beacon receiver 7650 may be included in the dedicated communication I/F 7630.

The vehicle interior device I/F 7660 is a communication interface for mediating a connection between the microcomputer 7610 and various vehicle interior devices 7760 that are present in the vehicle. The vehicle interior device I/F 7660 may establish a wireless connection using a wireless communication protocol such as a wireless LAN, Bluetooth (registered trademark), NFC (New Field Communication), or WUSB (Wireless USB). The vehicle interior device I/F 7660 may establish a wired connection such as USB (Universal Serial Bus), a HDMI (registered trademark) (High-Definition Multimedia Interface), MHL (Mobile High-definition Link) or the like through connection terminals, not depicted (and a cable if necessary). The vehicle interior devices 7760 may include at least one of a mobile device or a wearable device owned by the vehicle occupant and an information device carried into or installed in the vehicle. The vehicle interior devices 7760 may include a navigation device for searching for a route up to a desired destination. The vehicle interior device I/F 7660 exchanges control signals or image signals with these vehicle interior devices 7760.

The vehicle-mounted network I/F 7680 is an interface for mediating communication between the microcomputer 7610 and the communication network 7010. The vehicle-mounted network I/F 7680 sends and receives signals, etc. according to a predetermined protocol supported by the communication network 7010.

The microcomputer 7610 of the integrated control unit 7600 controls the vehicle control system 7000 according to various programs on the basis of information acquired through at least one of the general-purpose communication I/F 7620, the dedicated communication I/F 7630, the positioning unit 7640, the beacon receiver 7650, the vehicle interior device I/F 7660, and the vehicle-mounted network I/F 7680. For example, the microcomputer 7610 may calculate a control target value for the drive power generating device, the steering mechanism, or the braking device on the basis of information acquired inside and outside the vehicle, and output a control command to the drive system control unit 7100. For example, the microcomputer 7610 may perform coordinated control for the purpose of realizing the functions of an ADAS (Advanced Driver Assistance System) including vehicle collision avoidance or impact mitigation, vehicle following travel based on vehicle-to-vehicle distance, vehicle speed maintaining travel, vehicle collision warning, vehicle lane deviation warning, and the like. Furthermore, the microcomputer 7610 may perform coordinated control for the purpose of automatically driving a vehicle autonomously without driver's intervention by controlling the driver power generating device, the steering mechanism, and the braking device, etc. on the basis of information acquired in the vicinity of the vehicle.

The microcomputer 7610 may generate three-dimensional information between the vehicle and objects such as structures, people, etc. around the vehicle on the basis of information acquired through at least one of the general-purpose communication I/F 7620, the dedicated communication I/F 7630, the positioning unit 7640, the beacon receiver 7650, the vehicle interior device I/F 7660, and the vehicle-mounted network I/F 7680, and produce local map information including information in the periphery of the present position of the vehicle. Moreover, the microcomputer 7610 may predict a danger such as a vehicle collision, an approaching person or the like, entry into a closed road, or the like on the basis of the acquired information, and generate a warning signal. The warning signal may be a signal for generating a warning sound or turning on a warning lamp.

The sound/image output unit 7670 sends an output signal representing at least one of a sound and an image to an output device that is capable of visually or aurally indicating information to the vehicle occupant or the vehicle exterior. In the example depicted in FIG. 28, an audio speaker 7710, a display unit 7720, and an instrumental panel 7730 are illustrated as the output device. The display unit 7720 may include at least one of an on-board display and a head-up display, for example. The display unit 7720 may have an AR (Augmented Reality) display function. The output device may be another device than those devices, such as headphones, a wearable device such as an eyeglass-type display worn by the vehicle occupant, a projector, a lamp, or the like. If the output device is a display device, then the display device visually displays results obtained by various processing operations performed by the microcomputer 7610 or information received from other control units, in various forms such as text, image, table, graph, or the like. If the output device is a sound output device, then the sound output device aurally outputs an analog signal converted from an audio signal representing reproduced sound data, acoustic data, or the like.

In the example depicted in FIG. 28, at least two control units connected through the communication network 7010 may be integrated into one control unit. Alternatively, individual control units may be constructed of a plurality of control units. Furthermore, the vehicle control system 7000 may be provided with another control unit, not depicted. In the above description, some or all of the functions performed by either of the control units may be taken on by another control unit. In other words, insofar as information is sent and received through the communication network 7010, a certain arithmetic processing operation may be carried out by either of the control units. Similarly, a sensor or a device connected to either of the control units may be connected to another control unit, and a plurality of control units may send and receive detected information to and from each other through the communication network 7010.

In the vehicle control system 7000 described above, the communication system 1 according to the embodiment described with reference to FIG. 1, for example, may be applied to a communication system between blocks in the application example depicted in FIGS. 28 and 29. Specifically, the present technology can be applied to the imaging unit 7140 (the imaging units 7910, 7912, 7914, 7916, and 7918) and the vehicle exterior information detecting unit 7400. The vehicle control system 7000 can thus reduce the consumption of electric power, for example.

Although the present technology has been described in terms of some embodiments and modifications and their specific applications, the present technology is not limited to those embodiments, etc., but various modifications can be made therein.

For example, in each of the above embodiments, the imaging apparatus sends control codes to the application processor in the low-speed communication mode M2 and the bidirectional communication mode M3. However, the disclosure is not restrictive, but the imaging apparatus may also send data to the application processor. Similarly, the application processor sends control codes to the imaging apparatus in the bidirectional communication mode M3. However, the disclosure is not restrictive, but the application processor may also send data to the imaging apparatus.

The advantages described in the present disclosure are given by way of illustrative example only, but not restrictive, and other advantages may be available.

The present technology may be arranged as follows.

(1) A communication apparatus including:

a transmitter that generates a first signal including communication data and sends the first signal through a communication terminal in a first operation mode, and that generates a second signal including a predetermined first signal pattern and having a transition rate lower than the first signal and sends the second signal through the communication terminal in a second operation mode; and a controller that sets an operation mode for the transmitter to either of a plurality of operation modes including the first operation mode and the second operation mode.

(2) The communication apparatus according to (1), in which the second signal further includes a predetermined second signal pattern, the controller generates a control code to be sent to a communication companion, and the transmitter combines the first signal pattern and the second signal pattern to generate the second signal depending on the control code.

(3) The communication apparatus according to (2), in which the transmitter starts sending the first signal if the control code is a first control code indicating a change to the first operation mode.

(4) The communication apparatus according to (2) or (3), in which the plurality of operation modes include a third operation mode, and the transmitter generates the second signal and sets the output impedance thereof to a high impedance in a predetermined period other than a period including a timing at which the second signal makes a transition.

(5) The communication apparatus according to (4), further including:

an imaging unit, in which the communication data includes captured image data, and the transmitter operates in the third operation mode in blanking periods.

(6) The communication apparatus according to (4) or (5), in which the transmitter starts sending the second signal and sets the output impedance thereof to a high impedance in the predetermined period if the control code is a second control code indicating a change to the third operation mode.

(7) The communication apparatus according to (6), further including:

a receiving unit configured to generate a reception signal based on a signal at the communication terminal.

(8) The communication apparatus according to (7), in which the receiving unit generates the reception signal based on the number of times that the signal at the communication terminal makes a transition in the predetermined period.

(9) The communication apparatus according to (7) or (8), in which the receiving unit generates the reception signal based on the second signal in addition to the signal at the communication terminal.

(10) The communication apparatus according to any one of (7) through (9), in which the receiving unit includes a decoding unit configured to perform an error correction decoding process on the reception signal.

(11) The communication apparatus according to any one of (7) through (10), in which the controller detects a reception control code included in the reception signal, and the transmitter starts sending the first signal if the reception control code is a first reception control code indicating a change to the first operation mode.

(12) The communication apparatus according to any one of (7) through (11), in which the controller detects a reception control code included in the reception signal, and the transmitter starts sending the second signal if the reception control code is a second reception control code indicating a change to the second operation mode.

(13) The communication apparatus according to any one of (7) through (12), in which the controller detects a reception control code included in the reception signal, and the transmitter goes into a standby state if the reception control code is a third reception control code.

(14) The communication apparatus according to any one of (7) through (13), in which the controller detects a reception control code included in the reception signal, and the transmitter includes a memory for storing the communication data, and sends the communication data stored in the memory as the first signal if the reception control code is a fourth reception control code.

(15) The communication apparatus according to any one of (7) through (14), in which the controller detects a reception control code included in the reception signal, and the transmitter sends a predetermined signal pattern as the first signal if the reception control code is a fifth reception control code.

(16) The communication apparatus according to any one of (2) through (15), in which the plurality of operation modes include a fourth operation mode in which the transmitter goes into a standby mode, and the transmitter goes into the standby state if the control code is a third control code indicating a change to the fourth operation mode.

(17) The communication apparatus according to any one of (2) through (16), in which the control code is a fourth control code indicating whether a terminating resistor in the communication companion is to be valid or invalid.

(18) The communication apparatus according to (1), in which the controller generates a control code to be sent to a communication companion, and the transmitter sends the control code as the first signal.

(19) The communication apparatus according to (18), in which the transmitter starts sending the second signal if the control code is a fifth control code indicating a change to the second operation mode.

(20) The communication apparatus according to any one of (1) through (19), in which the second signal includes two signals having voltages that are different from each other.

(21) The communication apparatus according to any one of (1) through (20), in which the first signal includes two signals having voltages that are different from each other.

(22) The communication apparatus according to any one of (1) through (20), in which the first signal includes three signals having voltages that are different from each other.

(23) A communication apparatus including:

a receiving unit that receives a first signal including communication data through a communication terminal in a first operation mode, and that receives a second signal including a predetermined first signal pattern and having a transition rate lower than the first signal through the communication terminal in a second operation mode; and a controller that sets an operation mode for the receiving unit to either of a plurality of operation modes including the first operation mode and the second operation mode.

(24) The communication apparatus according to (23), further including:

a transmitter, in which the controller generates a reception control code to be sent to a communication companion, the plurality of operation modes further include a third operation mode in which the receiving unit receives the second signal through the communication terminal and the transmitter transmits the reception control code, and when the transmitter operates in the third operation mode, the transmitter sets an output impedance of the transmitter to a high impedance in a first period including a timing at which the second signal makes a transition and sends the reception control code in a second period other than the first period.

(25) The communication apparatus according to (24), in which the receiving unit includes:

a signal keeper for outputting the second signal as it is in the first period and holding and outputting the second signal in the second period; and a clock generator for generating a clock signal based on a signal output from the signal keeper.

(26) The communication apparatus according to (25), in which the transmitter sends the reception control code based on the clock signal.

(27) The communication apparatus according to any one of (24) through (26), in which the transmitter sends the reception control code based on the second signal.

(28) A communication system including:

a first communication apparatus; and a second communication apparatus;

in which the first communication apparatus includes a transmitter that generates a first signal including communication data and sends the first signal through a first communication terminal in a first operation mode, and that generates a second signal including a predetermined first signal pattern and having a transition rate lower than the first signal and sends the second signal through the first communication terminal in a second operation mode, and a first controller that sets an operation mode for the transmitter to either of a plurality of operation modes including the first operation mode and the second operation mode, and the second communication apparatus includes a receiving unit that receives the first signal through a second communication terminal in the first operation mode, and that receives the second signal through the second communication terminal in the second operation mode, and a second controller that sets an operation mode for the receiving unit to either of the plurality of operation modes.

REFERENCE SIGNS LIST 1 to 4 . . . Communication system, 10, 50, 110, 150 . . . Imaging apparatus, 11 . . . Imaging unit, 12, 52, 112, 152 . . . Controller, 13 . . . Communication controller, 14 . . . Image data generator, 15 . . . Control code generator, 16, 56 . . . Control code detector, 17 . . . Activation signal generator, 20, 60, 120, 160 . . . Communication unit, 30, 70, 130, 170 . . . Application processor, 31, 71, 131, 171 . . . Controller, 32 . . . Image data receiver, 33 . . . Control code detector, 34, 74 . . . Control code generator, 35 . . . Activation signal detector, 39 . . . Processing unit, 40, 80, 140, 180 . . . Communication unit, 57 . . . Activation signal detector, 72 . . . Communication controller, 75 . . . Activation signal generator, 100, 101 . . . Transmission path, 100P, 100N, 101A, 101B, 101C . . . Line, 200, 260 . . . Transmitter, 201 . . . Memory, 202 . . . Selector, 203 . . . Error correction coding unit, 204 . . . Encoder, 205 . . . Low-speed pattern generator, 206 . . . Encoder, 207 . . . Training pattern generator, 208 . . . Selector, 209 . . . Serializer, 211, 271 . . . Driver, 212 . . . Output controller, 213 . . . Clock generator, 220, 240 . . . Low-speed communication unit, 221 . . . Receiver, 222 . . . Decoder, 223 . . . Exclusive-OR circuit, 224 . . . Counter, 225 . . . Error correction decoding unit, 226 . . . Driver, 264 . . . Mapper, 400, 460 . . . Receiving unit, 401, 461 . . . Terminator, 402, 462 . . . Receiver, 403 . . . Holding unit, 404 . . . CDR unit, 405 . . . Deserializer, 406 . . . Decoder, 407 . . . Error correction decoding unit, 420, 440 . . . Low-speed communication unit, 421 . . . Error correction coding unit, 422 . . . Encoder, 423, 443 . . . Driver, 424 . . . Output controller, 425 . . . Receiver, 466 . . . Demapper, CK1, CK2 . . . System clock signal, CP1, CN1, CP2, CN2, CA1, CB1, CC1, CA2, CB2, CC2 . . . Capacitive element, CD1, CD11, CD12, CD2, CD21, CD22 . . . Control code, M . . . Operation mode, M1 . . . High-speed communication mode, M2 . . . Low-speed communication mode, M3 . . . Bidirectional communication mode, M4 . . . Standby mode, P . . . Packet, PAT, PAT1, PAT2 . . . Low-speed pattern, PF . . . Frame period, PH . . . H blanking period, PV . . . V blanking period, P1, P2 . . . Period, SIG, SIGA, SIGB, SIGC . . . Signal, TP1, TN1, TP2, TN2, TA1, TB1, TC1, TA2, TB2, TC2 . . . Terminal, TxCK, RxCK . . . Clock signal, VH . . . High-level voltage, VL . . . Low-level voltage, VM . . . Mid-level voltage

The invention claimed is:

1. A first communication apparatus comprising:

a transmitter configured to generate a first signal including a communication data, to send the first signal through a communication terminal in a first operation mode of a plurality of operation modes, to generate a second signal including a predetermined first signal pattern and having a transition rate lower than the first signal, and to send the second signal through the communication terminal in a second operation mode of the plurality of operation modes; and a controller configured to set an operation mode for the transmitter to one of the plurality of operation modes, wherein the second signal includes a predetermined second signal pattern, the controller is configured to generate a transmission control code to be sent to a second communication apparatus, and the transmitter is configured to combine the first signal pattern and the second signal pattern to generate the second signal depending on a value of the transmission control code.

2. The first communication apparatus according to claim 1, wherein the transmitter is configured to start sending the first signal in a case where the value of the transmission control code indicates a change to the first operation mode.

3. The first communication apparatus according to claim 1, wherein the plurality of operation modes includes a third operation mode, and the transmitter is configured to generate the second signal and to set an output impedance of the transmitter to a predetermined impedance during a predetermined period that does not include a timing at which the second signal makes a transition.

4. The first communication apparatus according to claim 3, further comprising:

an imaging unit, wherein the communication data include a captured image data, and the transmitter is configured to operate in the third operation mode during blanking periods.

5. The first communication apparatus according to claim 3, wherein the transmitter is configured to start sending the second signal and to set the output impedance to the predetermined impedance during the predetermined period in a case where the value of the transmission control code indicates a change to the third operation mode.

6. The first communication apparatus according to claim 5, further comprising:

a receiver configured to generate a reception signal based on a third signal at the communication terminal.

7. The first communication apparatus according to claim 6, wherein the receiver is configured to generate the reception signal based on a number of times that the third signal makes a transition during the predetermined period.

8. The first communication apparatus according to claim 6, wherein the receiver is configured to generate the reception signal based on the second signal in addition to the third signal.

9. The first communication apparatus according to claim 6, wherein the receiver includes a decoder configured to perform an error correction decoding process on the reception signal.

10. The first communication apparatus according to claim 6, wherein the controller is configured to detect a reception control code included in the reception signal, and
the transmitter is configured to start sending the first signal in a case where a value of the reception control code indicates a change to the first operation mode.

11. The first communication apparatus according to claim 6, wherein the controller is configured to detect a reception control code included in the reception signal, and
the transmitter is configured to start sending the second signal in a case where a value of the reception control code indicates a change to the second operation mode.

12. The first communication apparatus according to claim 6, wherein the controller is configured to detect a reception control code included in the reception signal, and
the transmitter is configured to enter a standby state in a case where a value of the reception control code indicates a change to a standby operation mode.

13. The first communication apparatus according to claim 6, wherein the controller is configured to detect a reception control code included in the reception signal, and
the transmitter includes a memory configured to store the communication data, and to send the stored communication data as the first signal in a case where a value of the reception control code indicates a data send.

14. The first communication apparatus according to claim 6, wherein the controller is configured to detect a reception control code included in the reception signal, and
the transmitter is configured to send a predetermined signal pattern as the first signal in a case where a value of the reception control code indicates a training pattern send.

15. The first communication apparatus according to claim 1, wherein the plurality of operation modes includes a fourth operation mode in which the transmitter enters a standby state, and
the transmitter is configured to enter the standby state in a case where the value of the transmission control code indicates a change to the fourth operation mode.

16. The first communication apparatus according to claim 1, wherein the value of the control code indicates whether a terminating resistor in the second communication apparatus is to be rendered valid or invalid.

17. The first communication apparatus according to claim 1, wherein the controller is configured to generate a control code to be sent to the second communication apparatus, and
the transmitter is configured to send the transmission control code as the first signal.

18. The first communication apparatus according to claim 17, wherein the transmitter is configured to start sending the second signal if a value of the control code indicates a change to the second operation mode.

19. The first communication apparatus according to claim 1, wherein the second signal includes two signals having respective voltages that are different from each other.

20. The first communication apparatus according to claim 1, wherein the first signal includes two signals having respective voltages that are different from each other.

21. The first communication apparatus according to claim 1, wherein the first signal includes three signals having respective voltages that are different from each other.

22. A first communication apparatus comprising:
receiving circuitry configured to receive a first signal including a communication data through a communication terminal in a first operation mode of a plurality of operation modes, and to receive a second signal including a predetermined first signal pattern and having a transition rate lower than the first signal through the communication terminal in a second operation mode of the plurality of operation modes; and
a controller configured to set an operation mode for the receiving circuitry to one of the plurality of operation modes,
wherein the second signal includes a predetermined second signal pattern,
the controller is configured to receive a transmission control code that is sent by a second communication apparatus, and
the second signal is a combination of the first signal pattern and the second signal pattern generated by the second communication apparatus depending on a value of the transmission control code.

23. The first communication apparatus according to claim 22, further comprising:
a transmitter,
wherein the controller is configured to generate a reception control code to be sent to the second communication apparatus,
the plurality of operation modes further includes a third operation mode in which the receiving circuitry receives the second signal through the communication terminal and the transmitter transmits the reception control code, and
when the transmitter operates in the third operation mode, the transmitter is configured to set an output impedance of the transmitter to a predetermined impedance during a first period including a timing at which the second signal makes a transition and to send the reception control code in a second period other than the first period.

24. The first communication apparatus according to claim 23, wherein the receiving circuitry includes:
holding circuitry configured to output the second signal as-is during the first period, and to hold and the second signal and output the held signal in the second period; and
a clock generator configured to generate a clock signal based on an output from the holding circuitry.

25. The first communication apparatus according to claim 24, wherein the transmitter is configured to send the reception control code based on the clock signal.

26. The first communication apparatus according to claim 24, wherein the holding circuitry is a signal keeper.

27. The first communication apparatus according to claim 23, wherein the transmitter is configured to send the reception control code based on the second signal.

28. A communication system comprising:
a first communication apparatus; and
a second communication apparatus,
wherein the first communication apparatus includes
a transmitter configured to generate a first signal including a communication data, to send the first signal through a first communication terminal in a first operation mode of a plurality of operation modes, to generate a second signal including a predetermined first signal pattern and having a transition rate lower than the first signal, and to send the second signal through the first communication terminal in a second operation mode of the plurality of operation modes, and a first controller configured to set an operation mode for the transmitter to one of the plurality of operation modes, and the second communication apparatus includes a receiver configured to receive the first signal through a second communication terminal in the first operation mode, and to receive the second signal through the second communication terminal in the second operation mode, and a second controller configured to set an operation mode for the receiver to one of the plurality of operation modes, the second signal includes a predetermined second signal pattern, the controller is configured to generate a transmission control code to be sent to the second communication apparatus, and the transmitter is configured to combine the first signal pattern and the second signal pattern to generate the second signal depending on a value of the transmission control code.

* * * * *